United States Patent
Ouchi et al.

(10) Patent No.: US 9,661,589 B2
(45) Date of Patent: May 23, 2017

(54) TERMINAL, COMMUNICATION METHOD, AND INTEGRATED CIRCUIT

(71) Applicant: Sharp Kabushiki Kaisha, Osaka-shi, Osaka (JP)

(72) Inventors: Wataru Ouchi, Osaka (JP); Shoichi Suzuki, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/397,660

(22) PCT Filed: May 10, 2013

(86) PCT No.: PCT/JP2013/063153
§ 371 (c)(1),
(2) Date: Oct. 29, 2014

(87) PCT Pub. No.: WO2013/168791
PCT Pub. Date: Nov. 14, 2013

(65) Prior Publication Data
US 2015/0124673 A1 May 7, 2015

(30) Foreign Application Priority Data
May 10, 2012 (JP) ................. 2012-108057

(51) Int. Cl.
*H04W 52/36* (2009.01)
*H04W 52/14* (2009.01)
(Continued)

(52) U.S. Cl.
CPC ....... *H04W 52/362* (2013.01); *H04W 52/146* (2013.01); *H04W 52/225* (2013.01);
(Continued)

(58) Field of Classification Search
CPC ............. H04W 52/146; H04W 52/248; H04W 52/362; H04W 52/367; H04W 52/225; H04W 52/325; H04W 52/58
See application file for complete search history.

(56) References Cited

U.S. PATENT DOCUMENTS

2011/0038271 A1  2/2011  Shin et al.
2012/0093117 A1  4/2012  Suzuki et al.
(Continued)

FOREIGN PATENT DOCUMENTS

EP   2 523 510 A1   11/2012
JP   2012-517747 A   8/2012
(Continued)

OTHER PUBLICATIONS

3GPP TR 36.814, V9.0.0, "3rd Generation Partnership Project; Technical Specification Group Radio Access Network; Evolved Universal Terrestrial Radio Access (E-UTRA); Further Advancements for E-UTRA Physical Layer Aspects (Release 9)," Mar. 2010, pp. 1-115.
3GPP TS 36.213, V10.1.0, "3rd Generation Partnership Project; Technical Specification Group Radio Access Network; Evolved Universal Terrestrial Radio Access (E-UTRA); Physical Layer Procedures (Release 10)," Mar. 2011, pp. 1-104.
(Continued)

*Primary Examiner* — Jianye Wu
(74) *Attorney, Agent, or Firm* — Keating & Bennett, LLP

(57) ABSTRACT

Provided are a terminal, a communication method, and an integrated circuit, enabling a base station and a terminal to efficiently communicate with each other in a communication system in which the base station and the terminal communicate with each other. A terminal performs communication with at least one base station, and includes means for performing first power correction on the transmit power of a sounding reference signal (SRS) on the basis of a first transmission power control (TPC) command, and means for performing second power correction on the transmit power of the SRS on the basis of a second TPC command.

8 Claims, 16 Drawing Sheets

(51) Int. Cl.
 H04W 52/24 (2009.01)
 H04W 52/58 (2009.01)
 H04W 52/22 (2009.01)
 H04W 52/32 (2009.01)
(52) U.S. Cl.
 CPC ....... *H04W 52/248* (2013.01); *H04W 52/325* (2013.01); *H04W 52/58* (2013.01); *H04W 52/367* (2013.01)

(56) References Cited

U.S. PATENT DOCUMENTS

| | | | | |
|---|---|---|---|---|
| 2013/0010706 A1* | 1/2013 | Kela | ................... | H04W 52/146 370/329 |
| 2013/0039286 A1* | 2/2013 | Larsson | .............. | H04W 52/146 370/329 |
| 2013/0078913 A1 | 3/2013 | Lee et al. | | |

FOREIGN PATENT DOCUMENTS

| | | |
|---|---|---|
| WO | 2010/146971 A1 | 12/2010 |
| WO | 2011/039214 A2 | 4/2011 |
| WO | 2011/152685 A2 | 12/2011 |

OTHER PUBLICATIONS

3GPP TR 36.814, V9.0.0, "3rd Generation Partnership Project; Technical Specification Group Radio Access Network; Evolved Universal Terrestrial Radio Access (E-UTRA); Further Advancements for E-UTRA Physical Layer Aspects (Release 9)," Mar. 2010, pp. 1-104.
3GPP TS 36.213, V10.1.0, "3rd Generation Partnership Project; Technical Specification Group Radio Access Network; Evolved Universal Terrestrial Radio Access (E-UTRA); Physical Layer Procedures (Release 10)," Mar. 2011, pp. 1-115.

* cited by examiner

FIG. 10

CONFIGURATION OF PARAMETERS RELATED TO (FIRST) UPLINK POWER CONTROL
(UplinkPowerControl)

CONFIGURATION OF PARAMETERS RELATED TO (FIRST) (PRIMARY) CELL-
SPECIFIC UPLINK POWER CONTROL
- p0-NominalPUSCH
- α
- p0-NominalPUCCH
- deltaFList-PUCCH
- deltaPreambleMsg3

CONFIGURATION OF PARAMETERS RELATED TO (FIRST) SECONDARY CELL-
SPECIFIC UPLINK POWER CONTROL
- p0-NominalPUSCH
- α

CONFIGURATION OF PARAMETERS RELATED TO (FIRST) (PRIMARY CELL)
TERMINAL-SPECIFIC UPLINK POWER CONTROL
- p0-UE-PUSCH
- deltaMCS-Enabled
- accumulation-Enabled
- p0-UE-PUCCH
- pSRS-Offset
- filterCoefficient
- pSRS-Offset-Ap
- deltaTxD-OffsetListPUCCH CONFIGURATION OF PARAMETERS RELATED TO (FIRST) SECONDARY CELL
TERMINAL-SPECIFIC UPLINK POWER CONTROL
- p0-UE-PUSCH
- deltaMCS-Enabled
- accumulation-Enabled
- p0-UE-PUCCH
- pSRS-Offset
- pSRS-Offset-Ap
- filterCoefficient
- pathlossReference(-r10)

FIG. 11

CELL-SPECIFIC RADIO RESOURCE CONFIGURATION (RadioResourceConfigCommon)
└── CONFIGURATION OF PARAMETERS RELATED TO (FIRST) CELL-SPECIFIC UPLINK POWER CONTROL
└── etc TERMINAL-SPECIFIC PHYSICAL CONFIGURATION (PhysicalConfigDedicated)
└── CONFIGURATION OF PARAMETERS RELATED TO (FIRST) TERMINAL-SPECIFIC UPLINK POWER CONTROL
└── etc SECONDARY CELL-SPECIFIC RADIO RESOURCE CONFIGURATION (RadioResourceConfigCommonSCell-r10)
└── CONFIGURATION OF PARAMETERS RELATED TO (FIRST) SECONDARY CELL-SPECIFIC UPLINK POWER CONTROL
└── etc SECONDARY CELL TERMINAL-SPECIFIC PHYSICAL CONFIGURATION (PhysicalConfigDedicatedSCell-r10)
└── CONFIGURATION OF PARAMETERS RELATED TO (FIRST) SECONDARY CELL TERMINAL-SPECIFIC UPLINK POWER CONTROL
└── etc

FIG. 12

CONFIGURATION-r11 OF PARAMETERS RELATED TO (PRIMARY CELL) TERMINAL-SPECIFIC UPLINK POWER CONTROL
└── PATH LOSS REFERENCE RESOURCE ── MEASUREMENT TARGET

CONFIGURATION-r11 OF PARAMETERS RELATED TO SECONDARY CELL TERMINAL-SPECIFIC UPLINK POWER CONTROL
└── PATH LOSS REFERENCE RESOURCE ── MEASUREMENT TARGET

MEASUREMENT TARGET
└── INDEX ASSOCIATED WITH CELL-SPECIFIC REFERENCE SIGNAL ANTENNA PORT 0 OR CSI-RS ANTENNA PORT INDEX (OR CSI-RS MEASUREMENT INDEX)

FIG. 13

CONFIGURATION OF PARAMETERS RELATED TO SECOND UPLINK POWER CONTROL

┌─────────────────────────────────────────────────────────────┐
│ CONFIGURATION-r11 OF PARAMETERS RELATED TO SECOND (PRIMARY) CELL-SPECIFIC UPLINK POWER CONTROL │
│ CONFIGURATION-r11 OF PARAMETERS RELATED TO SECOND SECONDARY CELL-SPECIFIC UPLINK POWER CONTROL │
│ CONFIGURATION-r11 OF PARAMETERS RELATED TO SECOND (PRIMARY CELL) TERMINAL-SPECIFIC UPLINK POWER CONTROL │
│ CONFIGURATION-r11 OF PARAMETERS RELATED TO SECOND SECONDARY CELL TERMINAL-SPECIFIC UPLINK POWER CONTROL │
└─────────────────────────────────────────────────────────────┘

FIG. 14

(PRIMARY) CELL-SPECIFIC RADIO RESOURCE CONFIGURATION (RadioResourceConfigCommon)
- CONFIGURATION OF PARAMETERS RELATED TO FIRST (PRIMARY) CELL-SPECIFIC UPLINK POWER CONTROL
- CONFIGURATION-r11 OF PARAMETERS RELATED TO FIRST (PRIMARY) CELL-SPECIFIC UPLINK POWER CONTROL
- CONFIGURATION-r11 OF PARAMETERS RELATED TO SECOND (PRIMARY) CELL-SPECIFIC UPLINK POWER CONTROL SECONDARY CELL-SPECIFIC RADIO RESOURCE CONFIGURATION (RadioResourceConfigCommonSCell-r10)
- CONFIGURATION OF PARAMETERS RELATED TO FIRST SECONDARY CELL-SPECIFIC UPLINK POWER CONTROL
- CONFIGURATION-r11 OF PARAMETERS RELATED TO FIRST SECONDARY CELL-SPECIFIC UPLINK POWER CONTROL
- CONFIGURATION-r11 OF PARAMETERS RELATED TO SECOND SECONDARY CELL-SPECIFIC UPLINK POWER CONTROL (PRIMARY CELL) TERMINAL-SPECIFIC PHYSICAL CONFIGURATION (PhysicalConfigDedicated)
- CONFIGURATION OF PARAMETERS RELATED TO FIRST (PRIMARY CELL) TERMINAL-SPECIFIC UPLINK POWER CONTROL
- CONFIGURATION-r11 OF PARAMETERS RELATED TO FIRST (PRIMARY CELL) TERMINAL-SPECIFIC UPLINK POWER CONTROL
- CONFIGURATION-r11 OF PARAMETERS RELATED TO SECOND (PRIMARY CELL) TERMINAL-SPECIFIC UPLINK POWER CONTROL SECONDARY CELL TERMINAL-SPECIFIC PHYSICAL CONFIGURATION (PhysicalConfigDedicatedSCell-r10)
- CONFIGURATION OF PARAMETERS RELATED TO FIRST SECONDARY CELL TERMINAL-SPECIFIC UPLINK POWER CONTROL
- CONFIGURATION-r11 OF PARAMETERS RELATED TO FIRST SECONDARY CELL TERMINAL-SPECIFIC UPLINK POWER CONTROL
- CONFIGURATION-r11 OF PARAMETERS RELATED TO SECOND SECONDARY CELL TERMINAL-SPECIFIC UPLINK POWER CONTROL FIG. 15
EXAMPLE OF CONFIGURATION-r11 OF PARAMETERS RELATED TO SECOND (PRIMARY) CELL-SPECIFIC UPLINK POWER CONTROL
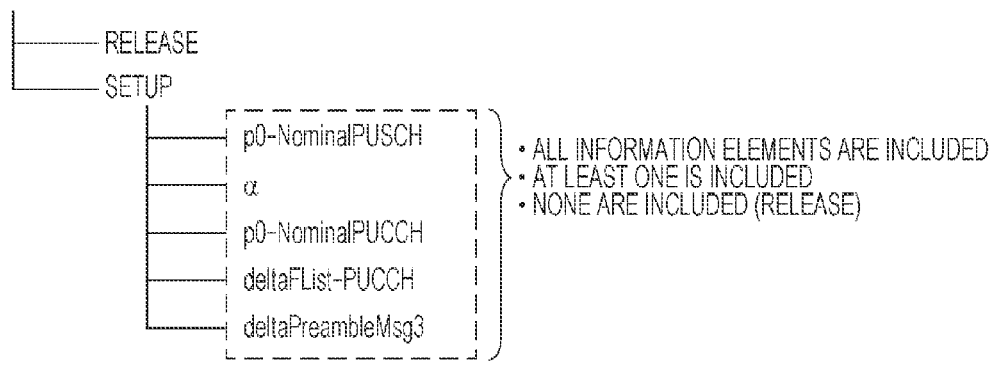
EXAMPLE OF CONFIGURATION-r11 OF PARAMETERS RELATED TO SECOND SECONDARY CELL-SPECIFIC UPLINK POWER CONTROL
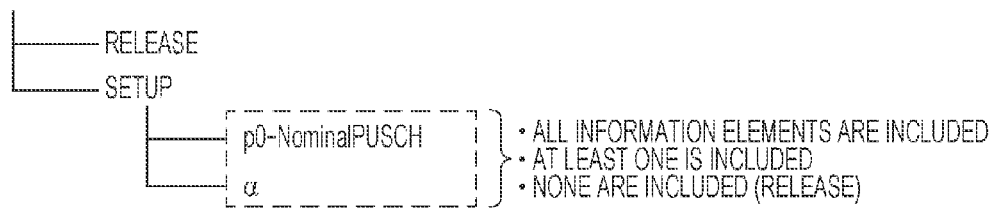

FIG. 16

EXAMPLE OF CONFIGURATION-r11 OF PARAMETERS RELATED TO FIRST (PRIMARY CELL) TERMINAL-SPECIFIC UPLINK POWER CONTROL
  └── PATH LOSS REFERENCE RESOURCE

EXAMPLE OF CONFIGURATION-r11 OF PARAMETERS RELATED TO FIRST SECONDARY CELL TERMINAL-SPECIFIC UPLINK POWER CONTROL
  └── PATH LOSS REFERENCE RESOURCE

EXAMPLE OF CONFIGURATION-r11 OF PARAMETERS RELATED TO SECOND (PRIMARY CELL) TERMINAL-SPECIFIC UPLINK POWER CONTROL
  ├── RELEASE
  └── SETUP
        ├── p0-UE-PUSCH
        ├── deltaMCS-Enabled
        ├── accumulation-Enabled
        ├── p0-UE-PUCCH
        ├── pSRS-Offset
        ├── filterCoefficient
        ├── pSRS-Offset-Ap
        ├── deltaTxD-OffsetListPUCCH
        └── PATH LOSS REFERENCE RESOURCE

• ALL INFORMATION ELEMENTS ARE INCLUDED
  • AT LEAST ONE IS INCLUDED
  • NONE ARE INCLUDED (RELEASE)

EXAMPLE OF CONFIGURATION-r11 OF PARAMETERS RELATED TO SECOND SECONDARY CELL-SPECIFIC UPLINK POWER CONTROL
  ├── RELEASE
  └── SETUP
        ├── p0-UE-PUSCH
        ├── deltaMCS-Enabled
        ├── accumulation-Enabled
        ├── p0-UE-PUCCH
        ├── pSRS-Offset
        ├── pSRS-Offset-Ap
        ├── filterCoefficient
        ├── pathlossReference(-r11)
        └── PATH LOSS REFERENCE RESOURCE

• ALL INFORMATION ELEMENTS ARE INCLUDED
  • AT LEAST ONE IS INCLUDED
  • NONE ARE INCLUDED (RELEASE)

FIG. 17

TERMINAL-SPECIFIC PUCCH CONFIGURATION-v11x0 (PUCCH-ConfigDedicated-v11x0)
    └──── UplinkPowerControl TERMINAL-SPECIFIC PUSCH CONFIGURATION-v11x0 (PUSCH-ConfigDedicated-v11x0)
    └──── UplinkPowerControl TERMINAL-SPECIFIC SRSUL CONFIGURATION-v11x0 (SoundingRS-UL-ConfigDedicated-v11x0)
    └──── UplinkPowerControl APERIODIC SRS CONFIGURATION-r11 (SRS-ConfigAp-r11)
    └──── UplinkPowerControl RACH CONFIGURATION-v11x0 (RACH-ConfigDedicated-v11x0)
    ├──── powerRampingStep
    └──── preambleInitialReceivedTargetPower

FIG. 18

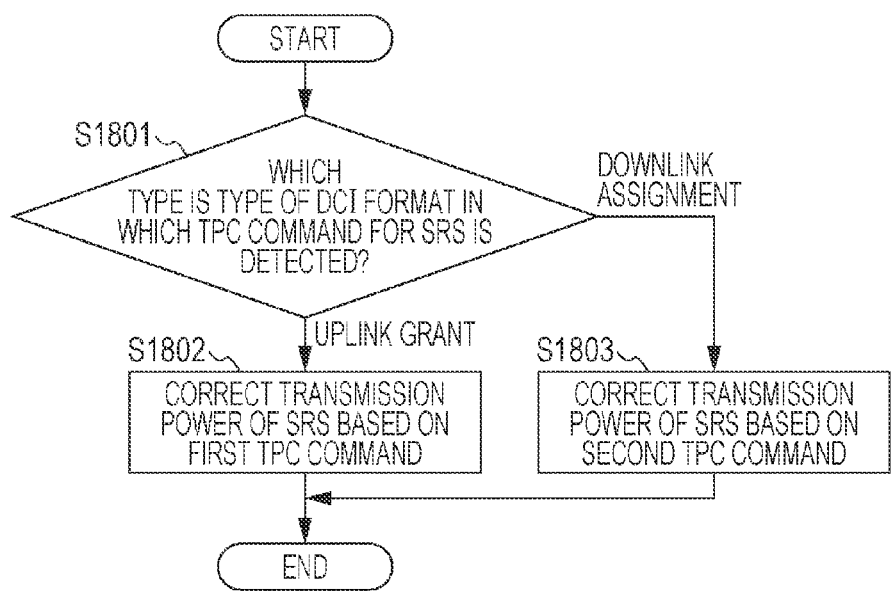

TERMINAL, COMMUNICATION METHOD, AND INTEGRATED CIRCUIT

TECHNICAL FIELD

The present invention relates to a terminal, a communication method, and an integrated circuit.

BACKGROUND ART

In communication systems such as Wideband Code Division Multiple Access (registered trademark) (WCDMA), Long-Term Evolution (LTE), and LTE-Advanced (LTE-A) by the Third Generation Partnership Project (3GPP), or a wireless LAN and Worldwide Interoperability for Microwave Access (WiMAX) by the Institute of Electrical and Electronics Engineers (IEEE), a base station (a cell, a transmission station, a transmission apparatus, or eNodeB) and a terminal (a mobile terminal, a reception station, a mobile station, a reception apparatus, or user equipment (UE)) respectively include a plurality of transmission and reception antennae, and spatially multiplex a data signal by applying a multi-input multi-output (MIMO) technique, so as to realize high-speed data communication.

In the communication systems, in order to realize data communication between the base station and the terminal, the base station is required to perform various controls on the terminal. For this reason, the base station notifies the terminal of control information by using a predetermined resource, so as to perform data communication via a downlink and an uplink. For example, the base station realizes data communication by notifying the terminal of resource assignment information, modulation and coding information of a data signal, spatial multiplexing number information of a data signal, transmission power control information, and the like. Such control information may be transmitted by using a method disclosed in NPL 1.

In addition, as a communication method in a downlink using the MIMO technique, various methods may be used, and, for example, a multiuser MIMO method of assigning the same resource to different terminals, or a coordinated multipoint or cooperative multipoint (CoMP) method in which a plurality of base stations perform data communication in cooperation with each other may be used.

FIG. 22 is a diagram illustrating an example in which the multiuser MIMO method is performed. In FIG. 22, a base station 2201 performs data communication with a terminal 2202 via a downlink 2204, and performs data communication with a terminal 2203 via a downlink 2205. In this case, the terminal 2202 and the terminal 2203 perform data communication by multiuser MIMO. The same resource is used in the downlink 2204 and the downlink 2205. The resource consists of frequency and time components. In addition, the base station 2201 controls beams of each of the downlink 2204 and the downlink 2205 by using a precoding technique or the like, and thus maintains mutual orthogonality or reduces co-channel interference. Consequently, the base station 2201 can realize data communication using the same resource with the terminal 2202 and the terminal 2203.

FIG. 23 is a diagram illustrating an example in which a downlink CoMP method is performed. FIG. 23 illustrates a case where a radio communication system using a heterogeneous network configuration consists of a macro base station 2301 having wide coverage and a remote radio head (RRH) 2302 having coverage narrower than the coverage of the macro base station 2301. Here, a case is assumed in which the coverage of the macro base station 2301 is configured to include part of or the whole coverage of the RRH 2302. In the example illustrated in FIG. 23, a heterogeneous network configuration consists of the macro base station 2301 and the RRH 2302, and data communication is performed with a plurality of terminals 2304 in cooperation with each other via a downlink 2305 and a downlink 2306. The macro base station 2301 is connected to the RRH 2302 via a line 2303 and can thus transmit and receive a control signal or a data signal to and from the RRH 2302. As the line 2303, a wired line such as an optical fiber or a wireless line using a relay technique may be used. In this case, the macro base station 2301 and the RRH 2302 use the same partial or whole frequency (resource), and thus comprehensive spectral efficiency (transmission capacity) within an area of coverage determined by the macro base station 2301 can be improved.

The terminal 2304 can perform single-cell communication with the base station 2301 or the RRH 2302 in a case of being located around the base station 2301 or the RRH 2302. In addition, in a case where the terminal 2304 is located around an end (cell edge) of coverage determined by the RRH 2302, a countermeasure of co-channel interference from the macro base station 2301 is necessary. As multi-cell communication (coordinated communication, multi-point communication, or CoMP) between the macro base station 2301 and the RRH 2302, a method has been examined in which interference with the terminal 2304 in a cell edge region is reduced or minimized by using the CoMP method in which the macro base station 2301 and the RRH 2302 cooperate with each other. For example, as such a CoMP method, a method disclosed in NPL 2 has been examined.

FIG. 24 is a diagram illustrating an example in which an uplink CoMP method is performed. FIG. 24 illustrates a case where a radio communication system using a heterogeneous network configuration consists of a macro base station 2401 having wide coverage and a remote radio head (RRH) 2402 having coverage narrower than the coverage of the macro base station 2401. Here, a case is assumed in which the coverage of the macro base station 2401 is configured to include part of or the whole coverage of the RRH 2402. In the example illustrated in FIG. 24, a heterogeneous network configuration consists of the macro base station 2401 and the RRH 2402, and data communication is performed with a plurality of terminals 2404 in cooperation with each other via an uplink 2405 and an uplink 2406. The macro base station 2401 is connected to the RRH 2402 via a line 2403 and can thus transmit and receive, a reception signal, a control signal, or a data signal to and from the RRH 2402. As the line 2403, a wired line such as an optical fiber or a wireless line using a relay technique may be used. In this case, the macro base station 2401 and the RRH 2402 use the same partial or whole frequency (resource), and thus comprehensive spectral efficiency (transmission capacity) within an area of coverage determined by the macro base station 2401 can be improved.

The terminal 2404 can perform single-cell communication with the base station 2401 or the RRH 2402 in a case of being located around the base station 2401 or the RRH 2402. Here, in a case where the terminal 2404 is located around the base station 2401, the base station 2401 receives and demodulates a signal which is received via the uplink 2405. Alternatively, in a case where the terminal 2404 is located around the RRH 2402, the RRH 2402 receives and demodulates a signal which is received via the uplink 2406. In addition, in a case where the terminal 2404 is located around an end (cell edge) of coverage determined by the RRH 2402 or is located around a middle point between the base station 2401 and the RRH 2402, the macro base station 2401 receives a signal which is received via the uplink 2405, and the RRH 2402 receives a signal which is received via the uplink 2406. Then, the macro base station 2401 and the RRH 2402 perform transmission and reception of the signals received from the terminal 2404 via the line 2403, so as to combine the signals received from the terminal 2404 with each other and to demodulate the combined signal. Through this process, performance of data communication is expected to be improved. This is a method called joint reception (JR), and performance of data communication in a cell edge region or a region around a middle point between the macro base station 2401 and the RRH 2402 can be improved by using the CoMP method in which the macro base station 2401 and the RRH 2402 cooperate with each other as uplink multi-cell communication (coordinated communication, multi-point communication, or CoMP).

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 10), March, 2011, 3GPP TS 36.212 V10.1.0 (2011-03).

NPL 2: 3rd Generation Partnership Project; Technical Specification Group Radio Access Network; Further Advancements for E-UTRA Physical Layer Aspects (Release 9), March, 2010, 3GPP TR 36.814 V9.0.0 (2010-03)

DISCLOSURE OF THE INVENTION

Problems to be Solved by the Invention

However, in a communication system in which coordinated communication such as the CoMP method can be performed, if the number of terminals increases, orthogonality between the terminals cannot be maintained only with interference coordination using a single cell ID, and interference of a sounding reference signal (SRS) in a cell increases.

The present invention has been made in light of the above-described problems, and an object thereof is to provide a terminal, a base station, a communication method, and an integrated circuit, in which signal interference is randomized, in a communication system in which the base station and the terminal communicate with each other.

Means for Solving the Problems (1) The present invention has been made in order to solve the above-described problems, and, according to an aspect of the present invention, there is provided a terminal which performs communication with at least one base station, the terminal including means for performing first power correction on the transmit power of a sounding reference signal (SRS) on the basis of a first transmission power control (TPC) command; and means for performing second power correction on the transmit power of the SRS on the basis of a second TPC command.

(2) In addition, in the terminal according to the aspect of the present invention, the first TPC command is detected from an uplink grant, and the second TPC command is detected from a downlink assignment.

(3) Further, in the terminal according to the aspect of the present invention, an integrated value based on the first power correction is determined on the basis of a power correction value which is obtained from the first TPC command, and an integrated value based on the second power correction is determined on the basis of a power correction value which is obtained from the second TPC command.

(4) Furthermore, in the terminal according to the aspect of the present invention, in a case where the transmit power of the SRS reaches the maximum transmit power which is set in the terminal, power correction based on the TPC command, which causes the transmit power to be equal to or higher than the maximum transmit power, is not performed (accumulation is not performed).

(5) Moreover, in the terminal according to the aspect of the present invention, in a case where the transmit power of the SRS reaches the minimum transmit power of the terminal, power correction based on the TPC command, which causes the transmit power to be equal to or lower than the minimum transmit power, is not performed.

(6) In addition, in the terminal according to the aspect of the present invention, a terminal-specific power value ($P_{O\_UE\_PUSCH}$) of a physical uplink shared channel is changed by a higher layer, and the integrated value obtained through the power correction based on the first TPC command is reset.

(7) Further, in the terminal according to the aspect of the present invention, in a case where a random access response message is received, the integrated value based on the power correction of the first TPC command is reset.

(8) Furthermore, in the terminal according to the aspect of the present invention, in a case where a value of a power offset ($P_{SRS\_OFFSET}$) for the SRS is changed, the integrated value based on the power correction of the second TPC command is reset.

(9) Moreover, in the terminal according to the aspect of the present invention, in a case where the first TPC command and the second TPC command are detected in the same subframe, an integrated value based on the first power correction and an integrated value based on the second power correction are set.

(10) In addition, in the terminal according to the aspect of the present invention, transmission power control of the SRS which is instructed to be transmitted via a radio resource control (RRC) signal is performed on the basis of power correction of the first TPC command.

(11) Further, in the terminal according to the aspect of the present invention, in a case where information (positive SRS request) indicating a request of the SRS transmission is detected from the uplink grant, the transmission power control of the SRS is performed by using the integrated value based on the power correction of the first TPC command.

(12) Furthermore, in the terminal according to the aspect of the present invention, in a case where information (positive SRS request) indicating a request of the SRS transmission is detected from the downlink assignment, the transmission power control of the SRS is performed on the basis of the integrated value by using the power correction of the second TPC command.

(13) According to another aspect of the present invention, there is provided a communication method for a terminal which performs communication with at least one base station, the method including performing first power correction on the transmit power of a sounding reference signal (SRS) on the basis of a first transmission power control (TPC) command; and means for performing second power correction on the transmit power of the SRS on the basis of a second TPC command.

(14) In addition, in the communication method according to the aspect of the present invention, in a case where the transmit power of the SRS reaches the maximum transmit power which is set in the terminal, power correction based on the TPC command, which causes the transmit power to be equal to or higher than the maximum transmit power, is not performed (accumulation is not performed).

(15) Further, in the communication method according to the aspect of the present invention, in a case where the transmit power of the SRS reaches the minimum transmit power of the terminal, power correction based on the TPC command, which causes the transmit power to be equal to or lower than the minimum transmit power, is not performed.

(16) Furthermore, in the communication method according to the aspect of the present invention, in a case where a value of a power offset ($P_{SRS\_OFFSET}$) for the SRS is changed, the integrated value based on the power correction of the second TPC command is reset.

(17) According to still another aspect of the present invention, there is provided an integrated circuit mounted in a terminal which performs communication with at least one base station, the integrated circuit causing the terminal to realize a function of performing first power correction on the transmit power of a sounding reference signal (SRS) on the basis of a first transmission power control (TPC) command; and a function of performing second power correction on the transmit power of the SRS on the basis of a second TPC command.

(18) In addition, in the integrated circuit according to the aspect of the present invention, in a case where the transmit power of the SRS reaches the maximum transmit power which is set in the terminal, the integrated circuit causes the terminal to realize a function of not performing power correction based on the TPC command, which causes the transmit power to be equal to or higher than the maximum transmit power (accumulation is not performed).

(19) Further, in the integrated circuit according to the aspect of the present invention, in a case where the transmit power of the SRS reaches the minimum transmit power of the terminal, the integrated circuit causes the terminal to realize a function of not performing power correction based on the TPC command, which causes the transmit power to be equal to or lower than the minimum transmit power.

(20) Furthermore, in the integrated circuit according to the aspect of the present invention, in a case where a value of a power offset ($P_{SRS\_OFFSET}$) for the SRS is changed, the integrated circuit causes the terminal to realize a function of resetting the integrated value based on the power correction of the second TPC command.

Consequently, a terminal can appropriately perform a transmission power control of a signal which is transmitted to a base station or an RRH.

Effects of the Invention

According to the present invention, in a communication system in which a base station and a terminal communicate with each other, it is possible to improve channel estimation accuracy by randomizing an SRS base sequence.

BRIEF DESCRIPTION OF THE DRAWINGS

FIG. 10 is a diagram illustrating an example of details of settings of parameters related to an uplink power control.

FIG. 11 is a diagram illustrating another example of details of settings of parameters related to an uplink power control.

FIG. 12 is a diagram illustrating details of a path loss reference resource.

FIG. 13 is a diagram illustrating an example of settings of parameters related to a second uplink power control in a fifth embodiment of the present invention.

FIG. 14 is a diagram illustrating an example of settings of parameters related to a first uplink power control and settings of parameters related to a second uplink power control included in each radio resource setting.

FIG. 15 is a diagram illustrating an example of settings of parameters related to a second cell-specific uplink power control.

FIG. 16 is a diagram illustrating an example of settings of parameters related to a first terminal-specific uplink power control and settings of parameters related to a second terminal-specific uplink power control.

FIG. 17 is a diagram illustrating an example of parameters related to an uplink power control, which are set in each uplink physical channel according to a seventh embodiment of the present invention.

FIG. 18 is a flowchart illustrating power correction according to a tenth embodiment of the present invention.

BEST MODE FOR CARRYING OUT THE INVENTION

First Embodiment

Figure 1:
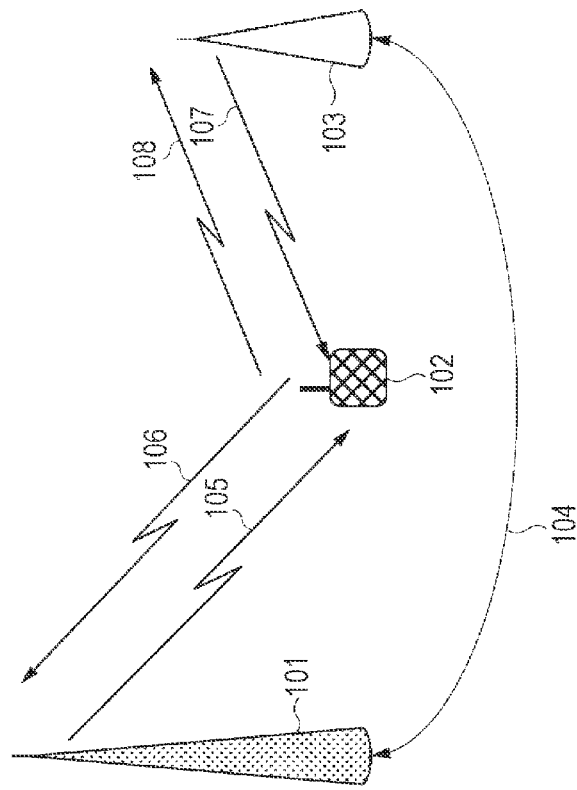
FIG. 1 is a schematic diagram illustrating a communication system which performs data transmission according to a first embodiment of the present invention.

A first embodiment of the present invention will be described. In the first embodiment, a base station 101 and/or an RRH 103 transmit(s) a plurality of cell identities (cell IDs) to a terminal 102 and transmit(s) a downlink control information (DCI) format, including a field (SRS request) indicating whether or not transmission of a sounding reference signal (SRS) is requested, to the terminal 102 in a specific control channel region (PDCCH or E-PDCCH). The terminal 102 detects the SRS request from the received DCI format and determines whether or not a request of an SRS transmission is made. In a case where the request of an SRS transmission is made (positive SRS request), and the received DCI format is a first format, a base sequence of the SRS is set on the basis of a first cell ID, and in a case where the received DCI format is a second format, a base sequence of the SRS is set on the basis of a second cell ID, and the SRS is transmitted to the base station 101 or the RRH 103. In addition, the cell ID is referred to as a parameter which is sent by a higher layer in some cases.

Further, the base station 101 or the RRH 103 transmits, to the terminal, a radio resource control (RRC) signal including parameters or physical quantities which are used to set a base sequence of the SRS.

The first format may be an uplink grant, and the second format may be a downlink assignment. In addition, the uplink grant is transmitted in order to perform scheduling of a physical uplink shared channel (PUSCH). The downlink assignment is transmitted in order to assign a resource of a physical downlink shared channel (PDSCH) or to indicate scheduling or a PDSCH codeword etc. A MIMO format is set in each of the uplink grant and the downlink assignment. For example, the uplink grant is a DCI format 0 or a DCI format 4, and the downlink assignment is a DCI format 1A, a DCI format 2B, or a DCI format 2C.

In addition, in the first embodiment, in a case where the received DCI format is a third format, the terminal 102 may set a base sequence of the SRS on the basis of a third cell ID, in a case where the received DCI format is a fourth format, the terminal 102 may set a base sequence of the SRS on the basis of a fourth cell ID, and in a case where the received DCI format is an n-th format (where n is an integer), the terminal 102 may set a base sequence of the SRS on the basis of an n-th cell ID, and the terminal 102 then transmits the SRS to the base station 101 or the RRH 103.

The terminal 102 may set a sequence of an SRS on the basis of any specific cell ID according to a received DCI format.

For example, in a case where the terminal 102 transmits SRSs to both the base station 101 and the RRH 103, base sequences of the SRSs may be set on the basis of different cell IDs. Since base sequences are different, despite another terminal 102 transmitting the SRSs to the base station 101 and the RRH 103 by using the same resource, two SRSs can be separated in each of the base station 101 and the RRH 103, and thus channel estimation accuracy can be maintained.

In downlink communication, the base station 101 or the RRH 103 is referred to as a transmission point (TP) in some cases. In addition, in uplink communication, the base station 101 or the RRH 103 is referred to as a reception point (RP) in some cases. Further, the base station 101 or the RRH 103 is referred to as a path loss reference point (PRP) for measuring a downlink path loss in some cases. Furthermore, the base station 101 or the RRH 103 may set a component carrier (CC) corresponding to a serving cell in the terminal 102.

At least one of the plurality of cell IDs may be set to be specific to a certain reception point (RP specific). In addition, at least one of the plurality of cell IDs may be set to be shared by a plurality of reception points (RP common). Further, at least one of the plurality of cell IDs may be set to be specific to a terminal (UE specific, Dedicated). Furthermore, at least one of the plurality of cell IDs may be set to be specific to a cell (Cell-specific, Common). For example, in a case where a plurality of reception points perform joint reception (JR), the terminal 102 may set a base sequence of an SRS on the basis of a cell ID which is set to be shared by reception points. Moreover, in a case where a plurality of reception points perform joint reception (JR), the terminal 102 may set a base sequence of an SRS on the basis of a cell ID which is set to be specific to a cell.

In addition, at least one of the plurality of cell IDs may be applied to a base sequence of a physical uplink shared channel demodulation reference signal (PUSCH DMRS). Further, at least one of the plurality of cell IDs may be applied to a base sequence of a physical uplink control channel demodulation reference signal (PUCCH DMRS).

In a case of performing point selection (PS), the terminal 102 may set a base sequence of an SRS on the basis of a cell ID which is set to be specific to a certain reception point. In addition, in a case of performing point selection (PS), the terminal 102 may set a base sequence of an SRS on the basis of a cell ID which is set to be specific to a terminal. Further, the point selection may be performed dynamically. Furthermore, the point selection may be performed in a semi-static manner. In a case where the point selection is performed dynamically, a control information field for the point selection may be added to a DCI format. Moreover, the presence of the control information field for the point selection may be recognized by the terminal 102 in a case where certain parameter information is set in the terminal 102.

FIG. 1 is a schematic diagram illustrating a communication system which performs data transmission according to the first embodiment of the present invention. In FIG. 1, the base station (macro base station) 101 performs transmission and reception of control information and information data via a downlink 105 and an uplink 106 in order to perform data communication with the terminal 102. Similarly, the RRH 103 performs transmission and reception of control information and information data via a downlink 107 and an uplink 108 in order to perform data communication with the terminal 102. As a line 104, a wired line such as an optical fiber or a wireless line using a relay technique may be used. In this case, the macro base station 101 and the RRH 103 use the same partial or whole frequency (resource), and thus total spectral efficiency (transmission capacity) within an area of coverage determined by the macro base station 101 can be improved. Such a network which consists of stations that use the same frequency between adjacent stations (for example, between the macro base station and the RRH) is referred to as a single frequency network (SFN). In addition, in FIG. 1, a cell ID is sent from the base station 101 and is used in a cell-specific reference signal (CRS) or a terminal-specific reference signal (downlink demodulation reference signal: DL DMRS; or UE-specific reference signal: UE-RS). Further, a cell ID may also be sent by the RRH 103. The cell ID which is sent by the RRH 103 may or not be the same as a cell ID which is sent from the base station 101. Furthermore, the base station 101 described in the following text/ section etc. may denote the base station 101 and the RRH 103. Moreover, the following description of the base station 101 and the RRH 103 may be applicable to the description of macro base stations and RRHs.

In addition, in descriptions of the embodiments of the present invention, for example, calculation of power includes calculation of a power value, computation of power includes computation of a power value, and a report of power includes a report of a power value. As mentioned above, the term "power" includes "a power value" as appropriate.

The number of resource blocks may be changed depending on a frequency bandwidth which is used by the communication system. For example, the base station 101 can use 6 to 110 resource blocks in a system band, and the unit thereof is referred to as a component carrier or a carrier component (CC). In addition, the base station 101 may configure a plurality of component carriers in the terminal 102 by using frequency aggregation (carrier aggregation). For example, the base station 101 may configure five component carriers each having a bandwidth of 20 MHz in the terminal 102 contiguously and/or non-contiguously in the frequency direction so that a total system bandwidth becomes 100 MHz. In addition, in a case where a carrier aggregation is configured, the terminal 102 recognizes an added serving cell as a secondary cell and recognizes a serving cell which is set at initial connection or during handover as a primary cell. Alternatively, in a case where information on a primary cell or information on a secondary cell is sent by the base station 101, the terminal 102 sets the information on the cell therein.

Here, a modulation process or an error correction coding process is performed on control information by using a predetermined modulation scheme and/or coding scheme, and thus a control signal is generated. The control signal is transmitted and received via a first control channel (first physical control channel) or a second control channel (second physical control channel) different from the first control channel. However, the physical control channel described here is a kind of physical channel and is a control channel defined as having a physical frame.

In addition, from one point of view, the first control channel (physical downlink control channel: PDCCH) is a physical control channel which uses the same transmission port (antenna port) as that of a cell-specific reference signal (CRS). Further, the second control channel (Enhanced PDCCH: E-PDCCH, extended PDCCH, X-PDCCH, or PDCCH on PDSCH) is a physical control channel which is transmitted via the same transmission port as that of a terminal-specific reference signal. The terminal 102 demodulates a control signal which is mapped to the first control channel by using the cell-specific reference signal and demodulates a control signal which is mapped to the second control channel by using the terminal-specific reference signal. The cell-specific reference signal, which is a reference signal common to all terminals 102 in a cell, is inserted into all resource blocks of a system band and can thus be used by any terminal 102. For this reason, the first control channel can be demodulated by any terminal 102. On the other hand, the terminal-specific reference signal is a reference signal which is inserted into only an assigned resource block, and a beamforming process can be adaptively performed thereon in the same manner as for a data signal. For this reason, an adaptive beamforming gain can be obtained in the second control channel.

In addition, from another point of view, the first control channel is a physical control channel of an OFDM symbol which is located at a front portion of a physical subframe, and may be allocated for the entire of a system bandwidth (component carrier or carrier component: CC) of the OFDM symbol. Further, the second control channel is a physical control channel of an OFDM symbol which is located further behind than the first control channel in the physical subframe, and may be allocated in some bands of a system bandwidth in the OFDM symbol. The first control channel is allocated on the OFDM symbol for a control channel only, located at the front portion of the physical subframe, and can thus be received and demodulated earlier than the OFDM symbol for a physical data channel, located at the rear portion thereof. Further, the terminal 102 which monitors an OFDM symbol for a control channel only can also receive the first control channel. Furthermore, a resource used in the first control channel is distributed and allocated for the entire bandwidth of CC, and thus inter-cell interference with the first control channel can be randomized. On the other hand, the second control channel is allocated on an OFDM symbol of the rear portion for a common channel (physical data channel) which is typically received by the terminal 102 which is currently performing communication. Moreover, the base station 101 performs frequency division multiplexing on the second control channel so as to perform orthogonal multiplexing (multiplexing without interference) on the second control channels or on the second control channel and the physical data channel.

Figure 2:
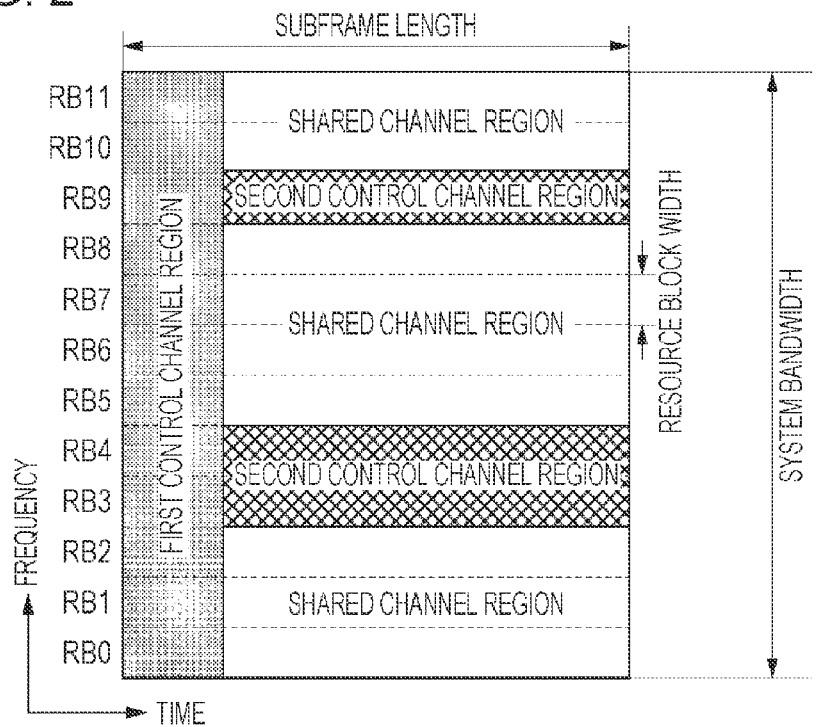
FIG. 2 is a diagram illustrating an example of channels which are mapped by a base station 101.

FIG. 2 is a diagram illustrating an example of channels mapped by the base station 101. FIG. 2 illustrates a case where a frequency band constituted by twelve pairs of resource blocks is used as the system bandwidth. The PDCCH which is the first control channel is allocated on one to three OFDM symbols allocated in a leading portion of a subframe. The first control channel in a frequency domain is allocated for the system bandwidth. In addition, a shared channel is allocated on OFDM symbols on which the first control channel is not allocated in the subframe.

Here, details of a structure of the PDCCH will be described. The PDCCH is constituted by a plurality of control channel elements (CCEs). The number of CCEs used in each downlink component carrier depends on the downlink component carrier bandwidth, the number of OFDM symbols constituting the PDCCH, and the number of transmission ports of a downlink reference signal corresponding to the number of transmission antennas of the base station 101 used for communication. The CCE is constituted by a plurality of downlink resource elements. In addition, the downlink resource element is a resource defined by a single OFDM symbol and a single sub-carrier.

A number (index) for identifying a CCE is added to the CCE used between the base station 101 and the terminal 102. The addition of a CCE number is performed on the basis of a predefined rule. Here, CCE_t indicates a CCE with a CCE number t. The PDCCH is constituted by an aggregation (CCE aggregation) including a plurality of CCEs. The number of CCEs included in the aggregation is referred to as a "CCE aggregation level". A CCE aggregation level forming the PDCCH is set by the base station 101 according to a coding rate which is set in the PDCCH, and the number of DCI bits included in the PDCCH. In addition, a combination of CCE aggregation levels which are available to the terminal 102 is defined in advance. Further, an aggregation including n CCEs is referred to as "CCE aggregation level n".

A single resource element group (REG) is constituted by four downlink resource elements which are contiguous to each other in the frequency domain. In addition, a single CCE is constituted by nine different REGs which are distributed to the frequency domain and the time domain. Specifically, in the entire downlink component carrier, interleaving is performed on all numbered REGs for each REG by using a block interleaver, and a single CCE is constituted by nine interleaved REGs which are numbered consecutively.

A search space (SS) for the PDCCH is set in each terminal 102. The SS is constituted by a plurality of CCEs. The SS is constituted by the plurality of CCEs which are numbered consecutively from a CCE with the smallest number, and the number of the plurality of CCEs which are numbered consecutively is defined in advance. The SS with each CCE aggregation level is constituted by an aggregation of a plurality of PDCCH candidates. The SS is sorted into a cell-specific search space (cell-specific SS: CSS) whose number is used in common in a cell from a CCE with the smallest number, and a terminal-specific search space (UE-specific SS: USS) whose number is specific to the terminal from the CCE with the smallest number. A PDCCH to which control information read by a plurality of terminals 102, such as system information or information on paging, is assigned, or a PDCCH to which a downlink/uplink grant indicating an indication for fallback to a lower transmission method or random access is assigned, is allocated in the CSS.

The base station 101 transmits a PDCCH by using one or more CCEs in the SS set in the terminal 102. The terminal 102 decodes a received signal by using one or more CCEs in the SS, and performs a process (referred to as blind decoding) for detecting the PDCCH which is directed to the terminal. The terminal 102 sets a different SS for each CCE aggregation level. Then, the terminal 102 performs blind decoding by using a predefined combination of CCEs in the different SS for each CCE aggregation level. In other words, the terminal 102 performs the blind decoding on each PDCCH candidate in the different SS for each CCE aggregation level. This series of processes in the terminal 102 is referred to as PDCCH monitoring in some cases.

The second control channel (Enhanced PDCCH: E-PDCCH, extended PDCCH, X-PDCCH, or PDCCH on PDSCH) is allocated on OFDM symbols on which the first control channel is not allocated. The second control channel and the shared channel are allocated in different resource blocks. In addition, the resource blocks in which the second control channel and the shared channel can be allocated are set in each terminal 102. Further, a shared channel (data channel) directed to the terminal or another terminal can be set in a resource block in which the second control channel region can be configured. Furthermore, a starting position of an OFDM symbol on which the second control channel is allocated may be set by using the same method as in the shared channel. In other words, the base station 101 can set the starting position by setting some resources of the first control channel as a physical control format indicator channel (PCFICH), and by mapping information indicating the number of OFDM symbols of the first control channel thereto.

In addition, a starting position of an OFDM symbol on which the second control channel is allocated may be predefined, and, for example, may be a fourth OFDM symbol allocated in a leading portion of a subframe. In this case, in a case where the number of OFDM symbols of the first control channel is two or less, second and third OFDM symbols in pairs of resource blocks in which the second control channel is allocated are set to be null without mapping a signal thereto. In addition, other control signals or data signals may be mapped to a resource which is set to be null. Further, a starting position of an OFDM symbol constituting the second control channel may be set on the basis of control information of higher layers. Furthermore, the subframe illustrated in FIG. 2 is subject to time division multiplexing (TDM), and the second control channel may be set in each subframe.

As an SS for searching for an E-PDCCH, the SS may include a plurality of CCEs in the same manner as in the PDCCH. In other words, a resource element group is constituted by a plurality of resource elements in a region which is set as the second control channel region illustrated in FIG. 2, and a CCE is further constituted by a plurality of resource elements. Thus, an SS for searching for (monitoring) an E-PDCCH can be formed in the same manner as in the PDCCH described above.

Alternatively, as an SS for searching for an E-PDCCH, the SS may be constituted by one or more resource blocks unlike in the PDCCH. In other words, in the unit of the resource blocks in the region set as the second control channel region illustrated in FIG. 2, the SS for searching for an E-PDCCH is constituted by an aggregation (RB aggregation) including one or more resource blocks. The number of RBs included in this aggregation is referred to as an "RB aggregation level". The SS is constituted by a plurality of RBs which are numbered consecutively from the RB with the smallest number, and the number of the plurality of RBs which are numbered consecutively is defined in advance. The SS with each RB aggregation level is constituted by an aggregation of a plurality of E-PDCCH candidates.

The base station 101 transmits an X-PDCCH by using one or more RBs inside an SS which is set in the terminal 102. The terminal 102 decodes a received signal by using the one or more RBs in the SS, and performs a process (referred to as blind decoding) for detecting the E-PDCCH which is directed to the terminal. The terminal 102 sets a different SS for each RB aggregation level. Then, the terminal 102 performs blind decoding by using a predefined combination of RBs in the different SS for each RB aggregation level. In other words, the terminal 102 performs the blind decoding on each E-PDCCH candidate (monitors the E-PDCCH) in the different SS for each CCE aggregation level. In a case where the blind decoding is performed, the terminal 102 may specify a DCI format which will be included in the PDCCH. Since the number of bits differs depending on the type of DCI format, the terminal 102 can determine the type of DCI format on the basis of the number of bits forming the DCI format.

In a case where the base station 101 notifies the terminal 102 of a control signal by using the second control channel, the base station 101 sets the monitoring of the second control channel in the terminal 102, and maps the control signal for the terminal 102 to the second control channel. In addition, in a case where the base station 101 notifies the terminal 102 of a control signal by using the first control channel, the base station 101 does not configure the monitoring of the second control channel in the terminal 102, and maps the control signal for the terminal 102 to the first control channel.

Meanwhile, in a case where the monitoring of the second control channel is set by the base station 101, the terminal 102 blind-decodes the control signal for the terminal 102 with respect to the second control channel. In addition, in a case where the monitoring of the second control channel is not set by the base station 101, the terminal 102 does not blind-decode the control signal for the terminal 102 with respect to the second control channel.

Hereinafter, a control signal mapped to the second control channel will be described. A control signal mapped to the second control channel is processed in the unit of control information for a single terminal 102, and undergoes a scrambling process, a modulation process, a layer mapping process, a precoding process, and the like in the same manner as a data signal. In addition, the control signal mapped to the second control channel undergoes the precoding process which is specific to the terminal 102, along with a terminal-specific reference signal. At this time, the precoding process is preferably performed by using a precoding weight which is suitable for the terminal 102. For example, a precoding process which is common to a signal of the second control channel and the terminal-specific reference signal in the same resource block is performed.

In addition, the control signal mapped to the second control channel may include different parameters of control information in a forward slot (first slot) and a backward slot (second slot) of a subframe and may be mapped thereto. For example, a control signal including assignment information (downlink assignment information) of a data signal which is transmitted to the terminal 102 by the base station 101 to a downlink shared channel is mapped to the forward slot of the subframe. Further, a control signal including assignment information (uplink assignment information) of a data signal which is transmitted to the base station 101 by the terminal 102 to an uplink shared channel is mapped to the backward slot of the subframe. Furthermore, a control signal including uplink assignment information for the terminal 102 of the base station 101 may be mapped to the forward slot of the subframe, and a control signal including downlink assignment information for the base station 101 of the terminal 102 may be mapped to the backward slot of the subframe.

In addition, a data signal for the terminal 102 or another terminal 102 may be mapped to the forward slot and/or the backward slot in the second control channel. Further, a control signal for the terminal 102 or a terminal (including the terminal 102) in which the second control channel is set may be mapped to the forward slot and/or the backward slot in the second control channel.

In addition, the terminal-specific reference signal is multiplexed into a control signal mapped to the second control channel by the base station 101. The terminal 102 demodulates the control signal mapped to the second control channel by using the multiplexed terminal-specific reference signal. Further, terminal-specific reference signals of some or all antenna ports 7 to 14 are used. In this case, the control signal mapped to the second control channel may be transmitted in a MIMO manner by using the plurality of antenna ports.

For example, the terminal-specific reference signal in the second control channel is transmitted by using a predefined antenna port and scramble code. Specifically, the terminal-specific reference signal in the second control channel is generated by using a predefined antenna port 7 and scramble ID.

In addition, for example, the terminal-specific reference signal in the second control channel is generated by using an antenna port and a scramble ID which may be sent through RRC signaling or PDCCH signaling. Specifically, as an antenna port which is used for the terminal-specific reference signal in the second control channel, either the antenna port 7 or the antenna port 8 may be notified through RRC signaling or PDCCH signaling. As a scramble ID which is used for the terminal-specific reference signal in the second control channel, any one of values of 0 to 3 may be notified through RRC signaling or PDCCH signaling.

Figure 3:
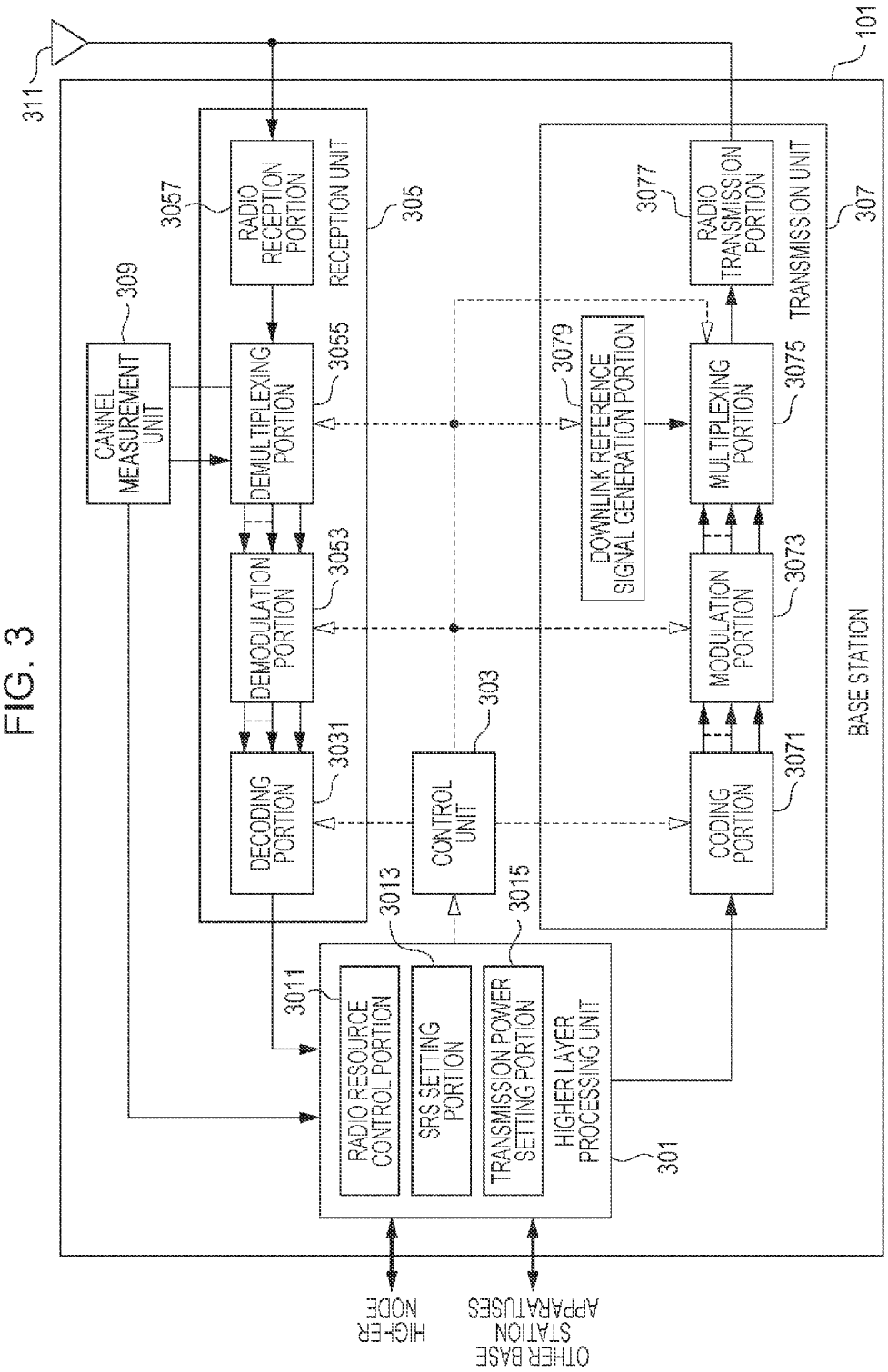
FIG. 3 is a schematic block diagram illustrating a configuration of the base station 101 according to the first embodiment of the present invention.

FIG. 3 is a schematic block diagram illustrating a configuration of the base station 101 of the present invention. As illustrated in FIG. 3, the base station 101 includes a higher layer processing unit 301, a control unit 303, a reception unit 305, a transmission unit 307, a channel measurement unit 309, and a transmission and reception antenna 311. In addition, the higher layer processing unit 301 includes a radio resource control portion 3011, an SRS setting portion 3013, and a transmit power setting portion 3015. Further, the reception unit 305 includes a decoding portion 3051, a demodulation portion 3053, a demultiplexing portion 3055, and a radio reception portion 3057. Furthermore, the transmission unit 307 includes a coding portion 3071, a modulation portion 3073, a multiplexing portion 3075, a radio transmission portion 3077, and a downlink reference signal generation portion 3079.

The higher layer processing unit 301 performs processes on a medium access control (MAC) layer, a packet data convergence protocol (PDCP) layer, a radio link control (RLC) layer, and a radio resource control (RRC) layer.

The radio resource control portion 3011 of the higher layer processing unit 301 generates information which will be allocated in each channel of a downlink or acquires the information from a higher node, and outputs the information to the transmission unit 307. In addition, among radio resources of an uplink, the radio resource control portion 3011 assigns a radio resource in which the terminal 102 allocates a physical uplink shared channel (PUSCH) which is data information of the uplink. In addition, among radio resources of a downlink, the radio resource control portion 3011 determines a radio resource in which a physical downlink shared channel (PDSCH) is allocated which is data information of the downlink. The radio resource control portion 3011 generates downlink control information indicating assignment of the radio resource and transmits the information to the terminal 102 via the transmission unit 307. In a case where the radio resource in which the PUSCH is allocated is assigned, the radio resource control portion 3011 preferentially assigns a radio resource with good channel quality on the basis of a channel measurement result of the uplink which is input from the channel measurement unit 309.

The higher layer processing unit 301 generates control information for controlling the reception unit 305 and the transmission unit 307 and outputs the control information to the control unit 303 on the basis of uplink control information (UCI) which is sent from the terminal 102 by using a physical uplink control channel (PUCCH), and circumstances of a buffer which is sent from the terminal 102 or various parameters of configuration information of each terminal 102 set by the radio resource control portion 3011. In addition, the UCI includes at least one of ACK/NACK, channel quality indicator (CQI), and a scheduling request (SR).

The SRS setting portion 3013 sets a sounding subframe which is a subframe used to reserve a radio resource for the terminal 102 transmitting a sounding reference signal (SRS), and a bandwidth of the radio resource which is reserved for transmitting the SRS in the sounding subframe, generates information regarding the setting as system information (SI), and broadcasts the system information via the transmission unit 307 by using a PDSCH. In addition, the SRS setting portion 3013 sets a subframe for periodically transmitting a periodic SRS (P-SRS) to each terminal 102, a frequency band, and a cyclic shift amount used in a Constant Amplitude Zero Auto-Correlation (CAZAC) sequence of the P-SRS, generates a signal including information regarding the setting as a radio resource control (RRC) signal, and notifies each terminal 102 thereof via the transmission unit 307 by using the PDSCH. In addition, the P-SRS is referred to as a trigger type 0 SRS or a type 0 triggered SRS in some cases. Further, the above-described system information is referred to as a system information block (SIB) in some cases. Furthermore, the sounding subframe is referred to as an SRS subframe or an SRS transmission subframe in some cases.

In addition, the SRS setting portion 3013 sets a frequency band for transmitting an aperiodic SRS (A-SRS) to each terminal 102, and a cyclic shift amount used in a CAZAC sequence of the A-SRS, generates a signal including the setting as a radio resource control signal, and notifies each terminal 102 thereof via the transmission unit 307 by using the PDSCH. Further, in a case where the terminal 102 is requested to transmit the A-SRS, the SRS setting portion generates an SRS request indicating whether or not the terminal 102 is requested to transmit the A-SRS, and notifies the terminal 102 thereof by using a PDCCH or an E-PDCCH via the transmission unit 307. Here, the PDCCH is referred to as a first control channel region and the E-PDCCH is referred to as a second control channel region in some cases. Furthermore, the radio resource control signal is referred to as higher layer signaling or a higher layer signal in some cases. Moreover, the radio resource control signal may collectively refer to a shared control channel or a dedicated control channel. In addition, the radio resource control signal may include system information.

The SRS request is included in a downlink control information (DCI) format. In addition, the DCI format is transmitted to the terminal 102 in a control channel region (PDCCH or E-PDCCH). Further, the DCI format including the SRS request includes an uplink grant or a downlink assignment. A plurality of types of DCI formats are prepared, and the SRS request is included in at least one thereof. For example, the SRS request may be included in a DCI format 0 which is an uplink grant. Furthermore, the SRS request may be included in a DCI format 1A which is a downlink assignment. Moreover, the SRS request may be included in a DCI format 4 which is an uplink grant for MIMO. In addition, the SRS request applied only to TDD may be included in a DCI format 2B/2C for DL-MIMO. Further, the DCI format for MIMO is a DCI format associated with information regarding a transport block or information regarding precoding.

Furthermore, the SRS request may be controlled with 1-bit information. In other words, whether or not transmission of an A-SRS is requested can be controlled with 1-bit information. For example, in a case where the base station 101 sets the SRS request to information bits of a first value (for example, '0'), control may be performed so that the terminal 102 does not transmit the A-SRS, and in a case where the base station sets the SRS request to information bits of a second value (for example, '1'), control may be performed so that the terminal 102 transmits the A-SRS. Moreover, the SRS request may be controlled with 2-bit information. In other words, not only information indicating whether or not the A-SRS is to be transmitted but also various SRS parameters (or a parameter set) may be associated with indexes indicated by the 2-bit information. Here, the SRS parameters may include a transmission bandwidth (srs-BandwidthAp-r10). In addition, the SRS parameters may include the number of antenna ports of an SRS (srs-AntennaPort). Further, the SRS parameters may include cyclic shift for an SRS (cyclicShift). The SRS parameters may include a transmission comb (transmissionComb) which is a frequency offset arranged in a comb shape. The SRS parameters may include a frequency position (freqDomainPosition). Furthermore, the SRS parameters may include a periodicity and a subframe offset (srs-ConfigIndex). Moreover, the SRS parameters may include a hopping bandwidth (srs-HoppingBandwidth) indicating a region (bandwidth) of frequency hopping of an SRS. In addition, the SRS parameters may include the number of times of transmission (duration) of an SRS. Further, the SRS parameters may include a power offset of an SRS (pSRS-Offset). Furthermore, the SRS parameters may include a parameter (srs-cellID) for setting a base sequence of an SRS. Moreover, the SRS parameters may include a bandwidth configuration of an SRS (srs-BandwidthConfig). In addition, the SRS parameters may include a subframe configuration of an SRS (srs-SubframeConfig). Further, the SRS parameters may include information (ackNackSRS-SimultaneousTransmission) for indicating whether or not an SRS and ACK/NACK are simultaneously transmitted. Furthermore, the SRS parameters may include information (srs-MaxUpPts) indicating the number of transmission symbols of an SRS in UpPTS. Moreover, the power offset of an SRS may be set in correlation with various SRS parameter sets. For example, a first SRS parameter set may be correlated with a first SRS power offset, and a second SRS parameter set may be correlated with a second SRS power offset. For example, $P_{SRS\_OFFSET}(0)$ may be configured as a power offset of a P-SRS, $P_{SRS\_OFFSET}(1)$ may be set as a power offset of an A-SRS, and $P_{SRS\_OFFSET}(2)$ may be set as a power offset of an SRS for DL CSI. In addition, $P_{SRS\_OFFSET}(3)$ may be set as a power offset of an SRS for UL CSI. Further, the SRS parameters may include a cell ID which is configured in a base sequence. Furthermore, the SRS parameters may be configured as a SRS parameter set. In other words, the SRS parameter set may include various SRS parameters. For example, if information represented in two bits is represented in information bits which are set to four values including a first value to a fourth value, in a case where the base station 101 sets the SRS request to information bits of the first value (for example, '01'), control may be performed so that the terminal 102 transmits an A-SRS which is generated by using a first SRS parameter set; in a case where the base station sets the SRS request to information bits of the second value (for example, '10'), control may be performed so that the terminal 102 transmits an A-SRS which is generated by using a second SRS parameter set; in a case where the base station sets the SRS request to information bits of the third value (for example, '11'), control may be performed so that the terminal 102 transmits an A-SRS which is generated by using a third SRS parameter set; and in a case where the base station sets the SRS request to information bits of a fourth value (for example, '00'), control may be performed so that the terminal 102 does not transmit an A-SRS. In other words, the base station 101 and the RRH 103 may instruct the terminal 102 not to perform a request of an A-SRS transmission. The above-described respective SRS parameter sets may be set so that a value (or an index associated with an SRS parameter) of at least one SRS parameter of the various SRS parameters included in the SRS parameter sets may be a different value. In addition, the SRS parameter set includes at least one SRS parameter of the plurality of SRS parameters. Further, the A-SRS is referred to as a trigger type 1 SRS or a type 1 triggered SRS in some cases. Furthermore, the SRS parameter set is referred to as SRS config (SRS-Config). Moreover, an SRS request indicating that the terminal 102 is requested to transmit an A-SRS is referred to as a positive SRS request in some cases. In addition, an SRS request indicating that the terminal 102 is not requested to transmit an A-SRS is referred to as a negative SRS request in some cases.

Further, the SRS parameter set may be configured for each DCI format. In other words, an SRS parameter set corresponding to an SRS request included in a DCI format may be configured. That is, an SRS parameter set corresponding to the DCI format 0 may be configured, and an SRS parameter set corresponding to the DCI format 1A may be configured. These parameters of configuration information are set by the SRS 5013.

In addition, the SRS parameter set may be set in an A-SRS and a P-SRS independently. However, the SRS setting portion 3013 may set some parameters to be shared by the A-SRS and the P-SRS. For example, an SRS subframe for a certain serving cell may be shared by the A-SRS and the P-SRS. A maximum bandwidth of an SRS for a certain serving cell may be shared by the A-SRS and the P-SRS. A hopping bandwidth for a certain serving cell may be shared by the A-SRS and the P-SRS.

Further, the SRS parameter set may be shared by DCI formats. Furthermore, the SRS parameter set may be set in each DCI format separately. Moreover, some SRS parameters may be shared by SRS parameter sets. For example, the periodicity of an SRS and the subframe offset may be shared by SRS parameter sets. In addition, the hopping bandwidth may be shared by SRS parameter sets.

Further, the SRS setting portion 3013 sets information (srs-ActivateAp-r10) indicating whether or not an SRS request is added to a DCI format, and transmits the information to the terminal 102 via the transmission unit 307. The terminal 102 can recognize that the SRS request is added to the DCI format on the basis of the information and can thus appropriately demodulate the received DCI format. For example, in a case where information indicating whether or not an SRS request is added to a DCI format indicates that the SRS request is added to the DCI format, the terminal 102 recognizes that the SRS request is added to the DCI format 0 or the DCI format 1A/2B/2C and performs demodulation and decoding processes.

In addition, the SRS setting portion 3013 sets a cell ID which is required for setting a base sequence of an SRS, and transmits the cell ID from the transmission unit 307 to the terminal 102 via the control unit 303 by using an RRC signal. Further, such a cell ID may be individually set in an SRS parameter set. Furthermore, such a cell ID may be set in each DCI format.

The transmit power setting portion 3015 sets transmit power of a PRACH, a PUCCH, a PUSCH, a P-SRS, and an A-SRS. Specifically, the transmit power setting portion 3015 sets transmit power of the terminal 102 in consideration of interference with an adjacent base station so that the PUSCH and the like achieve predetermined channel quality, on the basis of information indicating an interference level from the neighbor base station(s) 101, information indicating an interference level which is applied to the neighbor base station(s) and which is sent from the neighbor base station(s), channel quality which is input from the channel measurement unit 309, and the like. Information indicating the setting is transmitted to the terminal 102 via the transmission unit 307.

Specifically, the transmit power setting portion 3015 sets $P_{O\_PUSCH}$, $\alpha$, a power offset $P_{SRS\_OFFSET}(0)$ for a PSRS (first offset value (pSRS-Offset)), and a power offset $P_{SRS\_OFFSET}(1)$ for an A-SRS (second offset value (pSRS-OffsetAp-r10)) of the following Equation, generates a signal including information indicating the settings as an RRC signal, and notifies each terminal 102 thereof via the transmission unit 307 by using a PDSCH. In addition, the transmit power setting portion 3015 sets a TPC command for calculating f(i) of the following Equation, generates a signal indicating the TPC command, and notifies each terminal 102 thereof by using a PDCCH via the transmission unit 307. Further, $\alpha$ described here is used to calculate a transmit power in the following Equation along with a path loss value, and is a coefficient indicating an extent of compensation of a path loss, that is, a coefficient (an attenuation coefficient or a path loss compensation coefficient) for determining to what extent power is increased or decreased according to the path loss. $\alpha$ typically takes values of 0 to 1, and if $\alpha$ is 0, power compensation according to a path loss is not performed, and if $\alpha$ is 1, transmit power of the terminal 102 is increased or decreased so that a path loss does not influence the base station 101. Furthermore, a TPC command of an SRS is set in consideration of a state of the terminal 102, a signal indicating the TPC command is generated, and each terminal 102 is notified of the signal via the transmission unit 307 by using a PDCCH. Moreover, a DCI format including the TPC command is generated, and each terminal 102 is notified of the DCI format via the transmission unit 307 by using the PDCCH. The DCI format including the TPC command may be transmitted by using an E-PDCCH.

The control unit 303 generates control signals for controlling the reception unit 305 and the transmission unit 307 on the basis of the control information from the higher layer processing unit 301. The control unit 303 outputs the generated control signals to the reception unit 305 and the transmission unit 307 so as to control the reception unit 305 and the transmission unit 307.

The reception unit 305 demultiplexes, demodulates and decodes a received signal which is received from the terminal 102 via the transmission and reception antenna 311, in response to the control signal which is input from the control unit 303, and outputs the decoded information to the higher layer processing unit 301. The radio reception portion 3057 converts (down-converts) an uplink signal which is received via the transmission and reception antenna 311 into an intermediate frequency (IF) so as to remove unnecessary frequency components, controls an amplification level so that a signal level is appropriately maintained, orthogonally demodulates the received signal on the basis of an in-phase component and an orthogonal component thereof, and converts an orthogonally demodulated analog signal into a digital signal. The radio reception portion 3057 removes a part corresponding to a guard interval (GI) from the converted digital signal. The radio reception portion 3057 performs fast Fourier transform (FFT) on the signal from which the guard interval is removed, so as to extract a signal of a frequency domain which is thus output to the demultiplexing portion 3055.

The demultiplexing portion 3055 demultiplexes the signal which is input from the radio reception portion 3057, into signals such as a PUCCH, a PUSCH, an UL DMRS (a PUSCH DMRS or a PUCCH DMRS), and an SRS. In addition, this demultiplexing is performed on the basis of assignment information of radio resources which is determined in advance by the base station 101 and of which notification is sent to each terminal 102. Further, the demultiplexing portion 3055 compensates for channels such as the PUCCH and the PUSCH on the basis of estimation values of channels which are input from the channel measurement unit 309. Furthermore, the demultiplexing portion 3055 outputs the demultiplexed UL DMRSs and the SRS to the channel measurement unit 309.

The demodulation portion 3053 performs inverse discrete Fourier transform (IDFT) on the PUSCH so as to acquire modulation symbols, and demodulates the received signal on each of modulation symbols of the PUCCH and the PUSCH, by using a modulation method which is predefined, such as binary phase shift keying (BPSK), quadrature phase shift keying (QPSK), 16 quadrature amplitude modulation (16 QAM), or 64 quadrature amplitude modulation (64 QAM), or a modulation method of which the base station 101 notifies the terminal 102 in advance in downlink control information.

The decoding portion 3051 decodes coded bits of the demodulated PUCCH and PUSCH at a coding rate which is predefined in a predefined coding method or of which the base station 101 notifies the terminal 102 in an uplink grant (UL grant), and outputs decoded data information and uplink control information to the higher layer processing unit 301.

The channel measurement unit 309 measures estimation values of the channels, quality of the channels, and the like on the basis of the uplink demodulation reference signal UL DMRS and the SRS which are input from the demultiplexing portion 3055, and outputs the measurement results to the demultiplexing portion 3055 and the higher layer processing unit 301.

The transmission unit 307 generates a reference signal of a downlink (downlink reference signal) in response to the control signal which is input from the control unit 303, codes and modulates data information and downlink control information which are input from the higher layer processing unit 301, multiplexes a PDCCH, a PDSCH, and the downlink reference signal, and transmits a signal to the terminal 102 via the transmission and reception antenna 311.

The coding portion 3071 performs coding such as turbo coding, convolutional coding, or block coding on the downlink control information and the data information which are input from the higher layer processing unit 301. The modulation portion 3073 modulates the coded bits in a modulation method such as QPSK, 16 QAM, or 64 QAM. The downlink reference signal generation portion 3079 generates sequences which are obtained by a predefined rule and are known to the terminal 102, as the downlink reference signal, on the basis of a cell ID for identifying the base station 101. The multiplexing portion 3075 multiplexes each modulated channel and the generated downlink reference signal. In addition, the cell ID is referred to as a cell identity in some cases.

The radio transmission portion 3077 performs inverse fast Fourier transform (IFFT) on a multiplexed modulation symbol so as to perform modulation thereon in an OFDM method; adds a guard interval to an OFDM symbol which is OFDM-modulated, so as to generate a digital signal with a base band; converts the digital signal with the base band into an analog signal; generates an in-phase component and an orthogonal component with an intermediate frequency from the analog signal; removes a remaining frequency component for an intermediate frequency band; converts (up-converts) the signal with the intermediate frequency into a signal with a radio frequency (RF); removes a remaining frequency component therefrom; amplifies the power of the signal; and outputs the signal to the transmission and reception antenna 311 so that the signal is transmitted. In addition, although not illustrated here, the RRH 103 is assumed to have the same configuration as that of the base station 101.

Figure 4:
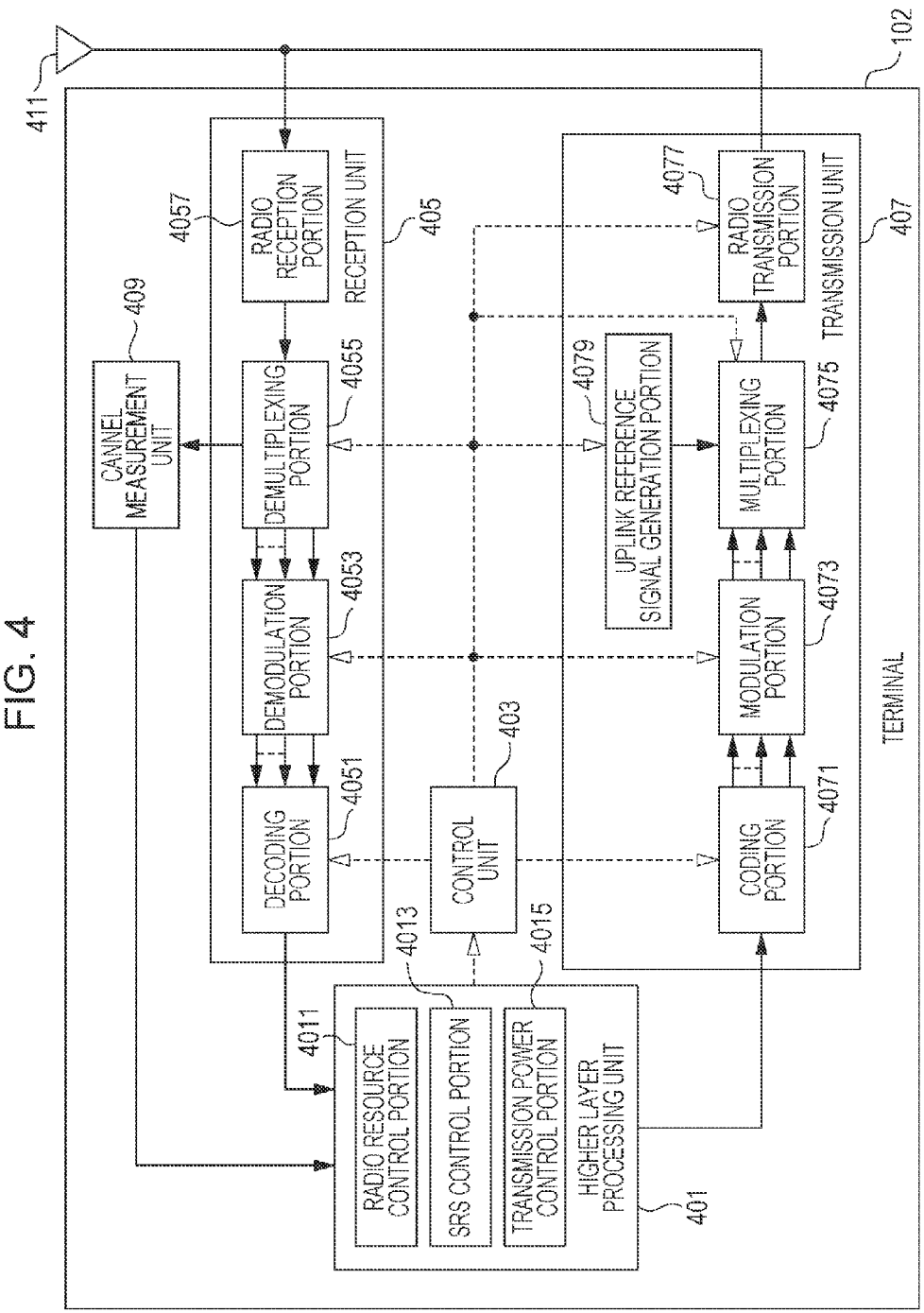
FIG. 4 is a schematic block diagram illustrating a configuration of a terminal 102 according to the first embodiment of the present invention.

FIG. 4 is a schematic block diagram illustrating a configuration of the terminal 102 according to the present embodiment. As illustrated in FIG. 4, the terminal 102 includes a higher layer processing unit 401, a control unit 403, a reception unit 405, a transmission unit 407, a channel measurement unit 409, and a transmission and reception antenna 411. In addition, the higher layer processing unit 401 includes a radio resource control portion 4011, an SRS control portion 4013, and a transmission power control portion 4015. Further, the reception unit 405 includes a decoding portion 4051, a demodulation portion 4053, a demultiplexing portion 4055, and a radio reception portion 4057. Furthermore, the transmission unit 407 includes a coding portion 4071, a modulation portion 4073, a multiplexing portion 4075, and a radio transmission portion 4077.

The higher layer processing unit 401 outputs uplink data information which is generated through a user's operation or the like, to the transmission unit 407. In addition, the higher layer processing unit 401 performs processes on a medium access control (MAC) layer, a packet data convergence protocol (PDCP) layer, a radio link control (RLC) layer, and a radio resource control (RRC) layer.

The radio resource control portion 4011 of the higher layer processing unit 401 manages various parameters of configuration information of the terminal. In addition, the radio resource control portion 4011 generates information which is to be allocated in each channel of an uplink, and outputs the information to the transmission unit 407. The radio resource control portion 4011 generates control information for controlling the reception unit 405 and the transmission unit 407 on the basis of downlink control information which is sent from the base station 101 by using a PDCCH, and the various parameters of configuration information of the terminal which are set in radio resource control information which is sent by using a PDSCH and are managed by the radio resource control portion 4011. The generated control information is output to the control unit 403.

The SRS control portion 4013 of the higher layer processing unit 401 acquires, from the reception unit 405, information indicating a sounding subframe which is a subframe used to reserve a radio resource for transmitting an SRS which is currently being broadcast by the base station 101 and a bandwidth of the radio resource which is reserved for transmitting the SRS in the sounding subframe; information indicating a subframe for transmitting a P-SRS of which the base station 101 has notified the terminal, a frequency band, and an amount of cyclic shift used in a CAZAC sequence of the P-SRS; and information indicating a frequency band for transmitting an A-SRS of which the base station 101 has notified the terminal and an amount of cyclic shift used in a CAZAC sequence of the A-SRS.

The SRS control portion 4013 controls transmission of an SRS on the basis of the information. Specifically, the SRS control portion 4013 controls the transmission unit 407 to transmit the P-SRS once or periodically on the basis of the information regarding the P-SRS. In addition, in a case where transmission of the A-SRS is requested in an SRS request input from the reception unit 405, the SRS control portion 4013 transmits the A-SRS a predefined number of times (for example, once) on the basis of information regarding the A-SRS.

Further, in relation to an SRS request included in a certain DCI format, the SRS control portion 4013 controls an uplink reference signal generation portion 4079 so that an A-SRS is generated on the basis of a SRS parameter set which is set according to a value of information bits set in the SRS request.

The transmission power control portion 4015 of the higher layer processing unit 401 outputs control information to the control unit 403 so that transmission power is controlled on the basis of information indicating settings of the transmit power of a PRACH, a PUCCH, a PUSCH, a P-SRS, and an A-SRS. Specifically, the transmission power control portion 4015 controls the transmit power of the P-SRS and the transmit power of the A-SRS from the following Equation on the basis of $P_{O\_PUSCH}$, a, the power offset $P_{SRS\_OFFSET}$ (0) for the PSRS (first offset value (pSRS-Offset)), and the power offset $P_{SRS\_OFFSET}$(1) for the A-SRS (second offset value (pSRS-OffsetAp-r10)) acquired from the reception unit 405. In addition, the transmission power control portion 4015 changes parameters depending on whether $P_{SRS\_OFFSET}$ is related to the P-SRS or the A-SRS. Further, in a case where $P_{O\_PUSCH}$, $P_{O\_PUCCH}$, α, $P_{SRS\_OFFSET}$, and the like are set in a plurality, control information indicating by using which a the uplink transmission power control is performed is also output to the control unit 403.

In addition, in a case where SRS parameter sets corresponding to SRS requests of the DCI formats 0, 1A, 2B and 2C from the base station 101 and/or the RRH 103 are set in the higher layer processing unit 401, the terminal 102 recognizes that the SRS request is added to each DCI format. The control unit 403 notifies the reception unit 405 of the information, and the reception unit 405 recognizes that the SRS request is added to each DCI format, so as to perform demodulation and decoding processes. In other words, the reception unit 405 recognizes that a field (information bit) for the SRS request is added to the DCI format, and performs demodulation and decoding processes on the DCI format in consideration of the addition. That is, since the size (bit size) of a DCI format changes depending on whether or not there is an SRS request, the reception unit 405 performs the demodulation and decoding processes on the DCI format in consideration of the change.

In addition, in a case where power offsets of an SRS corresponding to SRS requests of the DCI formats 0, 1A, 2B, 2C, and 4 are set in the higher layer processing unit 401, the terminal 102 recognizes that a TPC command for the SRS is added to each DCI format, and performs the demodulation and decoding processes on the DCI format in consideration of the addition. That is, since the size (bit size) of a DCI format changes depending on whether or not there is a TPC command for the SRS, the reception unit 405 performs the demodulation and decoding processes on the DCI format in consideration of the change.

The control unit 403 generates control signals for controlling the reception unit 405 and the transmission unit 407 on the basis of the control information from the higher layer processing unit 401. The control unit 403 outputs the generated control signals to the reception unit 405 and the transmission unit 407 so as to control the reception unit 405 and the transmission unit 407.

The reception unit 405 demultiplexes, demodulates and decodes a received signal which is received from the base station 101 via the transmission and reception antenna 411, in response to the control signal which is input from the control unit 403, and outputs the decoded information to the higher layer processing unit 401.

The radio reception portion 4057 converts (down-converts) a downlink signal which is received via each reception antenna into an intermediate frequency (IF) so as to remove unnecessary frequency components, controls an amplification level so that a signal level is appropriately maintained, orthogonally demodulates the received signal on the basis of an in-phase component and an orthogonal component thereof, and converts an orthogonally demodulated analog signal into a digital signal. The radio reception portion 4057 removes a portion corresponding to a guard interval from the converted digital signal, and performs fast Fourier transform on the signal from which the guard interval is removed, so as to extract a signal of a frequency domain.

The demultiplexing portion 4055 demultiplexes the extracted signal into a physical downlink control channel (PDCCH), a PDSCH, and a downlink reference signal (DRS). In addition, this demultiplexing is performed on the basis of assignment information of radio resources which is sent via downlink control information. Further, the demultiplexing portion 4055 compensates for channels such as the PDCCH and the PDSCH on the basis of estimation values of channels which are input from the channel measurement unit 409. Furthermore, the demultiplexing portion 4055 outputs the demultiplexed downlink reference signal to the channel measurement unit 409.

The demodulation portion 4053 demodulates the PDCCH in a QPSK modulation method and outputs a result to the decoding portion 4051. The decoding portion 4051 tries to decode the PDCCH, and if the decoding is successful, the decoded downlink control information is output to the higher layer processing unit 401. The demodulation portion 4053 demodulates the PDSCH in a modulation method such as QPSK, 16 QAM, or 64 QAM, which is sent via the downlink control information, and outputs the result to the decoding portion 4051. The decoding portion 4051 decodes the coding rate which has been sent via the downlink control information, and outputs decoded data information to the higher layer processing unit 401.

The channel measurement unit 409 measures a path loss of a downlink on the basis of the downlink reference signal which is input from the demultiplexing portion 4055, and outputs the measured path loss to the higher layer processing unit 401. In addition, the channel measurement unit 409 calculates an estimation value of a channel of the downlink on the basis of the downlink reference signal, and outputs the estimation value to the demultiplexing portion 4055.

Further, the channel measurement unit 409 measures reference signal received power (RSRP) on the basis of at least one downlink reference signal of a cell-specific reference signal (CRS), a terminal-specific reference signal (a UE-specific reference signal: UE-RS, or a downlink demodulation reference signal: DL DMRS), and a channel state information reference signal (CSI-RS) which are the downlink reference signals, and estimates reference signal received power of the other downlink reference signals on the basis of the measurement result thereof. For example, in a case where, for the UERS or the CSI-RS, a value of a transmit power (referenceSignalPower) of the CRS is sent from the base station 101, and a power ratio or a power offset ratio with the CRS or the PDSCH is sent, the channel measurement unit 409 measures RSRP of the CRS and estimates reference signal received power of the other downlink reference signals from the power ratio which has been sent. In addition, the power ratio is referred to as an energy per resource element (EPRE) ratio in some cases.

The transmission unit 407 generates an UL DMRS and/or an SRS in response to the control signal which is input from the control unit 403, codes and modulates data information which is input from the higher layer processing unit 401, multiplexes a PUCCH, a PUSCH, and the generated UL DMRS and/or the SRS, adjusts transmit power of the PUCCH, the PUSCH, the UL DMRS, and the SRS, and transmits the channels and the signals to the base station 101 via the transmission and reception antenna 411.

The coding portion 4071 performs coding such as turbo coding, convolutional coding, or block coding on the uplink control information and the data information which are input from the higher layer processing unit 401. The modulation portion 4073 modulates the coding bits which are input from the coding portion 4071 by a modulation method such as BPSK, QPSK, 16 QAM, or 64 QAM.

The uplink reference signal generation portion 4079 generates CAZAC sequences which are obtained by a predefined rule and are known to the base station 101, on the basis of a cell ID for identifying the base station 101, bandwidths in which the UL DMRS and the SRS are allocated, and the like. In addition, the uplink reference signal generation portion 4079 gives cyclic shift to the generated CAZAC sequences of the UL DMRS and the SRS in response to the control signal which is input from the control unit 403. Further, the CAZAC sequences may be obtained by using a base sequence described later.

In addition, in a case where a cell ID is sent from the base station 101 or the RRH 103 via a higher layer, the uplink reference signal generation portion 4079 sets a base sequence of the UL DMRS or the SRS on the basis of the cell ID. A method of setting the base sequence may employ the following Equation.

In response to the control signal which is input from the control unit 403, the multiplexing portion 4075 arranges modulation symbols of the PUSCH in parallel, performs discrete Fourier transform thereon, and multiplexes signals of the PUCCH and the PUSCH, and the generated UL DMRS and SRS.

The radio transmission portion 4077 performs inverse fast Fourier transform on the signal so as to perform modulation thereon by an SC-FDMA method; adds a guard interval to a SC-FDMA symbol which is SC-FDMA-modulated, so as to generate a digital signal with a base band; converts the digital signal with the base band into an analog signal; generates an in-phase component and an orthogonal component with an intermediate frequency from the analog signal; removes a remaining frequency component for an intermediate frequency band; converts (up-converts) the signal with the intermediate frequency into a signal with a radio frequency; removes a remaining frequency component therefrom; amplifies the power of the signal; and outputs the signal to the transmission and reception antenna 411 so that the signal is transmitted.

Next, a computation method of uplink transmission power will be described. The terminal 102 determines uplink transmit power of a PUSCH in a subframe i for a serving cell c from Equation (1).

[Eq. 1]

$$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot PL_c + A_{TF,c}(i) + f_c(i) \end{cases} \quad (1)$$

$P_{CMAX,c}$ indicates the maximum transmit power of the terminal 102 for the serving cell c. $M_{PUSCH,c}$ indicates a transmission bandwidth (the number of resource blocks in the frequency domain) for the serving cell c. In addition, $P_{O\_PUSCH,c}$ indicates standard power of the PUSCH for the serving cell c. $P_{O\_PUSCH,c}$ is determined from $P_{O\_NOMINAL\_PUSCH,c}$ and $P_{O\_UE\_PUSCH,c}$. $P_{O\_NOMINAL\_PUSCH,c}$ is a parameter related to a cell-specific uplink power control. $P_{O\_UE\_PUSCH,c}$ is a parameter related to a terminal-specific uplink power control. α is an attenuation coefficient (path loss compensation coefficient) which is used for a fractional transmission power control of the whole of a cell. $PL_c$ is a path loss, and is obtained from a reference signal which is transmitted in known power and RSRP. For example, in a case where a path loss (PL) between the base station 101 (or the RRH 103) and the terminal 102 is 5 dB, $PL_c$ is a parameter for compensating for the value. In addition, in the present invention, $PL_c$ may be a computation result which is obtained from the first embodiment or a second embodiment. $A_{TF,c}$ is obtained from Equation (2).

[Eq. 2]

$$A_{TF,c}(i)=10 \log_{10}((2^{BPRE \cdot K_s}-1) \cdot \beta_{offset}^{PUSCH}) \quad (2)$$

BPRE indicates the number of bits which can be assigned to a resource element. In addition, $K_s$ is a parameter related to an uplink power control which is sent from a high layer by using an RRC signal, and is a parameter (deltaMCS-Enabled) which depends on the modulation and coding scheme (MCS) of an uplink signal. Further, $f_c$ is determined on the basis of accumulation-enabled which is a parameter related to an uplink power control, and a TPC command included in uplink grant (DCI format).

Furthermore, $f_c(i)$ is set on the basis of a transmission power control (TPC) command $\delta_{PUSCH,c}$ included in a downlink control information format. δ is a correction value, and is included in the DCI format 0 or the DCI format 4 for the serving cell c. A power control adjustment state of the present PUSCH is defined by $f_c(i)$ and is obtained from Equation (3).

[Eq. 3]

$$f_c(i)=f_c(i-1)+\delta_{PUSCH,c}(i-K_{PUSCH}) \quad (3)$$

In a case where an accumulation-enable is sent by a higher layer, or the TPC command $\delta_{PUSCH,c}$ is included in the DCI format 0 for the serving cell c which is scrambled with a temporary C-RNTI, the terminal 102 performs an integration process (an adding process or accumulation) on the transmit power of the PUSCH. $\delta_{PUSCH,c}(i-K_{PUSCH})$ is a power correction value based on a TPC command which is sent in the DCI format 0/4 or 3/3A in a subframe $i-K_{PUSCH}$. Here, the integration process is referred to as an accumulated transmission power control (accumulated TPC). $f_c(i)$ is a power correction value in a subframe i for the serving cell c, and $f_c(i-1)$ is a power correction value in the previous subframe. In addition, in a case where the accumulated transmission power control (accumulated TPC, closed loop TPC, or accumulation) is not set by accumulation-enabled, the power control based on a TPC command is processed as an absolute transmission power control. In other words, an integration process is not performed, and a transmit power is corrected by using a power correction value which is given by the TPC command. $K_{PUSCH}$ is 4 in a case of a frequency division duplex (FDD). In a case of a time division duplex (TDD), $K_{PUSCH}$ is set depending on a TD UL/DL configuration. Further, in a case where a value, which is set in the least significant bit (LSB) of an uplink index (UL index) included in the DCI format 0/4 (uplink grant) for scheduling PUSCH transmission in a subframe #2 or a subframe #7, is "1", this is regarded as $K_{PUSCH}$=7. In relation to the remaining PUSCH transmission, $K_{PUSCH}$ is given on the basis of a predetermined table.

In the accumulated transmission power control or absolute transmission power control, in a case where the serving cell c is a primary cell and a value of $P_{O\_UE\_PUSCH,c}$ is changed (reset) by a higher layer, or the serving cell c is a secondary cell, and $P_{O\_UE\_PUSCH,c}$ which is sent by the higher layer is received, an initial value of the power offset value $f_{PUSCH,c}$ obtained on the basis of the TPC command is as in Equation (4).

[Eq. 4]

$$f_c(0) = 0 \quad (4)$$

In addition, in a case where a transmission power control based on random access is taken into consideration, Equation (5) is given.

[Eq. 5]

$$f_c(0) = \Delta P_{rampup} + \delta_{msg2} \quad (5)$$

$\delta_{msg2}$ is a power correction value based on a TPC command of which an indication is made in a random access response, and $\Delta_{Prampup}$ corresponds to a total amount (sum total) of ramp-up of an initially transmitted preamble to a finally transmitted preamble and is a value given by a higher layer.

A subframe in which no DCI format 0/4 is decoded for the serving cell c, a subframe in which discontinuous reception (DRX) occurs, or a subframe in which i is not an uplink subframe in TDD is given as in Equation (6).

[Eq. 6]

$$f_c(i) = f_c(i-1) \quad (6)$$

Here, the accumulated transmission power control is a transmission power control which is performed in consideration of past power correction. For example, it is assumed that power correction based on a TPC command is performed in a subframe 0, and power correction based on a TPC command is performed in a subframe 1. Transmit power of an uplink signal which is transmitted in a subframe 5 is set in consideration of the power correction in the subframe 0 and the subframe 1. In other words, the terminal 102 performs an integration process of the power correction based on the TPC commands. In contrast, the absolute transmission power control is a transmission power control which is performed in consideration of only power correction based on a single TPC command. In other words, the terminal 102 does not perform an integration process of the power correction based on the TPC command.

The terminal 102 determines uplink transmission power of a PUCCH in the subframe i from Equation (7).

[Eq. 7]

$$P_{PUCCH}(i) = \min\left\{ \begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array} \right\} \quad (7)$$

$P_{O\_PUCCH}$ indicates standard power of the PUCCH. $P_{O\_PUCCH,c}$ is determined from $P_{O\_NOMINAL\_PUCCH}$ and $P_{O\_UE\_PUCCH}$. $P_{O\_NOMINAL\_PUCCH}$ is a parameter related to a cell-specific uplink power control. $P_{O\_UE\_PUCCH}$ is a parameter related to a terminal-specific uplink power control. $n_{CQI}$ indicates the number of bits of CQI, $n_{HARQ}$ indicates the number of bits of nHARQ, and $n_{SR}$ indicates the number of bits of SR. $h(n_{CQI}, n_{HARQ}, n_{SR})$ is a parameter which depends on each number of bits, that is, a PUCCH format, and is defined. $\Delta_{F\_PUCCH}$ is a parameter (deltaFList-PUCCH) which is sent from a higher layer. $\Delta_{TxD}$ is a parameter which is sent from the higher layer in a case where transmission diversity is configured. g is a parameter used to adjust power control of the PUCCH.

g(i) indicates a power correction value of the PUCCH, and is obtained from Equation (8).

[Eq. 8]

$$g(i) = g(i-1) + \sum_{m=0}^{M-1} \delta_{PUCCH}(i - k_m) \quad (8)$$

In other words, g(i) is a power control adjustment state of the present PUCCH, and g(0) is an initial value after reset is performed. $\delta_{PUCCH}$ is a power correction value which is obtained on the basis of a TPC command included in the DCI format 1A/2/2A/2B/2C.

The terminal 102 determines uplink transmission power from Equation (9).

[Eq. 9]

$$P_{SRS,c}(i) = \min\left\{ \begin{array}{l} P_{CMAX,c}(i), \\ P_{SRS\_OFFSET,c}(m) + 10\log_{10}(M_{SRS,c}) + \\ P_{O\_PUSCH,c}(j) + \alpha_c(j) \cdot PL_c + f_c(i) \end{array} \right\} \quad (9)$$

$P_{SRS\_OFFSET}$ is an offset for adjusting transmit power of an SRS, and is included in uplink power control parameters (setting of parameters related to terminal-specific uplink power control). $M_{SRS,c}$ indicates a bandwidth (the number of resource blocks in the frequency domain) of the SRS, allocated in the serving cell c. The same $P_{O\_PUSCH,c}$, $\alpha_c$, $PL_c$ and $f_c(i)$ as those used for transmit power of the PUSCH are used, and transmit power of the SRS is set.

In addition, transmit power of the SRS may be set according to Equation (10).

[Eq. 10]

$$P_{SRS,c}(i) = \min\left\{ \begin{array}{l} P_{CMAX,c}(i), \\ P_{SRS\_OFFSET,c}(m) + 10\log_{10}(M_{SRS,c}) + \\ P_{O\_PUSCH,c}(j) + \alpha_{SRS,c}(j) \cdot PL_{SRS,c} + f_{SRS,c}(i) \end{array} \right\} \quad (10)$$

$\alpha_c$, $PL_c$, and $f_c(i)$ may be set to be specific to the SRS. For example, this corresponds to a case where $P_{SRS\_OFFSET}$ (2) is set in the terminal 102. In addition, this corresponds to a case where control information regarding a TPC command for the SRS is set in the terminal 102. Here, $f_{SRS,c}(i)$ may be obtained on the basis of an integration process according to Equation (11).

[Eq. 11]

$$f_{SRS,c}(i) = f_c(i-1) + \delta_{SRS,c}(i-K_{SRS}) \quad (11)$$

$\delta_{SRS,c}$ is a power correction value given by a TPC command for the SRS, and the power correction value may be set from the same table as that of the PUSCH or the PUCCH. In addition, the power correction value $\delta_{SRS,c}$ may be set on the basis of a separate table. $\delta_{SRS,c}(i-K_{SRS})$ is a power correction value given by a TPC command for the SRS which is set in a DCI format of a subframe $i-K_{SRS}$.

In a case where transmit power of the terminal 102 reaches the maximum transmit power $P_{CMAX,c}$ during the accumulated transmission power control, an integration process which causes the transmit power to be equal to or greater than the maximum transmit power is not performed. In addition, in a case where the transmit power of the terminal 102 reaches the minimum power, an integration process which causes the transmit power to be equal to or smaller than the minimum power is not performed. In other words, the terminal 102 stops an integration process of power correction based on the accumulated transmission power control (accumulation) of a TPC command according to transmission power which is set in the terminal.

The accumulated transmission power control which is an integration process of power correction values obtained according to Equation (11) may be performed separately depending on the type of DCI format. For example, an accumulated transmission power control based on power correction values given by a TPC command for an SRS included in the DCI format 0/4 and an accumulated transmission power control based on power correction values given by a TPC command for an SRS included in the DCI format 1A/2B/2C may be performed separately from each other. In other words, the terminal 102 may separately perform an accumulated transmission power control based on a first TPC command and an accumulated transmission power control based on a second TPC command. That is, the terminal 102 may separately perform an accumulated transmission power control based on a TPC command included in an uplink grant and an accumulated transmission power control based on a TPC command included in a downlink assignment. In other words, the terminal 102 may perform a plurality of closed-loop transmission power controls on a single physical channel simultaneously and separately. Here, the TPC command for an SRS may be a TPC command for a PUSCH. In addition, the TPC command for an SRS may be a TPC command for a PUCCH. Further, the TPC command for an SRS may be a TPC command which is set to be specific to the SRS. In a case where certain control information is set, the terminal 102 recognizes that a TPC command set to be specific to an SRS is included in a certain DCI format, and performs demodulation and decoding processes on the DCI format.

The terminal 102 determines uplink transmit power of a PRACH from Equation (12).

[Eq. 12]

$$P_{PRACH} = \min \begin{Bmatrix} P_{CMAX,c}(i), \\ PREAMBLE\_RECEIVED\_TARGET\_POWER + PL_c \end{Bmatrix} \quad (12)$$

$P_{CMAX,c}$ of the PRACH is the maximum transmit power in a primary cell. $PL_c$ of the PRACH is a downlink path loss of the primary cell computed by the terminal 102. In addition, $P_{CMAX,c}$ of the PRACH may be the maximum transmit power in a secondary cell. Further, $PL_c$ of the PRACH is a downlink path loss for the primary cell or the secondary cell computed by the terminal 102.

Furthermore, in a case where the transmit power of each uplink physical channel exceeds the maximum transmit power $P_{CMAX,c}(i)$ of the terminal 102 based on a computation result of various transmission power parameters or path losses, the terminal 102 transmits the uplink physical channel at the maximum transmit power.

The terminal 102 determines PREAMBLE_RECEIVED_TARGET_POWER from Equation (13).

[Eq. 13]

$$\begin{aligned}PREAMBLE\_RECEIVED\_TARGET\_POWER = \\ preambleInitialReceivedPower + DELTA\_PREAMBLE + \\ (PREAMBLE\_TRANSMISSION\_COUNTER - 1) * \\ powerRampingStep\end{aligned} \quad (13)$$

premableInitialReceivedPower is initial received power of a random access preamble. DELTA_PREAMBLE is a power offset associated with a preamble format. PREMABLE_TRANSMISSION_COUNTER is the number of times of transmission of a PRACH (random access preamble). powerRampingStep is a parameter indicating a power increase amount for increasing transmission power by a certain amount during retransmission of the PRACH in a case where random access fails.

Here, the terminal 102 determines the path loss (downlink path loss) of the serving cell c from Equation (14).

[Eq. 14]

$$PL_c = referenceSignalPower - \text{higher layer filtered RSRP} \quad (14)$$

referenceSignalPower indicates energy per resource element (EPRE) of a path loss information reference signal (for example, a CRS), and a notification thereof is sent by a higher layer in a state of being included in PDSCH-Config. In other words, referenceSignalPower indicates transmit power of the path loss information reference signal which is transmitted from the base station 101. Higher layer filtered RSRP is RSRP which is filtered in a higher layer. In addition, higher layer filtered RSRP is obtained according to Equation (15).

[Eq. 15]

$$F_n = (1-a) \cdot F_{n-1} + a \cdot M_n \quad (15)$$

$F_n$ indicates a measurement result which is updated, that is, a higher layer filtered RSRP. In addition, $F_{n-1}$ indicates a past measurement result, that is, past higher layer filtered RSRP. Further, $M_n$ indicates the latest measurement result. Furthermore, a indicates a measured physical quantity and is determined from Equation (16). Moreover, a indicates an influence degree of each measurement result, and a value of a which is closer to 1 indicates a measurement result of the latest measurement result becoming weighted.

[Eq. 16]

$$a = 1/2^{(k/4)} \quad (16)$$

k is set to a filter coefficient filterCoefficient. In addition, filterCoefficient is set in quantityConfig or UplinkPowerControl. In a case where the base station 101 focuses on a past measurement result, a value of k is set to be great so that a value of a decreases, and in a case where the base station focuses on the latest measurement result, a value of k is set to be small so that a value of a increases.

The first embodiment may include that some parameters or parameter sets used for a transmission power control are changed depending on the type of DCI format, and the transmission power control is performed.

The base station 101 or the RRH 103 controls transmit power of each terminal so that uplink signals (a PUSCH, a PUCCH, a DMRS, an SRS, and a PRACH) transmitted from a plurality of terminals are received at constant reception power regardless of positions of the terminals in the base station 101 or the RRH 103.

Next, a method of generating a base sequence of an SRS will be described. In a case where a sequence length of an SRS is $3 N_{SC}^{RB}$ (where $N_{SC}^{RB}$ is 12) or more, a base sequence of the SRS is obtained from Equation (17).

[Eq. 17]

$$\bar{r}_{u,v}(n) = x_q(n \bmod N_{ZC}^{RS}), 0 \leq n < M_{sc}^{RS} \quad (17)$$

qth-root Zadoff-Chu sequence $x_q$ is obtained from Equation (18). [x] mod [y] is used to calculate the remainder when x is divided by y.

[Eq. 18]

$$x_q(m) = e^{-j\frac{\pi q m(m+1)}{N_{ZC}^{BS}}}, 0 \leq m \leq N_{ZC}^{RS} - 1 \quad (18)$$

q is obtained from Equation (19).

[Eq. 19]

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \quad (19)$$

A Zadoff-Chu sequence length $N_{ZC}^{RS}$ is given as a result of selecting the maximum prime number from among prime numbers which are less than a sequence length of the SRS. In addition, u is a sequence group number in a slot number $n_s$, and is obtained from Equation (20).

[Eq. 20]

$$u = (f_{gh}(n_s) + f_{ss}) \bmod 30 \quad (20)$$

$f_{gh}(n_s)$ is a group hopping pattern, $f_{ss}$ is a sequence shift pattern, and, for example, seventeen group hopping patterns and thirty sequence shift patterns are prepared. The sequence group hopping can be controlled whether or not the sequence group hopping is performed by a cell-specific parameter (Group-hopping-enabled) of which notification is sent from a higher layer. In addition, the group hopping pattern is referred to as a hopping pattern in some cases.

The group hopping pattern is the same in a PUSCH and a PUCCH if reception points are the same as each other, and is obtained from Equation (21).

[Eq. 21]

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad (21)$$

A pseudo-random sequence c(i) is obtained from Equation (22). In addition, the pseudo-random sequence is defined by a gold sequence of a length of 31. The length of an output sequence c(n) is $M_{PN}$, where n is 0, 1, . . . , and $M_{PN}-1$.

[Eq. 22]

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad (22)$$

For example, if $N_c = 1600$, a first m sequence $x_1$ is initialized to $x_1(0) = 1$ and $x_1(n) = 0$ where n=1, 2, . . . , and 30. An initial value of a second m sequence is obtained from Equation (23).

[Eq. 23]

$$c_{init} = \sum_{i=0}^{30} x_2(i) \cdot 2^i \quad (23)$$

In addition, in relation to a pseudo-random sequence of the group hopping pattern, a pseudo-random sequence generator is initialized at the beginning of each radio frame on the basis of Equation (24).

[Eq. 24]

$$c_{init} = \left\lfloor \frac{N_{ID}^{cell}}{30} \right\rfloor \quad (24)$$

$N_{ID}^{cell}$ is a cell ID, and is a parameter which is sent from a higher layer. In a case where a first cell ID (first parameter) is sent from the higher layer, the pseudo-random sequence may be initialized by using the first cell ID. In addition, in a case where a second cell ID (second parameter) is sent from the higher layer, the pseudo-random sequence may be initialized by using the second cell ID. In other words, in a case where either the first cell ID or the second cell ID is set, the pseudo-random sequence generator is initialized by using the set cell ID, and in a case where both of the first cell ID and the second cell ID are set, the pseudo-random sequence generator is initialized by using either the first cell ID or the second cell ID depending on the conditions. In addition, the sequence group hopping in the PUSCH can be controlled not to be performed for each terminal 102 by a parameter (Disable-sequence-group-hopping) which is sent from a higher layer. In other words, although, in the whole of a cell, the sequence group hopping is set to be performed by a parameter (Group-hopping-enabled) which is sent from the higher layer, the sequence group hopping can be controlled not to be performed in a certain terminal by this information.

The sequence shift pattern $f_{ss}$ is defined in each of the PUSCH and the PUCCH. With respect to the PUCCH, the sequence shift pattern is defined by Equation (25).

[Eq. 25]

$$f_{ss}^{PUCCH} = N_{ID}^{cell} \bmod 30 \quad (25)$$

In addition, with respect to the PUSCH, the sequence shift pattern is defined by Equation (26).

[Eq. 26]

$$f_{ss}^{PUSCH} = (f_{ss}^{PUCCH} + \Delta_{ss}) \bmod 30 \quad (26)$$

$\Delta_{ss}$ satisfies $\Delta_{ss} \in \{0, 1, \ldots, 29\}$, and is set by a higher layer, and a notification thereof is sent from the transmission unit 307.

In addition, the sequence group number u of the SRS is set on the basis of the sequence shift pattern of the PUCCH. That is, the sequence group number is defined as in Equation (27).

[Eq. 27]

$$u = (f_{gh}(n_s) + f_{ss}^{PUCCH}) \bmod 30 \qquad (27)$$

In the first embodiment, the terminal 102 sets a base sequence of an SRS on the basis of a cell ID which is set according to a DCI format. In a case where a DCI format including an SRS request is the first format, the uplink reference signal generation portion 4079 sets a base sequence of an SRS on the basis of the first cell ID; in a case where the DCI format including the SRS request is the second format, the uplink reference signal generation portion sets a base sequence of the SRS on the basis of the second cell ID; and, in a case where the DCI format including the SRS request is the third format, the uplink reference signal generation portion sets a base sequence of the SRS on the basis of the third cell ID. The SRS is transmitted to the base station 101 or the RRH 103. That is, if both of the first cell ID and the second cell ID are set, in a case where a DCI format including the SRS request is the first format, the uplink reference signal generation portion 4079 initializes the pseudo-random sequence generator by using the first cell ID, and, in a case where the DCI format including the SRS request is the second format, the uplink reference signal generation portion 4079 initializes the pseudo-random sequence generator by using the second cell ID. In addition, if either the first cell ID or the second cell ID is set, the uplink reference signal generation portion 4079 may initialize the pseudo-random sequence generator by using the set cell ID regardless of the type of DCI format including the SRS request.

In other words, in a case where a plurality of cell IDs is sent from the base station 101 or the RRH 103, the uplink reference signal generation portion 4079 may set a base sequence of an SRS on the basis of a cell ID which is set according to a received DCI format.

In addition, in a case where a plurality of cell IDs are sent from the base station 101 or the RRH 103, the uplink reference signal generation portion 4079 may set a base sequence of a PUSCH DMRS on the basis of a cell ID which is set according to a received DCI format.

Further, in a case where a plurality of cell IDs are sent from the base station 101 or the RRH 103, the uplink reference signal generation portion 4079 may set a base sequence of a PUCCH DMRS on the basis of a cell ID which is set according to a received DCI format.

If a cell ID which is set to be specific to an SRS is indicated by $X_{SRS}$ (where $X_{SRS}$ is an integer number), a sequence shift pattern $f_{ss}^{SRS}$ of the SRS is represented as in Equation (28). In addition, in a case where the same pattern as in a cell $IDX_{PUCCH}$ which is set in the PUCCH is applied, $X_{SRS}$ may be $X_{PUCCH}$.

[Eq. 28]

$$f_{ss}^{SRS} = X_{SRS} \bmod 30 \qquad (28)$$

In addition, the sequence shift pattern $f_{ss}^{SRS}$ of the SRS may be represented as in Equation (29).

[Eq. 29]

$$f_{ss}^{SRS} = X_{SRS} \bmod K \qquad (29)$$

K is any integer number, and may be associated with the types (number) of sequence shift patterns. In other words, if the sequence shift pattern has thirty types, K is 30, and if the sequence shift pattern has seventeen types, K is 17. In addition, if the sequence shift pattern has n types, K is n. Similarly, the pseudo-random sequence generator of the SRS is initialized at the beginning of each radio frame as in Equation (30). Further, it can be said that the pseudo-random sequence generator is initialized in a leading portion of each radio frame.

[Eq. 30]

$$c_{init}^{SRS} = \left\lfloor \frac{X_{SRS}}{K} \right\rfloor \qquad (30)$$

The sequence hopping is applied only in a case where a length of a reference signal is $6\,N_{SC}^{RB}$ (for example, $N_{SC}^{RB}$ is 12) or more. In other words, in a case where a length of a reference signal is less than $6\,N_{SC}^{RB}$ (for example, $N_{SC}^{RB}$ is 12), the base sequence number v of a base sequence group is v=0.

In addition, in a case where an independent parameter X is set in the SRS instead of a cell ID, Equation (27) may be defined as Equation (31) on the basis of Equation (28) or Equation (29) in relation to the sequence group number u of the SRS.

[Eq. 31]

$$u = (f_{gh}(n_s) + f_{ss}^{SRS}) \bmod 30 \qquad (31)$$

In addition, in relation to the sequence hopping, in a case where a length of a reference signal is $6\,N_{SC}^{RB}$ (for example, $N_{SC}^{RB}$ is 12) or more, the base sequence number v of a base sequence group of a slot $n_s$ is obtained from Equation (32).

[Eq. 32]

$$v = \begin{cases} c(n_s) & \text{if group hopping is disabled and} \\ & \text{sequence hopping is enabled} \\ 0 & \text{otherwise} \end{cases} \qquad (32)$$

The pseudo-random sequence c(i) is obtained from Equation (22) and Equation (23).

In addition, in relation to a pseudo-random sequence of the group hopping, a pseudo-random sequence generator is initialized at the beginning of each radio frame on the basis of Equation (33).

[Eq. 33]

$$c_{init} = \left\lfloor \frac{N_{ID}^{cell}}{30} \right\rfloor \cdot 2^5 + f_{ss}^{PUSCH} \qquad (33)$$

In the same manner as the sequence group hopping, the sequence hopping can be controlled not to be performed for each terminal 102 by a parameter (Disable-sequence-group-hopping) which is sent from a higher layer. In other words, although, in the whole of a cell, the sequence hopping is set to be performed by a parameter (Sequence-hopping-enabled) which is sent from the higher layer, the sequence hopping can be controlled not to be performed in a certain terminal by this information.

If a cell ID which is set to be specific to an SRS is indicated by $X_{SRS}$ (where $X_{SRS}$ is an integer number), in relation to a pseudo-random sequence of the group hopping of an SRS, a pseudo-random sequence generator is initialized at the beginning of each radio frame on the basis of Equation (34).

[Eq. 34]

$$c_{init} = \left\lfloor \frac{X_{SRS}}{30} \right\rfloor \cdot 2^5 + f_{ss}^{PUSCH} \quad (34)$$

Equation (34) may be expressed as in Equation (35) by using K and $f_{ss}^{SRS}$ in the same manner as in Equation (29).

[Eq. 35]

$$c_{init} = \left\lfloor \frac{X_{SRS}}{K} \right\rfloor \cdot 2^5 + f_{ss}^{SRS} \quad (35)$$

In addition, a value itself of $c_{init}$ may be sent from a higher layer.

Further, sequence shift patterns of the PUSCH and the PUCCH may be set by using a parameter $X_n$ which is set in each terminal 102.

[Eq. 36]

$$f_{ss}^{PUCCH} = X_n \bmod 30 \quad (36)$$

[Eq. 37]

$$f_{ss}^{PUSCH} = (X_n \bmod 30 + \Delta_{ss}) \bmod 30 \quad (37)$$

In this case, $\Delta_{ss}$ is a parameter which is set in each terminal 102. In a case where the sequence hopping is performed on the PUSCH and the SRS separately, $\Delta_{ss}$ may be set in each of the PUSCH and the SRS.

If a cell ID is indicated by $X_n$ (where $X_n$ is an integer number), in relation to a pseudo-random sequence of the group hopping in this case, a pseudo-random sequence generator is initialized at the beginning of each radio frame on the basis of Equation (38).

[Eq. 38]

$$c_{init} = \left\lfloor \frac{X_n}{30} \right\rfloor \cdot 2^5 + (X_n \bmod 30 + \Delta_{ss}) \bmod 30 \quad (38)$$

$X_n$ may be denoted as $N_{ID}^{cell}$. $\Delta_{ss}$ may be set in each of the PUSCH and the SRS separately.

In addition, if a cell ID is indicated by $X_n$ (where $X_n$ is an integer number), in relation to a pseudo-random sequence of the group hopping pattern in this case, a pseudo-random sequence generator is initialized at the beginning of each radio frame on the basis of Equation (39).

[Eq. 39]

$$c_{init} = \left\lfloor \frac{X_n}{30} \right\rfloor \quad (39)$$

$X_n$ may be denoted as $N_{ID}^{cell}$.

In other words, it can be said that a base sequence of the SRS is generated by a pseudo-random sequence.

Figure 5:
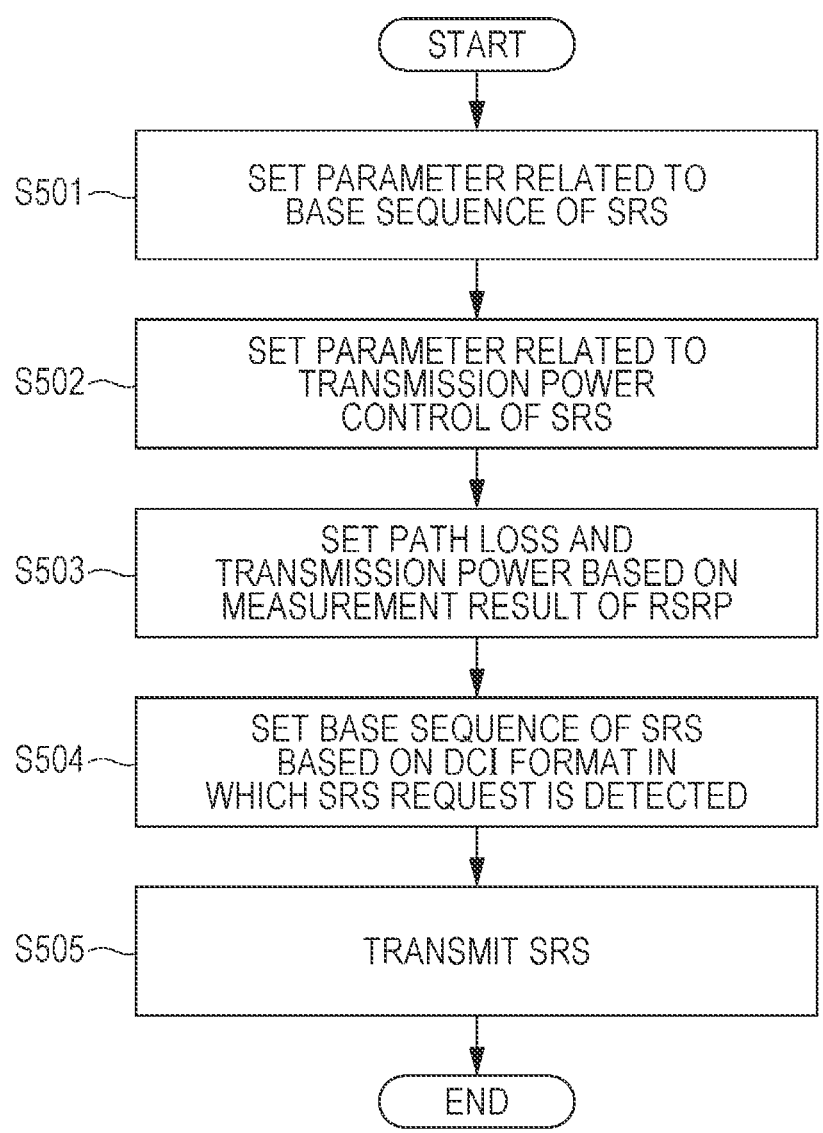
FIG. 5 is a flowchart illustrating details of a transmission process of an SRS in the terminal according to the first embodiment of the present invention.

FIG. 5 is a flowchart illustrating details of a transmission process of an SRS in the terminal according to the first embodiment. The terminal 102 sets various SRS parameters included in an RRC signal which is transmitted from the base station 101 or the RRH 103. At this time, the terminal 102 sets parameters related to a base sequence of an SRS (S501). In addition, the terminal 102 sets parameters related to a transmission power control of the SRS (S502). A path loss and transmission power are set on the basis of a measurement result of RSRP (S503). A cell ID of the SRS base sequence is set according to the type of DCI format in which a positive SRS request is detected (S504). The SRS with the set base sequence and transmit power is transmitted (S505).

Figure 6:
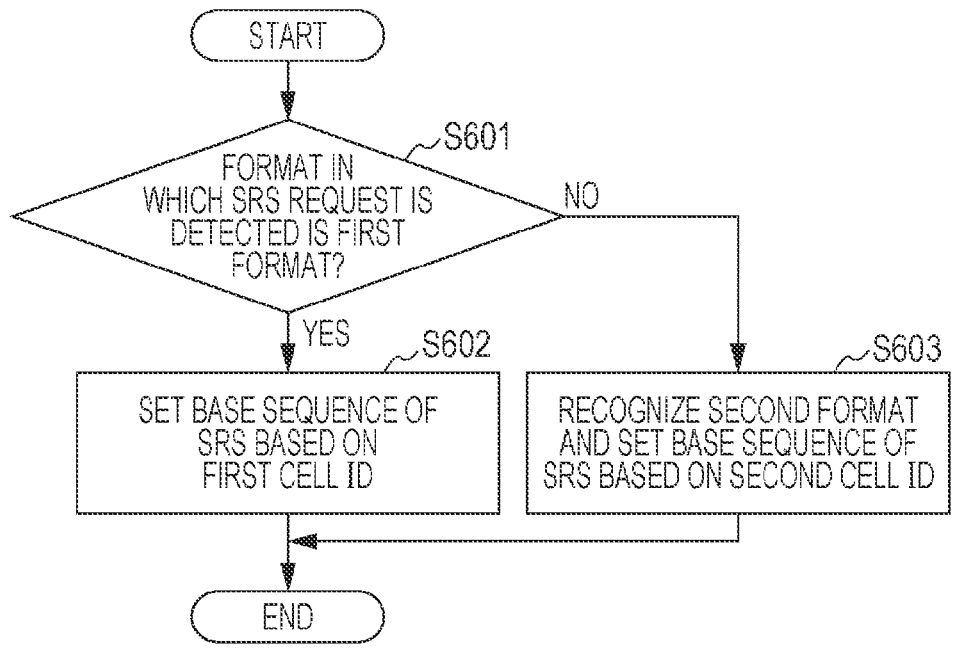
FIG. 6 is a flowchart illustrating an example of a method of setting a base sequence of an SRS according to the first embodiment of the present invention.

FIG. 6 is a flowchart illustrating an example of a method of setting a base sequence of the SRS according to the first embodiment. In the terminal 102, the reception unit 405 receives a PDCCH or an E-PDCCH which is transmitted from the base station 101 or the RRH 103, from the transmission and reception antenna 411, and the demodulation portion 4053 detects a DCI format. The reception unit 405 determines whether or not the DCI format is the first format (step S601). In a case where the received DCI format is the first format, and an SRS request included in the DCI format indicates a request of a transmission (S601: YES), the SRS control portion 4013 gives an indication to the uplink reference signal generation portion 4079 via the control unit 403 so that a base sequence of the SRS is generated on the basis of the first cell ID. The uplink reference signal generation portion 4079 sets the base sequence of the SRS on the basis of the first cell ID in response to the indication (step S602). In a case where it is determined that the received DCI format is not the first format (S601: NO), the SRS control portion 4013 recognizes that a positive SRS request is received in the second format, and gives an indication to the uplink reference signal generation portion 4079 via the control unit 403 so that a base sequence of the SRS is generated on the basis of the second cell ID. The uplink reference signal generation portion 4079 sets the base sequence of the SRS on the basis of the second cell ID in response to the indication (step S603). In FIG. 6, a method of setting an SRS base sequence in the first format and the second format has been described, but the same process is performed even if the third format or the fourth format is added thereto. In other words, in a case where a DCI format in which the positive SRS request is detected is the third format, the SRS control portion 4013 gives an indication to the uplink reference signal generation portion 4079 via the control unit 403 so that a base sequence of the SRS is set on the basis of the third cell ID, and in a case where a DCI format in which the positive SRS request is detected is the fourth format, the SRS control portion gives an indication so that a base sequence of the SRS is set on the basis of the fourth cell ID. The uplink reference signal generation portion 4079 sets the base sequence of the SRS in response to the indication.

When described with reference to FIG. 1, the terminal 102 may change a cell ID which is set in a base sequence of an SRS which is transmitted via the uplink 106 and a cell ID which is set in a base sequence of an SRS which is transmitted via the uplink 108, depending on the type of DCI format. In other words, in a case where a DCI format including a positive SRS request is the first format, a base sequence of the SRS may be set on the basis of the first cell ID, and the SRS may be transmitted via the uplink 106.

Further, in a case where a DCI format including a positive SRS request is the second format, a base sequence of the SRS may be set on the basis of the second cell ID, and the SRS may be transmitted via the uplink 108.

Second Embodiment

Next, a second embodiment of the present invention will be described. In the second embodiment, a base station transmits, to a terminal, an RRC signal including a cell ID which is set in an uplink demodulation reference signal (DMRS) for a physical uplink shared channel (PUSCH) and a cell ID which is set in a demodulation reference signal for a physical uplink control channel (PUCCH). In addition, the base station transmits a DCI format including an SRS request to the terminal. In a case where the received DCI format is an uplink grant, the terminal sets a base sequence of an SRS on the basis of the cell ID which is set in the PUSCH DMRS, and in a case where the received DCI format is a downlink assignment, the terminal sets a base sequence of an SRS on the basis of the cell ID which is set in the PUCCH DMRS. The terminal transmits the SRS to the base station.

In addition, in a case where the received DCI format is a predetermined DCI format, the terminal sets a base sequence of an SRS on the basis of a cell ID which is set to be specific to the SRS. In other words, in a case where a received DCI format is a first DCI format, the terminal sets a base sequence of the SRS on the basis of a cell ID which is set in the PUSCH DMRS; in a case where a received DCI format is a second DCI format, the terminal sets a base sequence of the SRS on the basis of a cell ID which is set in the PUCCH DMRS; and in a case where a received DCI format is a third DCI format, the terminal sets a base sequence of the SRS on the basis of a cell ID which is set in the SRS. The terminal transmits the SRS to the base station.

Figure 7:
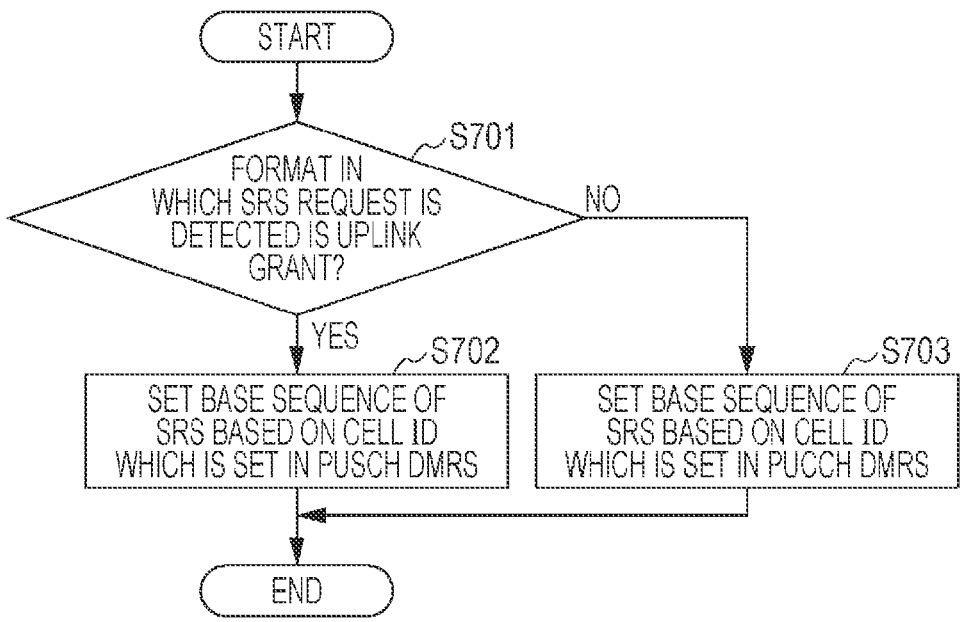
FIG. 7 is a flowchart illustrating an example of a method of setting a base sequence of an SRS according to a second embodiment of the present invention.

FIG. 7 is a flowchart illustrating an example of a method of setting a base sequence of an SRS in the second embodiment. The terminal 102 receives a PDCCH or an E-PDCCH transmitted from the base station 101 or the RRH 103, from the transmission and reception antenna 411 with the reception unit 405, and detects a DCI format with the demodulation portion 4053. In addition, it is determined whether or not an SRS request included in the detected DCI format indicates a request of a transmission. The reception unit 405 determines whether or not the DCI format in which a positive SRS request is detected is uplink grant (step S701). In a case where it is determined that the DCI format in which the positive SRS request is detected is the uplink grant (S701: YES), the SRS control portion 4013 gives an indication to the uplink reference signal generation portion 4079 via the control unit 403 so that a base sequence of the SRS is set on the basis of a cell ID which is set in a PUSCH DMRS. The uplink reference signal generation portion 4079 sets the base sequence of the SRS on the basis of the set cell ID in response to the indication (step S702). In a case where it is determined that the DCI format in which the positive SRS request is detected is not the uplink grant (S701: NO), the SRS control portion 4013 recognizes that downlink assignment is received, and gives an indication to the uplink reference signal generation portion 4079 via the control unit 403 so that a base sequence of the SRS is set on the basis of a cell ID which is set in a PUCCH DMRS. The uplink reference signal generation portion 4079 sets the base sequence of the SRS on the basis of the set cell ID in response to the indication (step S703).

In a case where a field indicating a cell ID of the PUSCH DMRS is set in the uplink grant, a cell ID of a base station of the SRS is also set on the basis of the cell ID. In other words, in a case where the field indicating a cell ID of the PUSCH DMRS indicates the first cell ID, the terminal 102 also sets a base sequence of the SRS on the basis of the first cell ID; in a case where the field indicating a cell ID of the PUSCH DMRS indicates the second cell ID, the terminal 102 also sets a base sequence of the SRS on the basis of the second cell ID; and in a case where the field indicating a cell ID of the PUSCH DMRS indicates the third cell ID, the terminal 102 also sets a base sequence of the SRS on the basis of the third cell ID.

In a case where a base sequence of the SRS is changed depending on the type of DCI format, a cell ID used in a base sequence of another uplink physical channel is applied (reused) so that control information for a base sequence of the SRS is not required to be transmitted to the terminal 102, and thus overhead can be reduced in proportion thereto.

A transmission power control of an SRS which is requested to be transmitted in a positive SRS request may be realized by using a TPC command included in each DCI format. In addition, an SRS offset may be set by using a parameter set correlated with each DCI format.

Third Embodiment

Next, a third embodiment of the present invention will be described. In the third embodiment, the base station 101 and/or the RRH 103 transmit(s), to the terminal 102, an RRC signal including a cell ID which is set in an uplink demodulation reference signal (DMRS) of a physical uplink shared channel (PUSCH) and a cell ID which is set to be specific to a sounding reference signal (SRS), and transmit(s) a DCI format including an SRS request to the terminal 102. The terminal 102 determines whether or not the SRS request included in the received DCI format indicates a request of a transmission. In a case where the SRS request indicates the transmission resource, and the received DCI format is uplink grant, a base sequence of the SRS is set on the basis of the cell ID which is set in the PUSCH DMRS, and in a case where the received DCI format is downlink assignment, a base sequence of the SRS is set on the basis of the cell ID which is set to be specific to the SRS. The SRS is transmitted to the base station 101 or the RRH 103.

In addition, in the third embodiment, a cell ID applied to a PUCCH may be set separately from a PUSCH and an SRS.

Figure 8:
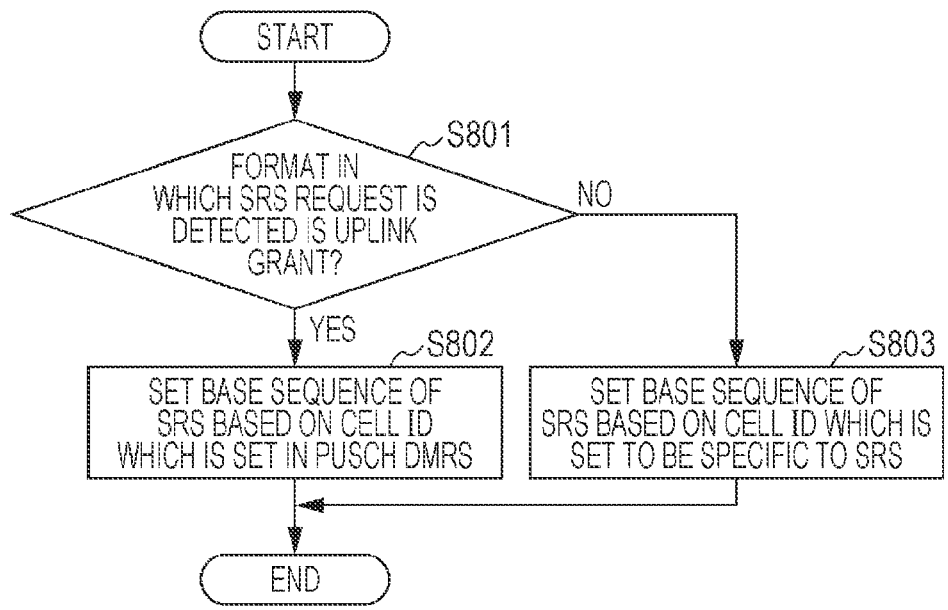
FIG. 8 is a flowchart illustrating an example of a method of setting a base sequence of an SRS according to a third embodiment of the present invention.

FIG. 8 is a flowchart illustrating an example of a method of setting a base sequence of an SRS in the third embodiment. The terminal 102 receives a PDCCH or an E-PDCCH transmitted from the base station 101 or the RRH 103, from the transmission and reception antenna 411 with the reception unit 405, and detects a DCI format with the demodulation portion 4053. The reception unit 405 determines whether or not the DCI format is uplink grant (step S801). In a case where it is determined that the DCI format is the uplink grant, and a positive SRS request is detected in the uplink grant (S801: YES), the SRS control portion 4013 gives an indication to the uplink reference signal generation portion 4079 via the control unit 403 so that a base sequence of the SRS is set on the basis of a cell ID which is set in a PUSCH DMRS. The uplink reference signal generation portion 4079 sets the base sequence of the SRS on the basis of the set cell ID in response to the indication (step S802). In a case where it is determined that the DCI format is not the uplink grant (S801: NO), the SRS control portion 4013 recognizes that downlink assignment is received, and gives an indication to the uplink reference signal generation portion 4079 via the control unit 403 so that a base sequence of the SRS is set on the basis of a cell ID which is set to be specific to the SRS. The uplink reference signal generation portion 4079 sets the base sequence of the SRS on the basis of the set cell ID in response to the indication (step S803).

In the third embodiment, cell IDs used in a base sequence of an SRS are changed depending on the type of DCI format. In a case where a positive SRS request is detected in uplink grant, the terminal 102 recognizes that an SRS is transmitted to the same reception point as that of a PUSCH, and sets a base sequence of the SRS on the basis of a cell ID used in a base sequence of a PUSCH DMRS. In addition, in a case where the positive SRS request is detected in downlink assignment, the terminal 102 recognizes that the SRS is transmitted to a reception point different from that of the PUSCH, and sets a base sequence of the SRS on the basis of an SRS-specific cell ID. Base sequences are set by using different cell IDs with respect to reception points, and thus it is possible to reduce interference between terminals which transmit SRSs to different reception points. In other words, in a case where the reception point A wrongly receives an SRS which is to be transmitted to a reception point B, since base sequences are different from each other, the SRS can be separated, and thus interference with an SRS transmitted to the reception point A can be avoided.

Fourth Embodiment

Next, a fourth embodiment of the present invention will be described. In the fourth embodiment, a base station transmits a radio resource control (RRC) signal including a plurality of cell IDs to a terminal, and transmits a downlink control information (DCI) format to the terminal in a first control channel region (physical downlink control channel: PDCCH) and/or a second control channel region (enhanced PDCCH: E-PDCCH) for scheduling a physical uplink shared channel (PUSCH) or a physical downlink shared channel (PDSCH). In a case where an SRS request (positive SRS request) indicating a request of an SRS transmission in the first control channel region, the terminal sets a base sequence of the SRS on the basis of a first cell ID, and in a case where the SRS request indicating a request of the SRS transmission in the second control channel region, the terminal sets a base sequence of the SRS on the basis of a second cell ID. The terminal transmits the SRS to the base station.

In addition, in a case where the positive SRS request is detected in the first control channel region, a base sequence of the SRS may be set on the basis of a cell-specific cell ID, and in a case where the positive SRS request is detected in the second control channel region, a base sequence of the SRS may be set on the basis of a terminal-specific cell ID.

Further, in the fourth embodiment, in a case where the positive SRS request is detected in the first control channel region and the second control channel region for the same SRS subframe, an SRS may not be transmitted. Further, in a case where the positive SRS request is detected in the first control channel region and the second control channel region for the same SRS subframe, an SRS whose base sequence is set on the basis of the first cell ID may be transmitted to the base station. Furthermore, in a case where the positive SRS request is detected in the first control channel region and the second control channel region for the same SRS subframe, an SRS whose base sequence is set on the basis of the second cell ID may be transmitted to the base station.

In addition, in the fourth embodiment, in a case where the positive SRS request is detected in the first control channel region and the second control channel region for the same serving cell and SRS subframe, an SRS may not be transmitted. Further, in a case where the positive SRS request is detected in the first control channel region and the second control channel region for the same serving cell and SRS subframe, an SRS whose base sequence is set on the basis of the first cell ID may be transmitted to the base station. Furthermore, in a case where the positive SRS request is detected in the first control channel region and the second control channel region for the same serving cell and SRS subframe, an SRS whose base sequence is set on the basis of the second cell ID may be transmitted to the base station.

In addition, in the fourth embodiment, in a case where the positive SRS request is detected in the first control channel region and the second control channel region for the same SRS subframe in different serving cells, an SRS may not be transmitted. In other words, in a case where the positive SRS request is detected on the first control channel region in a first SRS subframe for a first serving cell, and the positive SRS request is detected on the first control channel region in the first SRS subframe for a second serving cell, the terminal may not transmit an SRS. Further, either one of positive SRS requests may be prioritized, and an SRS which is set on the basis of various parameters correlated with the positive SRS request may be transmitted to the base station. Furthermore, various parameters may be included in a parameter set.

In addition, in the fourth embodiment, in a case where the positive SRS request is detected in the first control channel and the second control channel for the same reception point and the same SRS subframe, an SRS may not be transmitted. Further, either one of positive SRS requests may be prioritized, and an SRS which is set on the basis of various parameters correlated with the positive SRS request may be transmitted to the base station.

In addition, in the fourth embodiment, in a case where a DCI format detected in the first and second control channel regions is uplink grant for scheduling a PUSCH, and the positive SRS request is detected, a base sequence of an SRS may be set on the basis of a cell ID which is set in each PUSCH DMRS.

The base station 101 or the RRH 103 may set a terminal-specific search space (or UE-specific search space: USS) in the terminal 102 so as to be detected in either the first control channel region or the second control channel region. In addition, control information for giving an indication for detection thereof may be sent to the whole of a cell through RRC signaling. The control information for giving an indication for detection thereof may be sent to the whole of a cell by using system information. Further, the control information for giving an indication for detection thereof may be sent to each terminal 102 individually. Further, the control information for giving an indication for detection thereof may be broadcast. Furthermore, the control information for giving an indication for detection thereof may be uniquely determined.

The control information for giving an indication for detection thereof may be shared between a plurality of component carriers (or component carriers corresponding to a cell). In addition, the control information for giving an indication for detection thereof may be set in each of component carriers (or component carriers corresponding to a cell). Further, even if the control information for giving an indication for detection thereof is shared between a plurality of component carriers (or component carriers corresponding to a cell), control information for resetting the control information for giving an indication for detection thereof may be individually sent to each component carrier. In other words, even if the base station 101 or the RRH 103 controls the terminal 102 to search the USS for the second control channel (E-PDCCH) between component carriers, the terminal may be controlled to search the USS for the first control channel (PDCCH) on the basis of the reset control information in relation to a certain component carrier.

In addition, some cells or a component carrier corresponding to a cell (for example, a primary cell) may be set for each terminal 102 so that a USS can be detected only in the first control channel region at all times.

Figure 9:
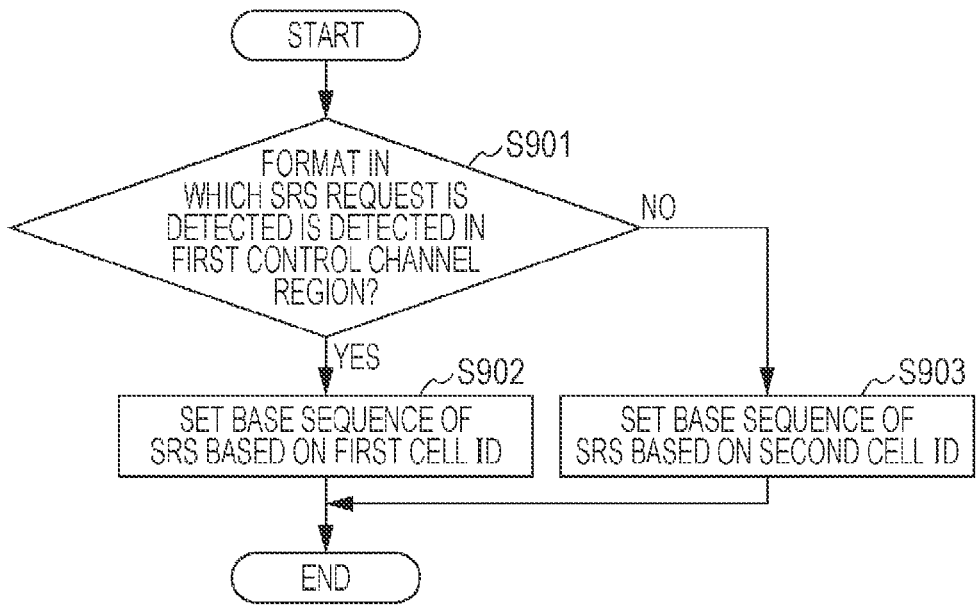
FIG. 9 is a flowchart illustrating an example of a method of setting a base sequence of an SRS according to a fourth embodiment of the present invention.

FIG. 9 is a flowchart illustrating an example of a method of setting a base sequence of an SRS in the fourth embodiment. The terminal 102 receives a PDCCH or an E-PDCCH transmitted from the base station 101 or the RRH 103, from the transmission and reception antenna 411 with the reception unit 405, and detects a DCI format with the demodulation portion 4053. It is determined whether or not an SRS request included in the detected DCI format indicates a request of a transmission. The reception unit 405 determines whether or not the DCI format in which a positive SRS request is detected is detected in the first control channel region (step S901). In a case where it is determined that the DCI format in which the positive SRS request is detected is detected in the first control channel region (S901: YES), the SRS control portion 4013 gives an indication to the uplink reference signal generation portion 4079 via the control unit 403 so that a base sequence of the SRS is set on the basis of the first cell ID. The uplink reference signal generation portion 4079 sets the base sequence of the SRS on the basis of the first cell ID in response to the indication (step S902). In a case where it is determined that the DCI format in which the positive SRS request is detected is detected in the second control channel region (S901: NO), the SRS control portion 4013 recognizes that downlink assignment is received, and gives an indication to the uplink reference signal generation portion 4079 via the control unit 403 so that a base sequence of the SRS is set on the basis of the second cell ID. The uplink reference signal generation portion 4079 sets the base sequence of the SRS on the basis of the second cell ID in response to the indication (step S903). In addition, it is assumed that such a DCI format includes the positive SRS request.

SRSs whose base sequences are set on the basis of different cell IDs can reduce interference to each other by using the control channel regions. The base station 101 or the RRH 103 can separate an SRS which is transmitted from the terminal 102 which can receive a control signal in a PDCCH and an SRS which is transmitted from the terminal 102 which can receive a control signal in an E-PDCCH from each other, and can measure channels.

Fifth Embodiment

Next, a fifth embodiment of the present invention will be described. In the fifth embodiment, settings of parameters related to a plurality of uplink power controls are set, and the terminal 102 can compute uplink transmission power ($P_{PUSCH}$, $P_{PUCCH}$, $P_{SRS}$, and $P_{PRACH}$) of various uplink signals (a PUSCH, a PUCCH, an SRS, and a PRACH) by using the settings of parameters related to each uplink power control.

In the fifth embodiment, the base station 101 sets settings of parameters related to a plurality of uplink power controls (for example, settings of parameters related to a first uplink power control and settings of parameters related to a second uplink power control), and notifies the terminal 102 thereof. The terminal 102 computes a path loss on the basis of the settings of parameters related to the first uplink power control according to the information which has been sent, and computes uplink transmission power on the basis of the path loss and the settings of parameters related to the first uplink power control. In addition, the terminal 102 computes a path loss on the basis of the settings of parameters related to the second uplink power control according to the information of which the notification has been sent, and computes uplink transmission power on the basis of the path loss and the settings of parameters related to the second uplink power control. Here, the uplink transmission power which is computed on the basis of the settings of parameters related to the first uplink power control is referred to as first uplink transmission power, and the uplink transmission power which is computed on the basis of the settings of parameters related to the second uplink power control is referred to as second uplink transmission power.

The terminal 102 controls whether an uplink signal is transmitted at the first uplink transmission power or the uplink signal is transmitted at the second uplink transmission power, depending on a frequency resource or a timing in which or at which uplink grant is detected.

FIG. 10 is a diagram illustrating an example of information elements included in configurations (UplinkPowerControl) of parameters related to the (first) uplink power control. The configurations of parameters related to the uplink power control include a cell-specific configuration (a setting (UplinkPowerControlCommon) of parameters related to a cell-specific uplink power control), and a terminal-specific configuration (a configuration (UplinkPowerControlDedicated) of parameters related to a terminal-specific uplink power control), and parameters (information elements) related to the uplink power control which is set to be specific to a cell or a terminal are included in each configuration. The cell-specific configuration includes nominal PUSCH power (p0-NominalPUSCH) which is PUSCH power which can be set to be specific to a cell; an attenuation coefficient (path loss correction coefficient) α of a fractional transmission power control; nominal PUCCH power (p0-NominalPUCCH) which is PUCCH power which can be set to be specific to a cell; (deltaFList-PUCCH) as $\Delta_{F\_PUCCH}$ included in Equation (3); and a power correction value (deltaPreambleMsg3) in a case where a preamble message 3 is transmitted. In addition, the terminal-specific configuration includes terminal-specific PUSCH power (p0-UE-PUSCH) which is PUSCH power which can be set to be specific to a terminal; a parameter (deltaMCS-Enabled) related to the power correction value $K_s$ in the modulation and coding scheme used in Equation (2); a parameter (accumulationEnabled) which is necessary to set a TPC command; terminal-specific PUCCH power (p0-UE-PUCCH) which is PUCCH power which can be set to be specific to a terminal; power offsets $P_{SRS\_OFFSET}$ (pSRS-Offset and pSRS-OffsetAp-r10); and a filter coefficient (filterCoefficient) of reference signal received power RSRP. These configurations can be configured for a primary cell, but may also be set in a secondary cell. In addition, a terminal-specific configuration for the secondary cell includes a parameter (pathlossReference-r10) indicating that a path loss is computed by using a path loss measurement reference signal for the primary cell or the secondary cell.

FIG. 11 illustrates an example of information including configurations of parameters related to the uplink power control (configurations of parameters related to the first uplink power control). A parameter configuration (Uplink- PowerControlCommon) related to a (first) cell-specific uplink power control is included in a cell-specific radio resource configuration (RadioResourceConfigCommon). A parameter configuration (UplinkPowerControlDedicated1) related to a (first) terminal-specific uplink power control is included in a terminal-specific physical configuration (RadioConfigDedicated). A parameter configuration (UplinkPowerControlCommonSCell-r10-1) related to a (first) cell-specific uplink power control is included in a secondary cell-specific radio resource configuration (RadioResourceConfigCommonSCell-r10). A parameter configuration (UplinkPowerControlDedicatedSCell-r10-1) related to a (first) secondary cell terminal-specific uplink power control is included in a secondary cell terminal-specific physical configuration (RadioConfigDedicatedSCell-r10). In addition, a (primary cell) terminal-specific physical configuration is included in a (primary cell) terminal-specific radio resource configuration (RadioResourceConfigDedicated). Further, a secondary cell terminal-specific physical configuration is included in a secondary cell terminal-specific radio resource configuration (RadioResourceConfigDedicatedSCell-r10). Further, the above-described cell-specific radio resource configuration and terminal-specific radio resource configuration may be included in RRC connection reconfiguration (RRCConnectionReconfiguration) or RRC reestablishment (RRCConnectionReestablishment). Furthermore, the above-described secondary cell-specific radio resource setting and the secondary cell terminal-specific radio resource configuration may be included in a SCell addition/modification list. Moreover, the above-described cell-specific radio resource configuration and terminal-specific radio resource configuration may be configured for each terminal 102 by using an RRC signal (Dedicated signaling). In addition, the RRC connection reconfiguration and the RRC reestablishment may be configured for each terminal by using an RRC message. Further, the above-described configuration of parameters related to the cell-specific uplink power control may be configured for the terminal 102 by using system information. Furthermore, the above-described configuration of parameters related to the terminal-specific uplink power control may be configured for each terminal 102 by using an RRC signal (Dedicated signaling).

The base station 101 may separately set information elements included in each of the configurations of parameters related to the first uplink power control and the configurations of parameters related to the second uplink power control. For example, detailed description will be made with reference to FIGS. 13 to 16. FIG. 13 is a diagram illustrating an example of the configurations of parameters related to the second uplink power control in the present embodiment of the present specification. The configurations of parameters related to the second uplink power control include a configuration-r11 of parameters related to a second (primary) cell-specific uplink power control; a configuration-r11 of parameters related to a second secondary cell-specific uplink power control; a configuration-r11 of parameters related to a second (primary cell) terminal-specific uplink power control; and a configuration-r11 of parameters related to a second secondary cell terminal-specific uplink power control. In addition, the configurations of parameters related to the first uplink power control are as illustrated in FIGS. 10 and 12. Further, in the present embodiment of the present specification, a configuration-r11 of parameters related to a first (primary) cell-specific uplink power control, a setting-r11 of parameters related to a first secondary cell-specific uplink power control, a configuration-r11 of parameters related to a first (primary cell) terminal-specific uplink power control, and a configuration-r11 of parameters related to a second secondary cell terminal-specific uplink power control, may be included.

FIG. 14 is a diagram illustrating an example of configurations of parameters related to the first uplink power control and configurations of parameters related to the second uplink power control included in each radio resource configuration. A (primary) cell-specific radio resource configuration includes a configuration of parameters related to a first (primary) cell-specific uplink power control, and a configuration-r11 of parameters related to a second (primary) cell-specific uplink power control. In addition, a configuration-r11 of parameters related to a (primary) cell-specific uplink power control may be included. Further, a secondary cell-specific radio resource configuration includes a configuration of parameters related to a first secondary cell-specific uplink power control, and a configuration-r11 of parameters related to a second secondary cell-specific uplink power control. Furthermore, a configuration-r11 of parameters related to a secondary cell-specific uplink power control may be included. Moreover, a (primary cell) terminal-specific physical configuration includes a configuration of parameters related to a first (primary cell) terminal-specific uplink power control, and a configuration-r11 of parameters related to a second (primary cell) terminal-specific uplink power control. In addition, a secondary cell terminal-specific physical configuration includes a configuration of parameters related to a first secondary cell terminal-specific uplink power control, and a configuration-r11 of parameters related to a second secondary cell terminal-specific uplink power control. Further, the (primary cell) terminal-specific physical configuration is included in a (primary cell) terminal-specific radio resource configuration (RadioResourceConfigDedicated). Furthermore, the secondary cell terminal-specific physical configuration is included in a secondary cell terminal-specific radio resource configuration (RadioResourceConfigDedicatedSCell-r10). Moreover, the above-described cell-specific radio resource configuration and terminal-specific radio resource configuration may be included in the RRC connection reconfiguration (RRCConnectionReconfiguration) or the RRC reestablishment (RRCConnetionReestablishment). In addition, the above-described secondary cell-specific radio resource configuration and the secondary cell terminal-specific radio resource configuration may be included in an SCell adding/changing list. Further, the above-described cell-specific radio resource configuration and terminal-specific radio resource configuration may be set in each terminal 102 by using an RRC signal. Furthermore, the RRC connection reconfiguration and the RRC reestablishment may be set in the terminal 102 by using an RRC message. The RRC signal is referred to as a dedicated signal (dedicated signaling) or a higher layer signal (higher layer signaling) in some cases.

FIG. 15 is a diagram illustrating an example of a configuration of parameters related to the second cell-specific uplink power control. Information elements included in the parameter configuration-r11 related to the second (primary) cell-specific uplink power control or the parameter configuration-r11 related to the second secondary cell-specific uplink power control may be set to include all information elements illustrated in FIG. 15. In addition, information elements included in the parameter configuration-r11 related to the second (primary) cell-specific uplink power control or the parameter configuration-r11 related to the second secondary cell-specific uplink power control may be set to include only at least one of the information elements illustrated in FIG. 15. Further, the parameter configuration-r11 related to the second (primary) cell-specific uplink power control or the parameter configuration-r11 related to the second secondary cell-specific uplink power control may not include any information element. In this case, the base station 101 selects release, and notifies the terminal 102 of information thereon. Furthermore, an information element which is not set in the configuration of parameters related to the second cell-specific uplink power control may be common to the configuration of parameters related to the first cell-specific uplink power control.

FIG. 16 is a diagram illustrating an example of a configuration of parameters related to the first terminal-specific uplink power control and a configuration of parameters related to the second terminal-specific uplink power control. A path loss reference resource is set in the configurations of parameters related to the first primary cell/secondary cell terminal-specific uplink power control. In addition, along with the information elements illustrated in FIG. 10, a path loss reference resource is set in the configurations of parameters related to the second primary cell/secondary cell terminal-specific uplink power control. Information elements included in the parameter configuration-r11 related to the second (primary) cell-specific uplink power control or the parameter configuration-r11 related to the second secondary cell-specific uplink power control may be set to include all information elements illustrated in FIG. 16. In addition, information elements included in the parameter configuration-r11 related to the second (primary) terminal-specific uplink power control or the parameter configuration-r11 related to the second secondary terminal-specific uplink power control may be set to include only at least one of the information elements illustrated in FIG. 16. Further, the parameter configuration-r11 related to the second (primary) terminal-specific uplink power control or the parameter configuration-r11 related to the second secondary terminal-specific uplink power control may not include any information element. In this case, the base station 101 selects release, and notifies the terminal 102 of information thereon. Furthermore, an information element which is not set in the configuration of parameters related to the second terminal-specific uplink power control may be common to the configuration of parameters related to the first terminal-specific uplink power control. In other words, in a case where a path loss reference resource is not set in the configuration of parameters related to the second terminal-specific uplink power control, a path loss is computed on the basis of a path loss reference source which is set in the configuration of parameters related to the first terminal-specific uplink power control.

The path loss reference resource may be as illustrated in FIG. 12. In other words, a measurement target indicating a path loss reference resource may be associated with an index which is associated with a cell-specific reference signal antenna port 0 or a CSI-RS antenna port index (CSI-RS measurement index). A plurality of measurement targets may be set as the path loss reference resource. The terminal 102 may compute a path loss by using at least one of the measurement targets. A measurement target which is added to the path loss reference resource may be added by using an adding/changing list. In addition, the number of measurement targets to be added may be determined on the basis of a maximum measurement target ID. A measurement target ID may be determined on the basis of a measurement object ID. In other words, the number of measurement target to be added may be the same as the number of set measurement targets. Further, a measurement target which becomes unnecessary may be deleted by using a deletion list. Furthermore, as an example, a method of computing a path loss will be described in a case where a plurality of first and second measurement target configurations are associated with a path loss reference resource. As the path loss reference resource, a plurality of first and second measurement target configurations, that is, antenna ports 15 and 16 or the like of a channel state information reference signal may be designated in a path loss reference resource adding/changing list. In this case, a second path loss may be computed on the basis of a received signal power of the antenna ports 15 and 16 of the channel state information reference signal. In this case, a path loss calculated from the antenna port 15 and a path loss calculated from the antenna port 16 may be averaged, and an average path loss may be used as the second path loss, and a greater or smaller path loss of two path loss values may be used as the second path loss. In addition, a result in which two path losses are linearly processed may be used as the second path loss. Further, antenna ports may be an antenna port 0 of a cell-specific reference signal and the antenna port 15 of the channel state information reference signal. Furthermore, as another example, a plurality of second measurement target configurations, that is, the antenna ports 15 and 16 or the like of the channel state information reference signal may be designated as a second path loss reference resource in the path loss reference resource adding/changing list. In this case, a second path loss and a third path loss may be computed on the basis of received signal power of the antenna ports 15 and 16 of the channel state information reference signal. In this case, the first path loss, the second path loss, and the third path loss may be respectively associated with a first subframe subset, a second subframe subset, and a third subframe subset. In addition, the base station 101 may set a TPC command (transmission power control command) included in uplink grant which is sent in the first subframe subset to a first value, and may set a TPC command included in uplink grant which is sent in the first subframe subset to a second value different from the first value. In other words, the first value of the TPC command may be associated with the first subframe subset, and the second value of the TPC command may be associated with the second subframe subset. In this case, the first value and the second value may be set to be different from each other. In other words, the base station 101 may set the first value to be higher than the second value. Here, the first value and the second value are power correction values of the TPC command. Further, the first value or the second value may be represented in information bits. The first subframe subset, the second subframe subset, and the third subframe subset may be configured independently from each other. Subframes included in the first subframe subset to the third subframe subset may overlap each other. Furthermore, each of the first subframe subset, the second subframe subset, and the third subframe subset may be instructed to be configured by using a bit map. Moreover, in the first subframe subset, the second subframe subset, and the third subframe subset, configurations of an uplink subframe, a downlink subframe, and a special subframe may be set as a table (uplink-downlink configuration, or TDD UL/DL configuration). In addition, as a condition in which a subframe subset is set, a plurality of parameters of information regarding a subframe subset may be set. For example, in order to configure the first subframe subset and the second subframe subset, information regarding a first configuration and information regarding a second configuration are set. In relation to the subframe subset, if a single radio frame is constituted by subframes of #0 to #9, among them, the subframes of #0, #1, #2, #5, #6 and #7 may be used as the first subframe subset, and the subframes of #3, #4, #8 and #9 may be used as the second subframe subset.

As an example, it is assumed that a downlink subframe is divided into a first subset and a second subset. Here, in a case where uplink grant is received in a subframe n (where n is a natural number), the terminal 102 transmits an uplink signal in a subframe n+4, and thus an uplink subframe may also be naturally divided into a first subset and a second subset. The first subset may be associated with the configurations of parameters related to the first uplink power control, and the second subset may be associated with the configurations of parameters related to the second uplink power control. In other words, in a case where uplink grant is detected in a downlink subframe included in the first subset, the terminal 102 computes a path loss on the basis of various information elements included in the configurations of parameters related to the first uplink power control and a path loss reference resource (measurement target) included in the configurations of parameters related to the first uplink power control, so as to compute first uplink transmission power. In addition, in a case where uplink grant is detected in a downlink subframe included in the second subset, the terminal 102 computes a path loss on the basis of various information elements included in the configurations of parameters related to the second uplink power control and a path loss reference resource (measurement target) included in the configurations of parameters related to the second uplink power control, so as to compute second uplink transmission power.

Further, as an example, a control channel region including uplink grant may be associated with configurations of parameters related to an uplink power control. In other words, the base station 101 may change configurations of parameters related to an uplink power control used to compute uplink transmission power depending on in which control channel region (the first control channel region or the second control channel region) the uplink grant is detected by the terminal 102. That is, in a case where the uplink grant is detected in the first control channel region, the terminal 102 computes a path loss by using the configurations of parameters related to the first uplink power control so as to compute uplink transmission power. In addition, in a case where the uplink grant is detected in the second control channel region, the terminal 102 computes a path loss by using the configurations of parameters related to the second uplink power control so as to compute uplink transmission power. Further, as another example, a control channel region including downlink assignment may be associated with configurations of parameters related to an uplink power control. Furthermore, both of the uplink grant and the downlink assignment are the types of DCI formats.

In the fifth embodiment, the base station 101 notifies the terminal 102 of the configurations of parameters related to the first and second uplink power controls. As an example, according to the information of which the notification is sent, the terminal 102 computes a path loss (first path loss) on the basis of the configurations of parameters related to the first uplink power control, and computes first uplink transmission power on the basis of the first path loss and the configurations of parameters related to the first uplink power control. In addition, the terminal 102 computes a path loss (second path loss) on the basis of the configurations of parameters related to the second uplink power control, and computes second uplink transmission power on the basis of the second path loss and the configurations of parameters related to the second uplink power control. In other words, the first uplink transmission power may be computed at all times on the basis of a measurement target which is sent in the configurations of parameters related to the first uplink power control, and the second uplink transmission power may be computed at all times on the basis of a measurement target which is sent in the configurations of parameters related to the second uplink power control. In addition, the terminal 102 may control whether an uplink signal is transmitted at the above-described first uplink transmission power or the uplink signal is transmitted at the above-described second uplink transmission power, depending on a frequency resource or a timing in which or at which uplink grant is detected. Further, in a case where uplink grant is sent in a downlink subframe of the first subframe subset, the base station 101 sets a value of a TPC command to a first value, and in a case where uplink grant is sent in a downlink subframe of the second subframe subset, the base station sets a value of the TPC command to a second value. For example, the first value may be set to cause a higher power correction value than the second value. Furthermore, the base station 101 may perform a demodulation process of an uplink signal so that an uplink signal transmitted in an uplink subframe of the first subframe subset is demodulated, and an uplink signal transmitted in an uplink subframe of the second subframe subset is not demodulated.

As mentioned above, the first uplink transmission power and second uplink transmission power may be fixedly associated with the configurations of parameters related to the first and second uplink power controls.

In addition, in the fifth embodiment, the base station 101 notifies the terminal 102 of a radio resource control signal including the configurations of parameters related to the first and second uplink power controls so as to notify the terminal 102 of uplink grant. Further, the terminal 102 computes the first path loss and the first uplink transmission power on the basis of the configurations of parameters related to the first uplink power control, and the second path loss and the second uplink transmission power on the basis of the configurations of parameters related to the second uplink power control. In a case where the uplink grant is detected, an uplink signal is transmitted at the first or second uplink transmission power.

Since configurations of parameters related to a plurality of uplink power controls are set, the terminal 102 can select the configurations of parameters related to an uplink power control which is suitable for the base station 101 or the RRH 103, and can transmit an uplink signal to the base station 101 or the RRH 103 at appropriate uplink transmission power. More specifically, at least one type of information element may be set to different values among information bits included in the configurations of parameters related to the first and second uplink power controls. For example, in a case where α which is an attenuation coefficient used for fractional transmission power control in a cell is desired to be controlled differently between the base station 101 and the terminal 102 and between the RRH 103 and the terminal 102, the configurations of parameters related to the first uplink power control are associated as transmission power control for the base station 101 only, and the configurations of parameters related to the second uplink power control are associated as transmission power control for the RRH 103 only. Thus, a included in each configuration may be set as appropriate a. In other words, different fractional transmission power control can be performed between the base station 101 and the terminal 102 and between the RRH 103 and the terminal 102. Similarly, $P_{O\_NOMINAL\_PUSCH,c}$ or $P_{O\_UE\_PUSCH,c}$ may be set to different values in the configurations of parameters related to the first and second uplink power controls, and thus standard power of a PUSCH may be set to different values between the base station 101 and the terminal 102 and between the RRH 103 and the terminal 102. The same may also be performed on other parameters. In other words, each of various parameters included in the configurations of parameters related to the first and second uplink power controls may be set to different values. In addition, various parameters related to power control such as $P_{O\_NOMINAL\_PUSCH,c}$ or $P_{O\_UE\_PUSCH,c}$ included in the configurations of parameters related to the second uplink power control may be set in a wider range than various parameters related to power control such as $P_{O\_NOMINAL\_PUSCH,c}$ or $P_{O\_UE\_PUSCH,c}$ included in the configurations of parameters related to the first uplink power control. For example, $P_{O\_UE\_PUSCH,c}$ included in the configurations of parameters related to the second uplink power control may be set to a higher value and/or a lower value than $P_{O\_UE\_PUSCH,c}$ included in the configurations of parameters related to the first uplink power control. In addition, a power offset of an SRS included in the configurations of parameters related to the second uplink power control may be set to a higher value and/or a lower value than a power offset of an SRS included in the configurations of parameters related to the first uplink power control. Further, $P_{O\_UE\_PUCCH,c}$ included in the configurations of parameters related to the second uplink power control may be set to a higher value and/or a lower value than $P_{O\_UE\_PUCCH,c}$ included in the configurations of parameters related to the first uplink power control. For example, if a range of a configurable power value of $P_{O\_UE\_PUSCH,c}$ included in the configurations of parameters related to the first uplink power control is [−8,7], a range of a configurable power value of $P_{O\_UE\_PUSCH,c}$ included in the configurations of parameters related to the second uplink power control may be [−15,10]. Furthermore, if a range of a configurable power value of $P_{O\_UE\_PUCCH,c}$ included in the configurations of parameters related to the first uplink power control is [−8,7], a range of a configurable power value of $P_{O\_UE\_PUCCH,c}$ included in the configurations of parameters related to the second uplink power control may be [−15,10]. Moreover, if a range of a configurable offset of the SRS power offset included in the configurations of parameters related to the first uplink power control is [0,15], a range of a configurable offset of the SRS power offset included in the configurations of parameters related to the second uplink power control may be [−5,20]. In other words, a range of a first SRS power offset value may be different from a range of a second SRS power offset value.

In addition, the terminal 102 can change configurations of parameters related to an uplink power control used to compute uplink transmission power depending on the type of DCI format included in a received PDCCH. For example, in a case where a PDCCH including an SRS request is the DCI format 0 (first DCI format), transmit power of an A-SRS may be computed by using a power offset (first A-SRS power offset) of the A-SRS which is set in the configurations of parameters related to the first uplink power control, and in a case where the PDCCH including the SRS request is the DCI format 1A (second DCI format), transmit power of the A-SRS may be computed by using a power offset (second A-SRS power offset) of the A-SRS which is set in the configurations of parameters related to the second uplink power control. In other words, the terminal 102 may compute transmit power of the A-SRS by associating the type of DCI format including the SRS request with the configurations of parameters related to an uplink power control.

The terminal 102 may be notified by using an RRC signal, of whether or not configurations of parameters related to different uplink power controls are used depending on the type of DCI format. In other words, whether or not configurations of parameters related to the same uplink power control are used between the first and second DCI formats may be notified by using the RRC signal.

In addition, the terminal 102 may set uplink transmission power on the basis of the configurations of parameters related to the first uplink power control in a first state, and may set uplink transmission power on the basis of the configurations of parameters related to the second uplink power control in a second state. Here, a terminal in the first state is a terminal which sets RSRP on the basis of a CRS, and a terminal in the second state is a terminal which sets RSRP on the basis of a CSI-RS. The terminal in the second terminal is a terminal in which a plurality of parameters of configuration information regarding parameters of the CSI-RS are set. In addition, the configuration information regarding parameters of the CSI-RS includes at least one of configuration information regarding a port number or the number of ports of the CSI-RS, a resource, and a subframe. Further, the terminal in the first state is a terminal which detects downlink control information (DCI) in the first control channel region, and the terminal in the second state is a terminal which detects downlink control information in the first control channel region and/or the second control channel region. Furthermore, differences between the maximum value and the minimum value of terminal-specific configurable power values are different in the terminal in the first state and the terminal in the second state. For example, a difference between the maximum value and the minimum value of a terminal-specific configurable power value is set to be greater in the terminal in the second state than in the terminal in the first state. In other words, higher terminal-specific power can be set in the terminal in the second state than in the terminal in the first state, and lower terminal-specific power can be set in the terminal in the second state than in the terminal in the first state. Furthermore, higher SRS power offset can be set in the terminal in the second state than in the terminal in the first state, and lower SRS power offset can be set in the terminal in the second state than in the terminal in the first state. Moreover, tables for managing terminal-specific power may be different between the terminal in the first state and the terminal in the second state. In addition, tables for managing SRS power offsets may be different between the terminal in the first state and the terminal in the second state. Further, a plurality of second path loss compensation coefficients may be set. Furthermore, the second path loss compensation coefficient may be set in each uplink physical channel. Moreover, the terminal in the first state is a terminal in a first transmission mode, and the terminal in the second state is a terminal in a second transmission mode. For example, the terminal in the first transmission mode measures a path loss by using the CRS, and the terminal in the second transmission mode measures a path loss by using the CSI-RS. The terminal in the first transmission mode is a terminal which can access a single base station, and the terminal in the second transmission mode is a terminal which can access at least one base station. In other words, the terminal in the second transmission mode is also a terminal which can simultaneously access a plurality of base stations. In addition, the terminal in the second transmission mode is a terminal which can recognize a plurality of base stations as a single base station. Further, the terminal in the second transmission mode is a terminal which can recognize a plurality of cells as a single cell.

In addition, referring to FIG. 1, the terminal 102 may be controlled to compute a path loss and uplink transmission power by using the configurations of parameters related to the first uplink power control in relation to the uplink 106, and to transmit an uplink signal at the transmission power. The terminal may be controlled to compute a path loss and uplink transmission power by using the configurations of parameters related to the second uplink power control in relation to the uplink 108, and to transmit an uplink signal at the transmission power.

In addition, the first and second path losses may be computed by using filter coefficients which are set to different values. In other words, the first and second path losses may be computed by using first and second filter coefficients, respectively.

Sixth Embodiment

Next, a sixth embodiment will be described. In a sixth embodiment, the base station 101 notifies the terminal 102 of an RRC signal including configurations of parameters related to a plurality of (two or more) uplink power controls (for example, configurations of parameters related to first and second uplink power controls), and notifies the terminal 102 of a DCI format including an indication for transmission of an uplink signal. The terminal 102 receives the DCI format, determines the type of DCI format, computes a path loss and transmit power of an uplink signal on the basis of the configurations of parameters related to the first uplink power control in a case where the received DCI format is a first DCI format, computes a path loss and transmit power of the uplink signal on the basis of the configurations of parameters related to the second uplink power control in a case where the received DCI format is a second DCI format, and transmits the uplink signal at the uplink transmission power. Here, the first DCI format may be uplink grant, and the second DCI format may be downlink assignment. In addition, the first DCI format may be downlink assignment, and the second DCI format may be uplink grant. In other words, the first and second DCI formats may be different types of DCI formats. For example, the first DCI format may be the DCI format 0, and the second DCI format may be the DCI format 1A. Further, the first DCI format may be the DCI format 4, and the second DCI format may be the DCI format 2B/2C.

In addition, even in a case where the first and second DCI formats are the same type of DCI format (for example, the DCI format 0), if at least one of various items of control information (control field) included in the DCI format is set to a different value, the DCI formats can be regarded as the first and second DCI formats, respectively. For example, the DCI format 0 includes control information regarding a TPC command, and may be identified as the first and second DCI formats depending on a difference between values (indexes) of the TPC command. Herein, the TPC command has been described as an example, but other items of control information may be used. For example, the DCI format 0 includes information indicating cyclic shift for an UL DMRS. If each of information indicating cyclic shift for the UL DMRS are different from each other, the format may be identified as the first and second DCI formats. For example, if information indicating cyclic shift for the UL DMRS is set to a first value, the format may be identified as the first DCI format, and if information indicating cyclic shift for the UL DMRS is set to a second value, the format may be identified as the second DCI format. In addition, the first value or the second value may be represented in information bits.

Further, an information field (or information bit) indicating a change of configurations of parameters related to a plurality of uplink power controls may be set in a DCI format. In other words, configurations of parameters related to, for example, two uplink power controls may be changed depending on the information indicating the change thereof. Here, the base station 101 may set the configurations of parameters related to the two uplink power controls for different usage. It is possible to perform more dynamic scheduling by performing uplink power control of the terminal 102 by using a DCI format. For example, appropriate uplink transmission power controls are different in a case of performing communication only with the RRH 103 and in a case of performing coordinated communication with the base station 101 and the RRH 103. In order to perform more appropriate scheduling, the base station 101 may dynamically perform the uplink power control in a DCI format. A channel state information reference signal such as an SRS is preferably transmitted to each reference point at appropriate transmission power.

Since the base station 101 sets configurations of parameters related to a plurality of uplink power controls in a single terminal 102, it is possible to select uplink transmission power which is suitable for a plurality of base stations (a base station 1, a base station 2, a base station 3, . . . ) or a plurality of RRHs (an RRH 1, an RRH 2, an RRH 3, . . . ) and thus to minimize interference to other terminals which are connected between the plurality of base stations 101 (or the plurality of RRHs 103). In other words, the base station 101 (or the RRH 103) can select the base station 101 or the RRH 103 as an uplink reception point which is close to the terminal 102 (having a less path loss), and the base station 101 or the RRH 103 which is a reception point can set parameters which is suitable for the uplink transmission power control of the close side in the terminal 102. For example, a close base station (RRH) is the base station 101 (RRH 103) which transmits a path loss reference resource having a small computed path loss, and a distant base station (RRH) is the base station 101 (RRH 103) which transmits a path loss reference resource having a large computed path loss. The terminal 102 can identify the base stations 101 and the RRHs 103 (a plurality of downlink transmission points and uplink reception points, or a plurality of reference points) on the basis of a difference between the path loss reference resources.

In addition, the base station 101 may indicate the terminal 102 to change the configurations of parameters related to the plurality of uplink power controls (here, the configurations of parameters related to first and second uplink power controls) which is sent by using an RRC signal, depending on the type of DCI format. The base station 101 can perform an appropriate uplink transmission power control on the basis of various parameters which are set in a cell (the base station 101 or the RRH 103) connected to the terminal 102. In other words, the terminal 102 connected to a plurality of reception points (here, the base station 101 and the RRH 103) performs an appropriate uplink transmission power control for each reception point (reference point) so as to obtain the optimum throughput. The uplink transmission power (uplink transmission power control) can be dynamically changed, and thus it is possible to reduce interference to other reception points and the terminal 102 connected to the other reception points even in an area where the reception points (reference points) are densely located. In other words, it is possible to minimize interference to a terminal which performs communication by using the same frequency resource.

For example, in a case where configurations of parameters related to first and second uplink power controls are configured, the base station 101 may notify the terminal 102 thereof by using an RRC signal so that information indicating a change of the configurations is added to a DCI format.

In a case where the terminal 102 is connected to the base station 101, uplink transmission power is computed by using the configurations of parameters related to the first uplink power control in which an uplink physical channel (uplink signal) is set only in the base station 101. In addition, in a case where the terminal 102 is connected to the RRH 103, uplink transmission power is computed by using the configurations of parameters related to the second uplink power control in which an uplink physical channel (uplink signal) is set only in the RRH 103. Alternatively, the uplink transmission power which is obtained from the configurations of parameters related to the first and second uplink power controls may be set in advance to nominal PUSCH power for compensating for power which attenuates according to a distance between the base station 101 (or the RRH 103) and the terminal 102. In other words, the terminal 102 can change and transmit an uplink signal whose transmission power is relatively high or transmission power is low by changing the configurations of parameters related to the first and second uplink power controls. Here, the relatively high transmission power is transmission power which does not cause the terminal to be an interference source with respect to other terminals or which is enough to compensate for a large path loss. In addition, the relatively low transmission power is transmission power which can cause a transmit signal to reach a reception point or which is enough to compensate for a small path loss.

Further, information (information bit) indicating a change of configurations of parameters related to two uplink power controls may be included in a DCI format. For example, in a case where information indicating the change is set to a first value (for example, '0'), the terminal 102 computes uplink transmission power on the basis of the configurations of parameters related to the first uplink control, and in a case where the information indicating the change is set to a second value (for example, '1'), the terminal 102 computes uplink transmission power on the basis of the configurations of parameters related to the second uplink control.

The information indicating the change may be associated with control information which is included in a DCI format. For example, a value of a cyclic shift index of an UL DMRS may be associated with the information for giving an indication for the change.

In addition, in a case where at least item of control information included in a DCI format has a predetermined value, the information indicating the change may be represented in a code point which is recognized by the terminal 102 if information for giving an indication for the change is included in the DCI format. For example, in a case where predetermined information (value) is set in first control information which is included in a DCI format transmitted from the base station 101 or the RRH 103, the terminal 102 may replace the information included in the DCI format. In this case, in a communication system constituted by the terminal 102 and the base station 101 (or the RRH 103), the predetermined information set in the first control information may be defined as a predetermined code point. Here, in a case where the first control information is constituted by localized arrangement/distributed arrangement identification information of virtual resource blocks and resource block assignment information, and the localized arrangement/distributed arrangement identification information of virtual resource blocks is represented in 1 bit, and the resource block assignment information is represented in 5 bits, the predetermined code point corresponds to a case where 1 bit indicates '0', and all 5 bits indicate '1'. Only in a case where this code point is detected, the terminal 102 can recognize that information for giving an indication for the change is included in the DCI format. In other words, the predetermined code point may not be constituted by only predetermined information of a single item of control information. That is, only in a case where each of a plurality of items of control information is represented by predetermined information, the terminal 102 regards this as a predetermined code point, and recognizes that information for giving an indication for the change is included in the DCI format. For example, in a case where each of the localized arrangement/distributed arrangement identification information of virtual resource blocks and the resource block assignment information is represented by predetermined information, indication information is recognized to be included in a DCI format. In other cases, the terminal 102 performs resource assignment on the basis of the localized arrangement/distributed arrangement identification information of virtual resource blocks and the resource block assignment information. For example, control information forming a code point may be constituted by predetermined information of information (cyclic shift for DMRS and OCC index) regarding cyclic shift for an UL DMRS and permission information of frequency hopping of a PUSCH. In addition, in a case where each of modulation and coding scheme (MCS) information, HARQ process number information, new data indicator (NDI) information included in a DCI format is predetermined information, the terminal 102 recognizes this as a code point, and recognizes that indication information is included in the DCI format. In a case where the code point is detected, the terminal 102 may recognize some or all control information which is not used in the code point of the DCI format as information for giving an indication for the change. For example, control information which is recognized as the information for giving an indication for the change may be the localized arrangement/distributed arrangement identification information of virtual resource blocks. In addition, control information which is recognized as the information for giving an indication for the change may be the resource block assignment information. Further, control information which is recognized as the information for giving an indication for the change may be an SRS request. Furthermore, control information which is recognized as the information for giving an indication for the change may be a CSI request. Moreover, control information which is recognized as the information for giving an indication for the change may be the information regarding cyclic shift for an UL DMRS. Control information which is recognized as the information for giving an indication for the change may be represented by using the plurality of items of control information described above.

In a case where only the macro base station 101 transmits a PDCCH or an RRC signal including control information, the macro base station 101 may give an indication to the terminal 102 in a DCI format with regard to whether an uplink dedicated to the macro base station 101 is transmitted or an uplink signal dedicated to the RRH 103 is transmitted. In other words, the macro base station 101 can perform control so that the uplink signal is transmitted to an uplink reception point which can perform appropriate uplink transmission power control in consideration of a position of the terminal 102 or a loss of transmission power.

Two or more configurations of parameters related to uplink power controls regarding various uplink physical channels (a PUSCH, a PUCCH, an SRS, and a PRACH) may be set. As an example, in a case where two configurations of parameters related to uplink power controls are set for various uplink physical channels, information for giving an indication for a change thereof is included in a DCI format. The information may be represented in 1 bit. For example, in a case where received information for giving an indication for the change indicates a first value (for example, '0'), the terminal 102 computes various uplink transmission power levels by using configurations of parameters related to the first uplink power control. In a case where received information for giving an indication for the change indicates a second value (for example, '1'), the terminal 102 computes various uplink transmission power levels by using configurations of parameters related to the second uplink power control.

For example, control information associated with the configurations of parameters related to the first and second uplink power controls may be included in a DCI format. In other words, in a case where the terminal 102 is instructed to compute uplink transmission power by using the configurations of parameters related to the first uplink power control in the control information, that is, in a case where an indication for first power control is given, the uplink transmission power is computed on the basis of the configurations of parameters related to the first uplink power control. In addition, in a case where the terminal 102 is instructed to compute uplink transmission power by using the configurations of parameters related to the second uplink power control in the control information, that is, in a case where an indication for second power control is given, the uplink transmission power is computed on the basis of the configurations of parameters related to the second uplink power control. In this case, the terminal 102 is notified of an RRC signal including the configurations of parameters related to the first and second uplink power controls. Similarly, the information for giving an indication for the change may be represented in 2 bits. Further, in a case where the terminal 102 is indicated to compute uplink transmission power by using the configurations of parameters related to third uplink power control in the control information, that is, in a case where an indication for third power control is given, the uplink transmission power may be computed on the basis of the configurations of parameters related to the third uplink power control, and in a case where the terminal 102 is instructed to compute uplink transmission power by using the configurations of parameters related to fourth uplink power control in the control information, that is, in a case where an indication for fourth power control is given, the uplink transmission power may be computed on the basis of the configurations of parameters related to the fourth uplink power control. As mentioned above, in a case where an indication is given for computation of uplink transmission power by using parameters related to an uplink power control selected from among configurations of parameters related to a plurality of uplink power controls, uplink transmission power may be computed on the basis of configurations of parameters related to the selected uplink power control.

In addition, a parameter set used in an A-SRS is uniquely selected from among a plurality of parameter sets for the A-SRS by information indicated by an SRS request indicating a request of the A-SRS transmission included in a DCI format. Here, configurations of parameters related to an uplink power control may be included in a parameter set for the A-SRS associated with the SRS request. In other words, configurations of parameters related to the first uplink power control may be included in a first SRS (A-SRS) parameter set, and configurations of parameters related to the second uplink power control may be set in a second SRS (A-SRS) parameter set. Similarly, configurations of parameters related to the third uplink power control may be included in a third SRS (A-SRS) parameter set, and configurations of parameters related to the fourth uplink power control may be set in a fourth SRS (A-SRS) parameter set. Similarly, the plurality of SRS (A-SRS) parameter sets may be respectively associated with the configurations of parameters related to the plurality of uplink power controls, and, specifically, four or more SRS (A-SRS) parameter sets may be respectively associated with the configurations of parameters related to four or more uplink power controls. In addition, the SRS (A-SRS) parameter set includes cyclic shift for an SRS. Further, the SRS parameter set includes a transmission bandwidth of an SRS. Furthermore, the SRS parameter set includes the number of antenna ports for an SRS. Moreover, the SRS parameter set includes a transmission comb which is a frequency offset of an SRS. In addition, the SRS parameter set includes a hopping bandwidth. Further, the SRS parameter set includes an identity (a cell ID or a parameter) for setting a base sequence of an SRS.

The base station 101 changes configurations of parameters related to uplink power controls of the terminal 102, and can thus implicitly control a change of reception points of an uplink with respect to the terminal 102.

Dynamic uplink transmission power control can be controlled on the terminal 102 which moves fast or the terminal 102 whose transmission and reception points are frequently changed, and thus it becomes easier to obtain appropriate throughput.

In addition, path loss reference resources may be respectively included in configurations of parameters related to a plurality of uplink power controls in the present embodiment. Further, the path loss reference resource may be one described in the third embodiment. In other words, the path loss reference resource may include information associated with an antenna port. Furthermore, as long as the path loss reference resource is associated with an antenna port, the path loss reference resource may be associated with a radio resource associated with the antenna port 0, that is, a cell-specific reference signal (CRS), and may be associated with a radio resource associated with the antenna ports 15 to 22, that is, a channel state information reference signal (CSI-RS). Moreover, the parameters described in the third embodiment may be included in the configurations of parameters related to the first and second uplink power controls in the present embodiment. In other words, the parameters may be a (that is, a path loss compensation coefficient) which is attenuation coefficient used for a fractional transmission power control in a cell, and may be $P_{O\_NOMINAL\_PUSCH,c}$ or $P_{O\_UE\_PUSCH,c}$ (that is, a cell-specific or terminal-specific power control parameter related to standard power of a PUSCH). In addition, the parameters may be a power offset or a filter coefficient of a sounding reference signal. The parameters may be $P_{O\_NOMINAL\_PUCCH,c}$ or $P_{O\_UE\_PUCCH,c}$ (that is, a cell-specific or terminal-specific power control parameter related to standard power of a PUCCH).

Seventh Embodiment

Next, a seventh embodiment will be described. In the seventh embodiment, the base station 101 sets uplink physical channels, sets path loss reference resources in each of the uplink physical channels, and notifies the terminal 102 of an RRC signal including the configuration information. According to the information (configuration information or control information) included in the RRC signal, the terminal 102 sets uplink physical channels, sets parameters related to an uplink power controls for each of the uplink physical channels, sets transmit power of the various uplink physical channels on the basis of the parameters related to the uplink power controls, and transmits the uplink physical channel within the transmit power.

In addition, in a case where path loss reference resources for the various uplink physical channels is sent by using the RRC signal, a path loss reference resource for computing transmit power of a PUSCH may be set in a terminal-specific PUSCH configuration (PUSCH-ConfigDedicated). A path loss reference resource for computing the transmit power of a PUCCH may be set in a terminal-specific PUCCH configuration (PUCCH-ConfigDedicated). A path loss reference resource for computing the transmit power of a P-SRS may be set in a terminal-specific sounding reference signal UL configuration (SoundingRS-UL-ConfigDedicated). A path loss reference resource for computing the transmit power of an A-SRS may be set in SRS configuration aperiodic (SRS-ConfigAp). A path loss reference resource for computing the transmit power of a P-SRS may be set in PRACH configuration information (PRACH-ConfigInfo). This configuration information is sent from the base station 101 to the terminal 102 by using an RRC signal. In other words, the path loss reference resources may be set terminal-specific parameter configurations of various uplink physical channels. That is, the base station 101 sets a path loss reference resource of each uplink physical channel assigned to the terminal 102 in each terminal 102, and notifies the terminal 102 of the RRC signal including the configuration information. In addition, the path loss reference resource may include information associated with antenna port(s). Further, as long as the path loss reference resource is associated with an antenna port, the path loss reference resource may be associated with a radio resource associated with the antenna port 0, that is, a cell-specific reference signal (CRS), and may be associated with a radio resource associated with the antenna ports 15 to 22, that is, a channel state information reference signal (CSI-RS).

In addition, path loss reference resources for various uplink physical channels may be set to be included in cell-specific parameter configurations.

Further, path loss reference resources for various uplink physical channels (a PUSCH, a PUCCH, SRSs (a P-SRS and an A-SRS), and a PRACH) may be respectively set in configurations (UplinkPowerControlDedicated) of parameters related to terminal-specific uplink power controls. Path loss reference resources for various uplink physical channels may be respectively set in configurations (UplinkPowerControlCommon) of parameters related to cell-specific uplink power controls. Furthermore, the above-described various uplink signals have the same meaning as the various uplink physical channels.

In a case where reception base stations 101 (or RRHs 103) are different depending on the type of uplink physical channel, it is assumed that, among a plurality of base stations, a base station 101 (having a smaller path loss) which is closer to the terminal 102 is a base station A, a base station 101 (having a larger path loss) which is more distant from the terminal 102 is a base station B, and a PUSCH and an SRS are respectively transmitted to the base station A and the base station B. Common path loss reference resources are transmitted from different base stations, and are thus combined and received by the terminal 102. If a path loss is computed from the same path loss reference resource for any uplink physical channel, and each transmission power level is computed, accurate path losses between the base station A and the terminal 102 and between the base station B and the terminal 102 cannot be obtained since a path loss is computed from reception power of a combined path loss reference resource. For this reason, if the PUSCH is transmitted to the base station A at transmit power higher than appropriate transmit power, and the SRS is transmitted to the base station B at transmit power lower than the appropriate transmit power, in the base station A, the PUSCH which is transmitted from the terminal 102 becomes an interference source to signals which are transmitted from other terminals, and, in the base station B, an appropriate channel measurement using the SRS transmitted from the terminal 102 cannot be performed, and thus appropriate scheduling cannot be performed. Particularly, the SRS is a channel which is required to measure a channel between the base station 101 and the terminal 102, and uplink scheduling is performed from a channel measurement result. Therefore, if appropriate channel measurements are not performed between the base station A and the terminal 102 and between the base station B and the terminal 102, a base station 101 which is closest to the terminal 102 cannot be selected, and it is hard to obtain appropriate throughput at appropriate transmit power. In addition, in this case, a distance (close to or distant from the terminal 102) between the terminal 102 and the base station 101 is estimated on the basis of a path loss. In other words, the base station 101 (or the RRH 103) determines that a distance from the terminal 102 is short if a path loss is small, and determines that a distance from the terminal 102 is long if a path loss is large. Further, the magnitude of a path loss may be determined on the basis of a threshold value. The base station 101 performs control so that a reception point close to the terminal 102 is connected to the terminal 102.

The terminal 102 which can compute each path loss from a plurality of path loss reference resources may use a computation result of each path loss for transmission power controls of various uplink physical channels. In other words, the terminal 102 may set transmit power of various uplink physical channels on the basis of a computation result of a path loss using a path loss reference resource which is set in each uplink physical channel. For example, a first path loss reference resource may be configured for a PUSCH; a second path loss reference resource may be configured for a PUCCH; a third path loss reference resource may be configured for a PRACH; a fourth path loss reference resource may be configured for a P-SRS; and a fifth path loss reference resource may be configured for an A-SRS. In addition, these path loss reference resources may be ones described in the third embodiment. Further, these path loss reference resources may be a downlink reference signal associated with an antenna port. Furthermore, these path loss reference resources may be designated by a downlink antenna port(s). Here, configuration information of these path loss reference resources may be sent to the terminal 102 by using an RRC signal. Moreover, configuration information of these path loss reference resources which is included in a DCI format may be sent to the terminal 102. Here, configuration information of these path loss reference resources may be included in a cell-specific or terminal-specific configuration of each uplink physical channel. In addition, configuration information of these path loss reference resources may be included in configurations of parameters related to uplink power controls which are included in a configuration of each uplink physical channel. Further, path loss reference resources which are set in various uplink physical channels may be set independently, and the same type of path loss reference resource may not be necessarily set. In other words, items of information associated with an antenna port may not be the same as each other in such path loss reference resources.

In addition, a plurality of path loss reference resources may be set in some uplink physical channels. For example, parameter sets corresponding to values of an SRS request can be configured for the A-SRS, and path loss reference resources can be respectively configured for each thereof. For example, as a path loss reference resource of the A-SRS, first to fourth path loss reference resources may be configured. Further, a fifth path loss reference resource may be configured for the P-SRS.

Path losses of the PUSCH, the PUCCH, the PRACH, and the P-SRS may be computed on the basis of the same path loss reference resource, and a path loss of the A-SRS may be computed on the basis of a path loss reference resource different therefrom. In other words, a path loss reference resource may be independently configured for some of the uplink physical channels. In addition, a path loss reference resource of at least one of the uplink physical channels may be sent by using an RRC signal. Further, a path loss reference resource of at least one of the uplink physical channels may be sent by using a DCI format.

The same types of path loss reference resources which are transmitted by a plurality of base stations 101 and RRHs 103 (a plurality of reference points) are combined in the terminal 102. If a path loss is computed on the basis of the combined path loss reference resource, the path loss is not reflected on a reference point which is distant from the terminal 102, and if uplink transmission power is computed by using the path loss and an uplink signal is transmitted, there is a probability that the uplink signal may not reach the distant reference point. In addition, if a path loss is computed on the basis of reception power of the combined path loss reference resource, and uplink transmission power is computed, in a case where uplink transmit power of an uplink signal which is transmitted from the terminal 102 is relatively low, the uplink signal does not reach the base station 101 or the RRH 103, and if the uplink transmission power is relatively high, the signal becomes an interference source to other terminals.

In addition, in relation to a combined downlink signal which is transmitted from the base station 101 and the RRH 103 (a plurality of downlink transmission points), since the downlink signal cannot be separated in the terminal 102, a path loss cannot be accurately measured on the basis of a downlink signal transmitted from each of the base station 101 and the RRH 103. The base station 101 is required to set a path loss reference resource for each downlink transmission point in order to measure path losses of downlink signals which are transmitted from a plurality of downlink transmission points.

In a case where the terminal 102 transmits PRACHs to the base station 101 and the RRH 103 (or a plurality of reference points), path loss reference resources used to compute transmit power of the transmitted PRACHs may be different from each other. In other words, a transmission power control of the PRACH toward the base station 101 and the RRH 103 may be performed on the basis of the path loss reference resource which is transmitted from each of the base station 101 and the RRH 103. In addition, in order to perform random access dedicated to the base station 101 or dedicated to the RRH 103, the base station 101 may notify the terminal 102 of an RRC signal including information for giving an indication for changing path loss reference resources of the PRACHs, and the terminal 102 may be configured (reconfigured) with the path loss reference resources of the PRACHs on the basis of the change information included in the RRC signal.

In addition, parameters or parameter sets related to uplink power settings in which various uplink physical channels are set to different values may be set in the 1102. FIG. 17 illustrates an example of parameters related to an uplink power control, which are set in each uplink physical channel. In FIG. 17, configurations (UplinkPowerControl) of parameters related to configurations of parameters related to an uplink power control are set in each of terminal-specific configurations of the PUCCH, the PUSCH, the P-SRS, and the A-SRS (terminal-specific PUCCH configuration-v11x0 (PUCCH-ConfigDedicated-v11x0), terminal-specific PUSCH configuration-v11x0 (PUSCH-ConfigDedicated-v11x0), terminal-specific sounding reference signal UL configuration-v11x0 (SoundingRS-UL-ConfigDedicated-v11x0), and aperiodic SRS configuration-r11 (SRS-ConfigAp-r11)). Further, power ramping step (powerRampingStep) and preamble initial received target power (preambleInitialReceivedTargetPower) are set in the PRACH and a random access channel (RACH). The configurations of parameters related to an uplink power control may be ones illustrated in FIG. 10. Path loss reference resources may be set in these configurations. In addition, the path loss reference resource may include information associated with an antenna port. Furthermore, as long as the path loss reference resource is associated with an antenna port(s), the path loss reference resource may be associated with a radio resource associated with the antenna port 0, that is, a cell-specific reference signal (CRS), and may be associated with a radio resource associated with the antenna ports 15 to 22, that is, a channel state information reference signal (CSI-RS).

For example, in a case where a path loss is not taken into consideration, a set of various power control parameters (first power control parameter set) which are set to cause relatively high transmission power and a set of various power control parameters (second power control parameter set) which are set to cause relatively low transmit power are set in the terminal 102. The base station 101 notifies the terminal 102 of an RRC signal or a DCI format (PDCCH) including information indicating a change between the first and second parameter sets. The terminal 102 computes uplink transmission power for each of various uplink physical channels, and transmits the uplink physical channels (uplink signals). In addition, values of the various parameters included in the power control parameter sets are set by the base station 101 in consideration of a measurement report result, a channel measurement result using an SRS, a measurement result included in power headroom reporting (PHR) for performing a notification of a power surplus value of the terminal 102, and the like.

For example, information for giving an indication for a change of parameter sets related to uplink power controls may be set in each uplink physical channel. In addition, the information for giving an indication for the change may be sent to each terminal 102 by using an RRC signal. Further, the information for giving an indication for the change may be included in a DCI format.

Information (information bit) for giving an indication for a change of parameter sets related to two uplink power controls may be included in a DCI format. For example, in a case where the information for giving an indication for the change is set to a first value (for example, '0'), the terminal 102 computes uplink transmission power on the basis of configurations of parameters related to a first uplink control, and in a case where the information for giving an indication for the change is set to a second value (for example, '1'), the terminal 102 sets uplink transmission power on the basis of configurations of parameters related to a second uplink control.

The information for giving an indication for the change may be associated with control information included in a DCI format. For example, a value of a cyclic shift index of an UL DMRS may be associated with the information for giving an indication for the change.

In addition, in a case where at least one control information included in a DCI format has a predetermined value, the information for giving an indication for the change may be represented in a code point which is recognized by the terminal 102 if information for giving an indication for the change is included in the DCI format. For example, in a case where predetermined information (value) is set in first control information which is included in a DCI format transmitted from the base station 101 or the RRH 103, the terminal 102 may replace the information included in the DCI format. In this case, in a communication system constituted by the terminal 102 and the base station 101 (or the RRH 103), the predetermined information set in the first control information may be defined as a predetermined code point. Here, in a case where the first control information is constituted by localized arrangement/distributed arrangement identification information of virtual resource blocks and resource block assignment information, and the localized arrangement/distributed arrangement identification information of virtual resource blocks is represented in 1 bit, and the resource block assignment information is represented in 5 bits, the predetermined code point corresponds to a case where 1 bit indicates '0', and all 5 bits indicate '1'. Only in a case where this code point is detected, the terminal 102 can recognize that information for giving an indication for the change is included in the DCI format. In other words, the predetermined code point may not be constituted by only predetermined information of a single item of control information. That is, only in a case where each of a plurality of items of control information is represented by predetermined information, the terminal 102 regards this as a predetermined code point, and recognizes that information for giving an indication for the change is included in the DCI format. For example, in a case where each of the localized arrangement/distributed arrangement identification information of virtual resource blocks and the resource block assignment information is represented by predetermined information, the information for giving an indication for the change is recognized to be included in a DCI format. In other cases, the terminal 102 performs resource assignment on the basis of the localized arrangement/distributed arrangement identification information of virtual resource blocks and the resource block assignment information. For example, control information forming a code point may be constituted by predetermined information of information (cylic shift for DMRS and OCC index) regarding cyclic shift for an UL DMRS and permission information of frequency hopping of a PUSCH. In addition, in a case where each of modulation and coding scheme (MCS) information, HARQ process number information, new data indicator (NDI) information included in a DCI format is predetermined information, the terminal 102 recognizes this as a code point, and recognizes that indication information is included in the DCI format. In a case where the code point is detected, the terminal 102 may recognize some or all control information which is not used in the code point of the DCI format as information for giving an indication for the change. For example, control information which is recognized as the information for giving an indication for the change may be the localized arrangement/ distributed arrangement identification information of virtual resource blocks. In addition, control information which is recognized as the information for giving an indication for the change may be the resource block assignment information. Further, control information which is recognized as the information for giving an indication for the change may be an SRS request. Furthermore, control information which is recognized as the information for giving an indication for the change may be a CSI request. Moreover, control information which is recognized as the information for giving an indication for the change may be the information regarding cyclic shift for an UL DMRS. Control information which is recognized as the information for giving an indication for the change may be represented by using the plurality of items of control information described above.

For example, a plurality of parameters $P_{O\_NOMINAL\_PUSCH}$ or $P_{O\_UE\_PUSCH}$ are configured for the PUSCH. A plurality of parameters $P_{O\_NOMINAL\_PUCCH}$ or $P_{O\_UE\_PUCCH}$ are configured for the PUCCH. In addition, the plurality of the parameters may be configured for each of various power control parameters. Further, the plurality of the parameters may be configured for each parameter set. Furthermore, a plurality of SRS power offsets may be configured for the SRS. A plurality of random access preamble initial received power levels or power ramping steps may be configured for the PRACH. The terminal 102 sets transmit power of the uplink physical channels on the basis of the parameters. In other words, a plurality of parameters related to an uplink power control may be configured for at least some of uplink physical channels. That is, first and second parameters related to the uplink power control may be configured for some of the uplink physical channels. Configuration information of the parameters related to power control may be dynamically controlled on the basis of information for giving an indication for a change thereof.

A single parameter related to an uplink power control is set in each of the various uplink physical channels. The parameter related to the uplink power control may include at least one power control parameters among the above-described configurations of parameters related to an uplink power controls which are set to be specific to a cell or a terminal. For example, $P_{O\_NOMINAL\_PUSCH}$ or $P_{O\_UE\_PUSCH}$ may be configured. In addition, $P_{O\_NOMINAL\_PUCCH}$ or $P_{O\_UE\_PUCCH}$ may be configured. Further, an SRS power offset may be configured. Furthermore, random access preamble initial received power or a power ramping step may be configured. Moreover, a filter coefficient or a path loss compensation coefficient $\alpha$ may be configured.

In addition, the base station 101 may set transmit power of a downlink reference signal which is transmitted to each terminal 102. The base station 101 may set second reference signal power (referenceSignalPower2) on the basis of a terminal-specific PDSCH configuration (PDSCH-ConfigDedicated), and may notify the terminal 102 of configuration information thereof. For example, the second reference signal power may set as transmit power of a DL DMRS or a CSI-RS. In addition, not only the second reference signal power but also reference signal power related to a downlink antenna port. Further, reference signal power may be set for each path loss reference resource. Furthermore, information associated with an antenna port may be associated with reference signal power.

In addition, the base station 101 may set transmit power of various downlink reference signals or a downlink reference signal(s) associated with a downlink antenna port(s), in each terminal 102.

Further, the base station 101 may add a path loss reference resource to a cell-specific parameter configuration of each uplink physical channel.

Furthermore, the base station 101 may add a path loss reference resource to a terminal-specific parameter configuration of each uplink physical channel.

A plurality of path loss reference resources may be associated with configurations of parameters related to a plurality of uplink power controls. For example, in a case where a path loss reference resource of the PUSCH is set to a CRS antenna port 0, the terminal 102 may compute transmit power of the PUSCH on the basis of configurations of parameters related to a first uplink power control. In addition, in a case where a path loss reference resource of the PUSCH is set to a CSI-RS antenna port 15, the terminal 102 may compute transmit power of the PUSCH on the basis of configurations of parameters related to a second uplink power control.

Further, a plurality of path loss reference resources may be set in some of the uplink physical channels. For example, a first path loss reference resource and a second path loss reference resource include information which is associated with different antenna ports. Furthermore, different downlink reference signals are configured for the first path loss reference resource and the second path loss reference resource. As an example, the first path loss reference resource may be a CRS, and the second path loss reference resource may be a CSI-RS. As another example, the first path loss reference resource may be a resource which is set in the antenna port 15, and the first path loss reference resource may be a resource which is set in the antenna port 22. The first and second path loss reference resources may be one of parameters of information associated with the antenna ports.

Configurations of parameters related to uplink power controls may be set in each of the various uplink physical channels. For example, configurations of parameters related to a first uplink power control may be configured for the PUSCH; configurations of parameters related to a second uplink power control may be configured for the PUCCH; configurations of parameters related to a third uplink power control may be set in the PRACH; configurations of parameters related to a fourth uplink power control may be configured for the P-SRS; and configurations of parameters related to a fifth uplink power control may be configured for the A-SRS. Power control parameters which are configured for the configurations of parameters related to the first to fifth uplink power controls may not necessarily be the same as each other. For example, the configurations of parameters related to the first to third uplink power controls may include only parameters which are configured for terminal-specific configurations. In addition, the configurations of parameters related to the fourth and fifth uplink power controls may include parameters which are set cell-specific and terminal-specific configurations. Further, each of the configurations of parameters related to the first to fifth uplink power controls may include cell-specific and terminal-specific configurations, and values of the various power control parameters may not necessarily be the same as each other. In other words, values of the various power control parameters may not be set to the same values. That is, a power control parameter which is set to different values may be used as first and second power control parameters.

In addition, configurations of parameters related to a single uplink power control may be configured for the various uplink physical channels. In other words, the same power control parameter may be configured for the various uplink physical channel, and a value included in the power control parameter is determined for each uplink physical channel.

Further, configurations of parameters related to a plurality of uplink power controls may be configured for at least some of the uplink physical channels. For example, configurations of parameters related to an uplink power controls may be included in SRS parameter sets associated with an SRS request indicating a request of the A-SRS transmission. In other words, in a case where four SRS parameter sets are configured, configurations of parameters related to four uplink power controls are configured therein. In addition, configurations of parameters related to a plurality of uplink power controls may also be configured for the PRACH. Further, configurations of parameters related to a plurality of uplink power controls may also be configured for the PUSCH.

Furthermore, in a case where parameters (or a power control parameter set) related to first and second uplink power controls are configured for at least some of the uplink physical channels, the parameters related to the first and second uplink power controls are set to different parameters. Moreover, the parameters related to the first and second uplink power controls are respectively set to different values. In addition, various parameters included in parameter sets related to the first and second uplink power controls may not necessarily be set to the same parameters. As an example, various parameters included in the parameter set related to the first uplink power control may be set to only an SRS power offset, and various parameters included in the parameter set related to the second uplink power control may be set to the SRS power offset and standard PUSCH power. Further, as another example, various parameters included in the parameter set related to the first uplink power control may be various parameters included in configurations of parameters related to a cell-specific uplink power control, and various parameters included in the parameter set related to the second uplink power control may be various parameters included in configurations of parameters related to a terminal-specific uplink power control. Furthermore, as still another example, various parameters included in the parameter set related to the first and second uplink power controls may be various parameters included in configurations of parameters related to cell-specific and terminal-specific uplink power controls. In other words, the parameter set related to the uplink power control may include at least one of the parameters illustrated in FIG. 10. Moreover, only a path loss reference resource may be included in the parameter set related to the uplink power control. In addition, various parameters included in the parameter set related to the first and second uplink power controls may include parameters (cell IDs) used to generate sequences of the various uplink physical channels. For example, the above-described parameter may be a cell ID used to generate a base sequence of the SRS (the A-SRS or the P-SRS). The above-described parameter may be a cell ID used to generate a base sequence of the PUSCH DMRS. The above-described parameter may be a cell ID used to generate a base sequence of the PUCCH DMRS. The above-described parameter may be a cell ID used to generate a base sequence of the PUSCH. The above-described parameter may be a cell ID used to generate a base sequence of the PUCCH.

If the configurations of parameters related to the uplink power control or the path loss reference resources are configured for each of the various uplink physical channel, the terminal 102 can compute transmit power of each uplink physical channel on the basis of the configurations. The P-SRS or the A-SRS may be used for a channel measurement for backhaul, fallback or a pre-measurement, in order to change reference points. The base station 101 can control the terminal 102 to communicate an appropriate reference point at all times on the basis of a channel measurement result using the SRS.

The base station 101 sets configurations of parameters related to the uplink power control in each uplink physical channel, and can thus appropriately perform uplink transmission power control of the various uplink physical channels for each reference point (uplink reception point). For example, since transmit power assigned to the PUSCH or the PUCCH is increased if the terminal 102 can perform communication with a reference point having a small path loss, a modulation method with a high modulation degree, such as 16 QAM or 64 QAM is employed, and thus uplink communication can be performed. Therefore, throughput is improved.

Eighth Embodiment

Next, an eighth embodiment will be described. In the eighth embodiment, the base station 101 or the RRH 103 transmits a radio resource control signal including a plurality of transmission power control parameter sets to a single cell, transmits a radio resource control signal including a plurality of sequence parameter sets to the terminal 102, and transmits a downlink control information (DCI) format including a field indicating any one of the plurality of sequence parameter sets to the terminal 102. In a case where an information bit indicating a first sequence parameter set among the plurality of sequence parameter sets is detected, the terminal 102 sets transmit power of a signal on the basis of a first transmission power control parameter set, and in a case where an information bit indicating a second sequence parameter set among the plurality of sequence parameter sets is detected, the terminal 102 sets transmit power of a signal on the basis of a second transmission power control parameter set.

The terminal 102 generates a signal by using different sequences in a case of transmitting the signal to the base station 101 or the RRH 103. At this time, the terminal 102 controls transmit power to be suitable for the sequences, and transmits the signal to the base station 101 or the RRH 103. The terminal 102 can transmit the signal to the base station 101 or the RRH 103 with an appropriate sequence and at appropriate transmit power. Since the signal whose transmit power is appropriately controlled is transmitted from the terminal 102 to the base station 101 or the RRH 103, it is possible to minimize influence of interference from signals transmitted from other terminals.

The sequence parameter set may include a terminal-specific cell ID. In addition, the sequence parameter set may include a sequence shift pattern offset. Further, the sequence parameter set may include an initial value of cyclic shift hopping. Furthermore, a plurality of the sequence parameter sets may be sent to the terminal 102 by using system information or an RRC signal.

The transmission power control parameter set may include power values of various terminal-specific uplink physical channels. In addition, the transmission power control parameter set may include a power offset of the SRS. Further, the transmission power control parameter set may include a path loss compensation coefficient α. Furthermore, the transmission power control parameter set may include a filter coefficient. Moreover, the transmission power control parameter set may include a transmit power value (referenceSignalPower) of a downlink reference signal. In addition, the transmission power control parameter set may include a path loss reference resource. Further, a plurality of the transmission power control parameter sets may be sent to the terminal 102 by using system information or an RRC signal.

The sequence parameter set and the transmission power control parameter set may be correlated with each other. That is, in a case where a sequence of a signal is generated by using a first sequence parameter set, transmission power control of the signal is performed by using a first transmission power control parameter set. In addition, in a case where a sequence of a signal is generated by using a second sequence parameter set, transmission power control of the signal is performed by using a second transmission power control parameter set. Further, in a case where a sequence of a signal is generated by using a third sequence parameter set, transmission power control of the signal is performed by using a third transmission power control parameter set.

In addition, the correlation may be set in advance. In other words, in a case where a sequence of a signal is generated by using a first sequence parameter set or a second sequence parameter set, transmission power control of the signal may be performed by using a first transmission power control parameter set. In addition, in a case where a sequence of a signal is generated by using a third sequence parameter set or a fourth sequence parameter set, transmission power control of the signal may be performed by using a second transmission power control parameter set. Further, in a case where a sequence of a signal is generated by using a fifth sequence parameter set or a sixth sequence parameter set, transmission power control of the signal may be performed by using a third transmission power control parameter set. Here, the correlation between two sequence parameter sets and a single transmission power control parameter set has been described, but three sequence parameter set may be correlated with a single transmission power control parameter set, and three or more sequence parameter set may be correlated with a single transmission power control parameter set. Information regarding such correlation may be sent to the terminal 102 by using system information or an RRC signal.

Ninth Embodiment

Next, a ninth embodiment will be described. In the ninth embodiment, the base station 101 or the RRH 103 transmits a radio resource control (RRC) signal including a plurality of transmission power control parameter sets to the terminal 102, transmits an RRC signal including a plurality of sequence parameter sets to the terminal 102, and transmits a downlink control information (DCI) format which is set in either a common search space (CSS) or a terminal-specific search space (USS), to the terminal 102. The terminal 102 detects the DCI format in the USS, detects the DCI format including a field indicating any one of the plurality of sequence parameter sets, sets transmit power of a signal on the basis of a first transmission power control parameter set in a case where an information bit of a first value is set in the field, and sets transmit power of the signal on the basis of a second transmission power control parameter set in a case where an information bit of a second value is set in the field.

In addition, in a case where the DCI format is detected in the CSS, the terminal 102 sets transmit power of the signal on the basis of the second transmission power control parameter set.

In addition, in a case where the DCI format is detected in the CSS, the terminal 102 may set transmit power of the signal on the basis of the first transmission power control parameter set, and in a case where the DCI format is detected in the USS, the terminal 102 sets transmit power of the signal on the basis of the second transmission power control parameter set regardless of a value which is set in the field indicating the sequence parameter set included in the DCI format.

The terminal 102 can change the transmission power control parameter sets depending on a search space in which a DCI format is set or a value of a certain field included in the DCI format, and can thus set appropriate transmission power. In other words, the terminal 102 can perform an appropriate transmission power control according to information which is sent.

Tenth Embodiment

Next, a tenth embodiment will be described. In the tenth embodiment, the base station 101 or the RRH 103 sets a transmission power control (TPC) command for a sounding reference signal (SRS) in a downlink control information (DCI) format. In addition, the base station 101 or the RRH 103 transmits, to the terminal 102, a DCI format including a field (SRS request) indicating whether or not a request of the SRS transmission is made to the terminal 102 in a certain control channel region (a PDCCH or an E-PDCCH). At this time, the base station 101 or the RRH 103 scrambles the certain control channel with a certain parameter. Further, a pseudo-random sequence of a demodulation reference signal (DL DMRS) is initialized with a certain parameter. In a case where the TPC command for the SRS is detected in a first DCI format, the terminal 102 performs an integration process (first integration process) of power correction on the basis of first transmission power control, and in a case where the TPC command for the SRS is detected in a second DCI format, the terminal performs an integration process (second integration process) of power correction on the basis of second transmission power control. In other words, if the TPC command for the SRS is detected in the first DCI format, the terminal 102 controls transmit power of the SRS on the basis of first power correction, and if the TPC command for the SRS is detected in the second DCI format, the terminal controls transmit power of the SRS on the basis of second power correction. In other words, the terminal 102 performs power correction of the SRS on the basis of first TPC command, and performs power correction of the SRS on the basis of second TPC command. In addition, the terminal can change the TPC commands on the basis of which the power correction is performed, depending on the type of DCI format in which an SRS request is detected.

In addition, the terminal 102 may perform an integration process (accumulated transmission power control, accumulation, or adding process) based on the first TPC command and an integration process of power correction based on the second TPC command in parallel. In other words, the respective integration processes are not mutually influenced by the power correction based on the TPC commands.

An integrated power value correction based on the first TPC command is set to $f_{c,tpc1}(i_1)$, and an integrated power value correction based on the second TPC command is set to $f_{c,tpc2}(i_2)$. A power correction value obtained from the first TPC command is set to $\delta_{tpc1}$, and a power correction value obtained from the second TPC command is set to $\delta_{tpc2}$. Integrated values obtained from the respective TPC commands are given as Equation (40).

[Eq. 40]

$$f_{c,tpc1}(i_1) = f_{c,tpc1}(i_1-1) + \delta_{tpc1}(i_1 - K_{tpc1})$$

$$f_{c,tpc2}(i_2) = f_{c,tpc2}(i_2-1) + \delta_{tpc2}(i_2 - K_{tpc2}) \quad (40)$$

$f_c(i) = f_{c,tpc1}$ or $f_c(i) = f_{c,tpc2}$ may be set in the transmit power. In addition, timings when the first TPC command and the second TPC command are notified may be different from each other. In other words, integration processes of power correction based on the first TPC command and power correction based on the second TPC command are controlled independently.

FIG. 18 is a flowchart illustrating power correction according to the tenth embodiment of the present invention. The terminal 102 determines the type of DCI format including a TPC command for the SRS in the DCI format which is transmitted in the PDCCH or the E-PDCCH (step S1801). In a case where the TPC command for the SRS is included in uplink grant, power correction of transmission power is performed on the basis of the first TPC command (S1802). In a case where the TPC command for the SRS is included in downlink assignment, power correction of transmission power is performed on the basis of the second TPC command (S1803).

Eleventh Embodiment

Next, an eleventh embodiment of the present invention will be described. In the eleventh embodiment, the base station 101 and/or the RRH 103 transmits, to the terminal 102, a radio resource control (RRC) signal including information indicating whether or not a transmission power control (TPC) command for a sounding reference signal (SRS) is added to a downlink control information (DCI) format. In addition, the base station 101 and/or the RRH 103 transmits, to the terminal 102, a DCI format including a field (SRS request) indicating whether or not a request of the SRS transmission is made to the terminal 102 in a certain control channel region (a PDCCH or an E-PDCCH).

In a case where the TPC command for the SRS is detected in a received DCI format, the terminal 102 performs a transmission power control (power correction) of the SRS on the basis of the TPC command for the SRS, and in a case where the TPC command for the SRS is not detected in the received DCI format, the terminal performs a transmission power control of the SRS on the basis of the TPC command for a PUSCH.

In a case where the TPC command for the SRS is included in a DCI format in which a positive SRS request is detected, the terminal 102 performs a transmission power control of the SRS on the basis of the TPC command for the SRS, and in a case where the TPC command for the SRS is not included in a DCI format in which a positive SRS request is detected, and the TPC command for the PUSCH is detected, the terminal performs a transmission power control of the SRS on the basis of the TPC command for the PUSCH.

In relation to whether or not the TPC command for the SRS is added to a certain DCI format, in a case where the terminal 102 is notified of configuration information of parameters related to a transmission power control, which are set to be specific to the SRS, by the base station 101 or the RRH 103, the terminal may recognize that the TPC command for the SRS has been added to the DCI format. In this case, the terminal 102 performs a demodulation process in consideration of the fact that a field used for the TPC command for the SRS has been added to the DCI format. For example, this case may be a case where a power offset is added to transmission power control of the SRS associated with the TPC command for the SRS.

In addition, the terminal 102 may be notified by a higher layer of whether or not the TPC command for the SRS is set to a certain DCI format. In other words, an RRC signal including the addition information may be sent from the base station 101 or the RRH 103.

The base station 101 or the RRH 103 may control the terminal 102 to perform a transmission power control of the SRS which is requested to be transmitted in uplink grant such as the DCI format 0 or the DCI format 4 on the basis of the TPC command for the PUSCH, and to perform a transmission power control of the SRS which is requested to be transmitted in downlink assignment such as the DCI format 1A, the DCI format 2B, or the DCI format 2C on the basis of the TPC command for the SRS.

In addition, in a case where a transmission power control of the SRS is performed in an accumulated manner, the terminal 102 performs the transmission power control of the SRS which is requested to be transmitted in uplink grant, on the basis of the TPC command for the PUSCH, and performs the transmission power control of the SRS which is requested to be transmitted in downlink assignment, on the basis of the TPC command for the SRS included in the downlink assignment. In other words, the terminal 102 can change the accumulated transmission power control depending on the type of DCI format. The base station 101 and the RRH 103 can use the SRS which is requested to be transmitted in the uplink grant, for channel estimation of uplink scheduling, and can use the SRS which is requested to be transmitted in the downlink assignment, for identification of channel circumstances of a downlink which is required to perform DL CoMP or joint reception (JR).

In addition, in a case where the accumulated transmission power control of the SRS is performed, the terminal 102 calculates an integrated power value correction through an integration process, obtained on the basis of a certain TPC command included in a certain DCI format. In other words, the terminal 102 performs power correction of the SRS on the basis of a TPC command B included in a DCI format A. In addition, a more appropriate power control is performed by reflecting an integrated value obtained on the basis of the TPC command B on transmit power of the SRS.

The terminal 102 sets transmit power of the SRS on the basis of Equation (41) in a case where the SRS is transmitted in a subframe i for a serving cell c. In this case, a condition A corresponds to a case where an SRS request is detected in uplink grant, and a condition B corresponds to a case where the SRS request is detected in downlink assignment. In other words, DCI formats in which the SRS request is detected are different from each other.

[Eq. 41]

$$P_{SRS,c}(i) = \begin{cases} \min\begin{Bmatrix} P_{CMAX,c}(i), \\ P_{SRS\_OFFSET,c}(m) + 10\log_{10}(M_{SRS,c}) + \\ P_{O\_PUSCH,c}(j) + \alpha_{PUSCH,c}(j) \cdot \\ PL_{PUSCH,c} + f_{PUSCH,c}(i) \end{Bmatrix} & \text{condition A} \\ \min\begin{Bmatrix} P_{CMAX,c}(i), \\ P_{SRS\_OFFSET,c}(m) + 10\log_{10}(M_{SRS,c}) + \\ P_{O\_PUSCH,c}(j) + \alpha_{SRS,c}(j) \cdot \\ PL_{SRS,c} + f_{SRS,c}(i) \end{Bmatrix} & \text{condition B} \end{cases} \quad (41)$$

In the condition B, $P_{SRS\_OFFSET,c}$, $\alpha_c$, $PL_c$, or $f_c$ may be configured independently from that of the condition A.

In a case where a value of $P_{O\_UE\_PUSCH,c}$ is changed (reconfigured) with respect to the serving cell c by the serving cell c, or the terminal 102 receives a random access response message from a primary cell, a secondary cell, or the serving cell c, the terminal 102 resets given power correction value $f_{PUSCH,c}$ or $f_{SRS,c}$ through the accumulated transmission power control. In other words, in a case where either one of the conditions is satisfied, the terminal 102 reset an integrated power value correction obtained through the accumulated transmission power control. In addition, an integrated power value correction for the SRS may be reset in a case where a value of the power offset $P_{SRS\_OFFSET}$ of the SRS is changed by a higher layer. Further, an integration power value correction for the SRS based on at least one TPC command may be reset in a case where a value of the power offset $P_{SRS\_OFFSET}$ of the SRS is changed by the higher layer. The power offset $P_{SRS\_OFFSET}$ of the SRS and the integration value $f_{SRS,c}$ for power correction for the SRS may be associated with the same DCI format or the same TPC command.

Figure 19:
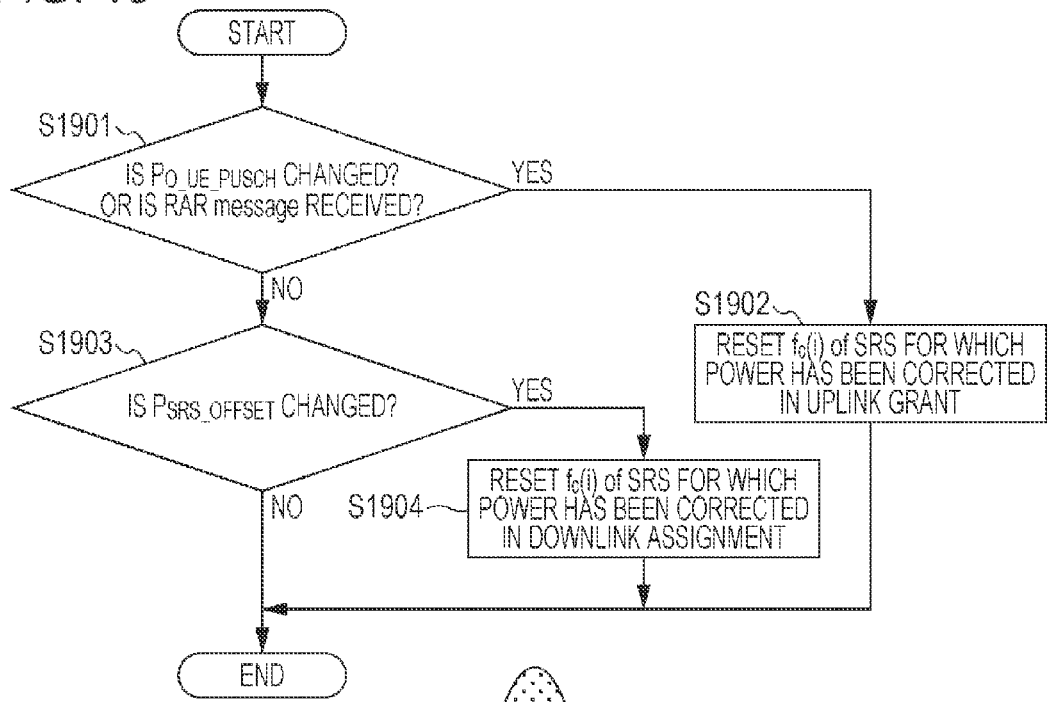
FIG. 19 is a flowchart illustrating an outline of a method of resetting an integrated value in power correction according to an eleventh embodiment of the present invention.

FIG. 19 is a flowchart illustrating an outline of a method of resetting an integration value based on power correction according to the eleventh embodiment of the present invention. The terminal 102 checks whether or not a value of $P_{O\_UE\_PUSCH,c}$ has been changed by a higher layer or a random access response message (RAR message) has been received (step S1901). In a case where the value of $P_{O\_UE\_PUSCH,c}$ has been changed by the higher layer or the random access response message (RAR message) has been received (S1901: YES), the terminal 102 resets an integration value $f_c(i)$ of power correction based on a TPC command for the SRS included in uplink grant (step S1902). In a case where the value of $P_{O\_UE\_PUSCH,c}$ has not been changed by the higher layer or the random access response message (RAR message) has not been received (S1901: NO), the terminal 102 checks whether or not a value of the SRS power offset $P_{SRS\_OFFSET}$ has been changed by the higher layer (step S1903). In a case where the value of the SRS power offset $P_{SRS\_OFFSET}$ has been changed by the higher layer (step S1903: YES), the terminal 102 resets an integration value $f_c(i)$ of power correction based on a TPC command for the SRS included in downlink assignment (step S1904). In a case where the value of the SRS power offset $P_{SRS\_OFFSET}$ has not been changed by the higher layer (step S1903: NO), the terminal 102 continuously performs the integration process of the power correction based on a TPC command.

In addition, whether or not a plurality of TPC commands are included in a single DCI format may be sent from a higher layer by using an RRC signal. Further, whether or not a plurality of TPC commands are included in a single DCI format may be recognized in accordance with a certain parameter (for example, a power offset for a certain DCI format) is set in the terminal 102.

Twelfth Embodiment

Next, a twelfth embodiment will be described. In the twelfth embodiment, the base station 101 and/or the RRH 103 transmits, to the terminal 102, an RRC signal including information indicating whether or not a TPC command for an SRS is set to a plurality of DCI formats. In a case where the information indicating that the TPC command for the SRS is added to a plurality of DCI formats is received, the terminal 102 recognizes that a field used in the TPC command for the SRS is included in the DCI format, and performs demodulation and decoding processes.

In a case where the TPC command for the SRS (first SRS TPC command, first TPC command with respect to SRS, and first TPC command for SRS) is detected in a received first DCI format, and a positive SRS request in which an SRS request indicates a request of the SRS transmission is detected in the first DCI format, the terminal 102 performs a transmission power control of the SRS which is requested to be transmitted in the first DCI format on the basis of the first TPC command for the SRS. In a case where the TPC command for the SRS (second SRS TPC command, second TPC command with respect to SRS, and second TPC command for SRS) is detected in a received second DCI format, and the positive SRS request is detected in the second DCI format, the terminal performs a transmission power control of the SRS which is requested to be transmitted in the second DCI format on the basis of the second TPC command for the SRS.

In a case where a transmission power control of the SRS is performed in an accumulated manner, the terminal 102 may perform the transmission power control on each SRS which is requested to be transmitted in a DCI format. In other words, the terminal 102 may perform the transmission power control of the SRS which is requested to be transmitted in a first DCI format on the basis of a TPC command for the SRS included in the first DCI format. In addition, the terminal 102 may perform a transmission power control of the SRS which is requested to be transmitted in a second DCI format on the basis of a TPC command for the SRS included in the second DCI format. The terminal 102 may perform a transmission power control of the SRS for each DCI format. The terminal 102 can appropriately perform a transmission power control for transmitting the SRS which is requested to be transmitted in the first DCI format to the base station 101. Further, the terminal 102 can appropriately perform a transmission power control for transmitting the SRS which is requested to be transmitted in the second DCI format to the RRH 103.

Furthermore, the terminal 102 may absolutely perform a transmission power control of the SRS. Whether the transmission power control of the SRS is performed in an accumulated manner or an absolute manner is determined by information (for example, Accumulation-enabled) which is sent from the higher layer processing unit 401. In other words, the type (accumulated or absolute) of transmission power control of the SRS is determined by control information which is sent from the base station 101 and/or the RRH 103. Moreover, information indicating whether a transmission power control of the SRS is performed in an accumulated manner or an absolute manner may be associated with information indicating whether or not accumulation of the PUSCH is performed.

Here, although the first DCI format and the second DCI format have been described as an example, the same process may also be performed on a third DCI format. In addition, the same process may also be performed on a fourth DCI format. Further, the same process may also be performed on any DCI format.

In addition, in a case where a plurality of DCI formats are of the same type, a transmission power control based on a TPC command may be common. In other words, in a case where the first DCI format and the third DCI format are downlink assignment, the transmission power control of the SRS which is requested to be transmitted in the DCI format may be performed on the basis of a TPC command for the SRS included in the DCI format. Further, in a case where the second DCI format and the fourth DCI format are uplink grant, the transmission power control of the SRS which is requested to be transmitted in the DCI format may be performed on the basis of a TPC command for the SRS included in the DCI format. In other words, the transmission power control of the SRS which is requested to be transmitted in the first DCI format or the third DCI format is performed on the basis of a TPC command for the SRS included in the first DCI format and the third DCI format. Furthermore, the transmission power control of the SRS which is requested to be transmitted in the second DCI format or the fourth DCI format is performed on the basis of a TPC command for the SRS included in the second DCI format and the fourth DCI format. In other words, in a case where the transmission power control of the SRS is performed in an accumulated manner, the control can be performed in a separated manner depending on the type of DCI format. Different closed-loop transmission power controls may be performed depending on the type of DCI format. In other words, the terminal 102 may perform a certain accumulated transmission power control according to a certain DCI format. In addition, the terminal 102 may independently perform a plurality of accumulated transmission power controls on the SRS.

Thirteenth Embodiment

Next, a thirteen embodiment will be described. In the thirteenth embodiment, the base station 101 and/or the RRH 103 transmits an RRC signal including information on parameters related to a base sequence of an SRS, to the terminal 102. In a case where parameters related to the base sequence of the SRS, which are configured for a parameter set of the SRS associated with DCI formats including an SRS request, are common as each other, the terminal 102 performs a transmission power control of the SRS on the basis of a TPC command for the SRS included in each DCI format. In addition, in a case where parameters related to the base sequence of the SRS, which are configured for the parameter set of the SRS, are different from each other, the terminal 102 performs a transmission power control of the SRS which is requested to be transmitted in each DCI format is performed on the basis of a TPC command for the SRS included in each DCI format.

In a case where parameters related to the base sequence of the SRS, which are configured for SRS parameter sets, are the same as each other between a plurality of SRS parameter sets, a transmission power control of the SRS may be performed on the basis of both a TPC command for the PUSCH and a TPC command for the SRS. In addition, in a case where parameters related to the base sequence of the SRS, which are configured for SRS parameter sets, are different from each other between a plurality of SRS parameter sets, a transmission power control of the SRS may be performed separately between the SRS parameter sets. In other words, the control may be performed on the basis of different TPC commands depending on the SRS parameter sets. Further, the transmission power control of the SRS may be performed according to parameters related to the base sequence, which are configured for the SRS parameter sets.

The terminal 102 may implicitly determine whether the SRS which is requested to be transmitted in an SRS request is used for uplink scheduling or for DL CoMP or TDD channel reciprocity, on the basis of the parameters related to the base sequence.

Here, a case where parameters related to a base sequence are the same as each other includes a case where parameters which is sent by a higher layer are the same as each other. In addition, a case where parameters related to a base sequence are the same as each other includes a case where results generated on the basis of parameters which is sent by a higher layer are the same as each other. In other words, a case is included in which base sequences obtained from parameters which is sent by a higher layer are the same as each other.

Fourteenth Embodiment

Next, a fourteenth embodiment will be described. In the fourteenth embodiment, the base station 101 or the RRH 103 transmits, to the terminal 102, a radio resource control (RRC) signal including a plurality of parameters for generating a base sequence, a plurality of hopping bandwidths, and a plurality of transmit power parameter sets. In addition, the base station 101 or the RRH 103 transmits an RRC signal including a plurality of SRS parameter sets to the terminal 102. The base station 101 or the RRH 103 transmits, to the terminal 102, a DCI format including a field (SRS request) indicating whether or not a request of an SRS transmission is made. The terminal 102 detects the SRS request from the DCI format. In addition, in a case where a positive SRS request is detected in a first DCI format (for example, the DCI format 0/4), the terminal 102 generates a base sequence of the SRS corresponding to the positive SRS request on the basis of a first parameter, and in a case where the positive SRS request is detected in a second DCI format, the terminal 102 generates a base sequence of the SRS corresponding to the positive SRS request on the basis of a second parameter.

Further, in a case where the positive SRS request is detected in the first DCI format, the terminal 102 determines a frequency hopping pattern of the SRS corresponding to the positive SRS request on the basis of a first hopping bandwidth, and in a case where the positive SRS request is detected in the second DCI format, the terminal determines a frequency hopping pattern of the SRS corresponding to the positive SRS request on the basis of a second hopping bandwidth.

Furthermore, in a case where the positive SRS request is detected in the first DCI format, the terminal 102 sets transmit power of the SRS corresponding to the positive SRS request on the basis of a first transmission power control, and in a case where the positive SRS request is detected in the second DCI format, the terminal 102 sets transmit power of the SRS corresponding to the positive SRS request on the basis of a second transmission power control.

The terminal 102 transmits the SRS with the generated base sequence to the base station 101 or the RRH 103 in an first SRS subframe after a predetermined subframe has elapsed.

A hopping bandwidth of the P-SRS and the first hopping bandwidth or the second hopping bandwidth may be common.

The first transmission power control may be performed on the basis of a TPC command included in the first DCI format. In addition, the second transmission power control may be performed on the basis of a TPC command included in the second DCI format.

In a case where transmission power control between terminals, that is, reception power control in the base station 101 or the RRH 103 has not been appropriately performed although different base sequences are configured for a plurality of terminals, an uplink signal which is transmitted from a terminal from which the signal is not required to be received becomes an interference source, and thus a demodulation process cannot be appropriately performed. Therefore, the base station 101 or the RRH 103 performs an appropriate transmission power control on the terminal 102.

Figure 20:
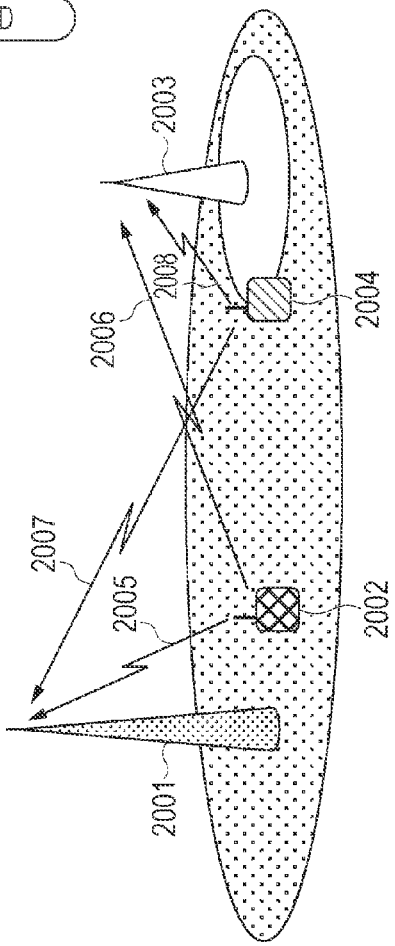
FIG. 20 is a schematic diagram illustrating a communication system according to a fourteenth embodiment of the present invention.

FIG. 20 is a schematic diagram illustrating a communication system according to the fourteenth embodiment of the present invention. The communication system includes a base station 2001, an RRH 2003, a terminal 2002, and a terminal 2004. The terminal 2002 accesses the base station 2001, and the terminal 2004 accesses the RRH 2003. In addition, the base station 2001 and the RRH 2003 perform coordinated communication. An uplink 2005 and an uplink 2006 indicate uplink signals transmitted from the terminal 2002, and an uplink 2007 and an uplink 2008 indicate uplink signals transmitted from the terminal 2004. In a case where resources of uplink signals which are transmitted via the uplink 2005 and the uplink 2007 overlap each other, if base sequences of the respective uplink signals are generated by using the same parameters, the base station 2001 cannot appropriately receive the uplink signals since the uplink signals interfere with each other. The same case may also occur in the RRH 2003. Therefore, the uplink signals which are respectively transmitted from the terminal 2002 and the terminal 2004 are required to be separated from each other in a sequence, a frequency domain, a time domain, and a code domain. Here, the base station 2001 and the RRH 2003 set parameters which cause different base sequences to be configured for the terminal 2002 and the terminal 2004. Consequently, even if resources of uplink signals transmitted from the terminal 2002 and the terminal 2004 overlap each other, the base station 2001 or the RRH 2003 can separate the uplink signals from each other on the basis of a difference between base sequences. However, it is difficult to separate the uplink signals from each other on the basis of a difference between base sequences unless an appropriate transmission power control is performed in the terminal 2002 and the terminal 2004. In a case where uplink signals are transmitted to the base station 2001 and the RRH 2003, each terminal is required to perform different transmission power controls. The different transmission power controls are to independently perform power correction based on TPC commands on respective reception points. In addition, the different transmission power controls are to set power offsets in the reception points.

Figure 21:
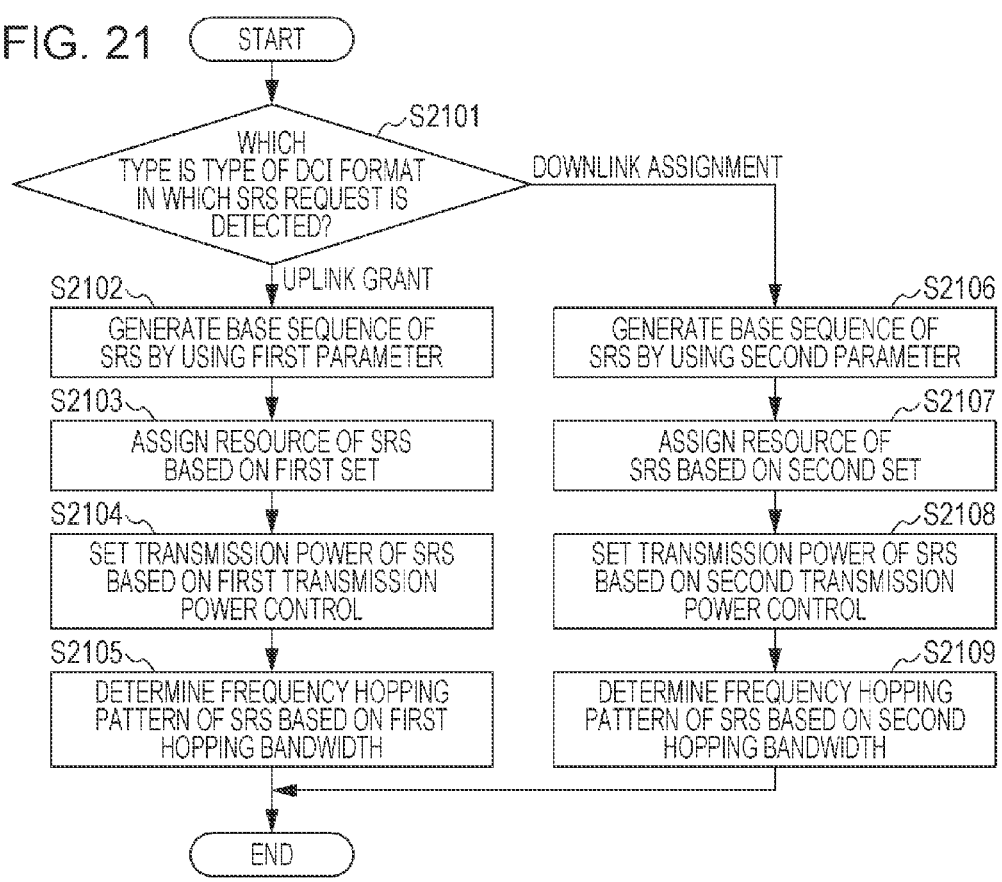
FIG. 21 is a flowchart illustrating a method of controlling transmission of an SRS according to the fourteenth embodiment of the present invention.
Figure 22:
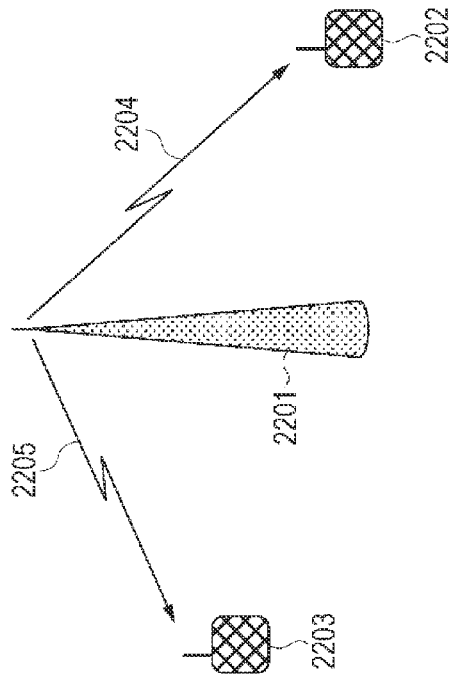
FIG. 22 is a diagram illustrating an example in which a multiuser MIMO method is performed.
Figure 23:
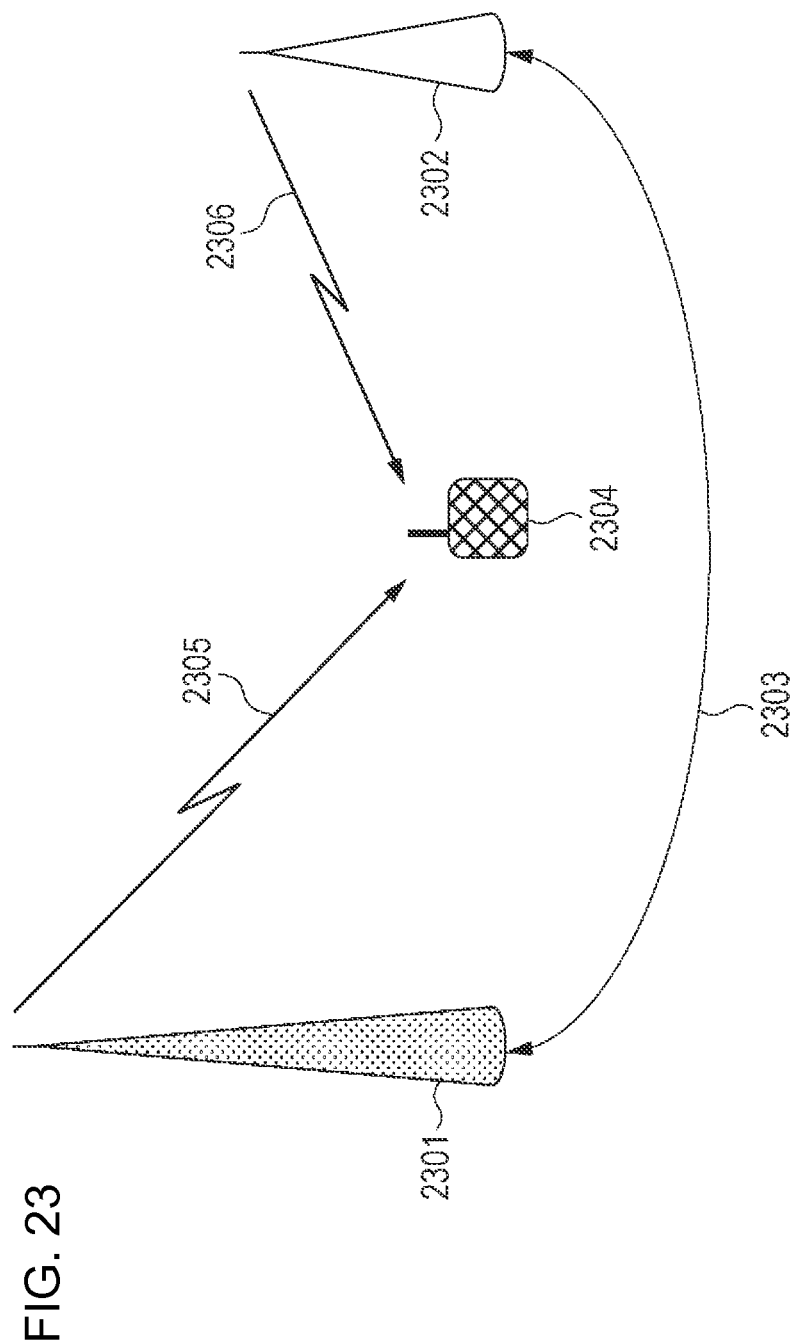
FIG. 23 is a diagram illustrating an example in which a downlink CoMP method is performed.
Figure 24:
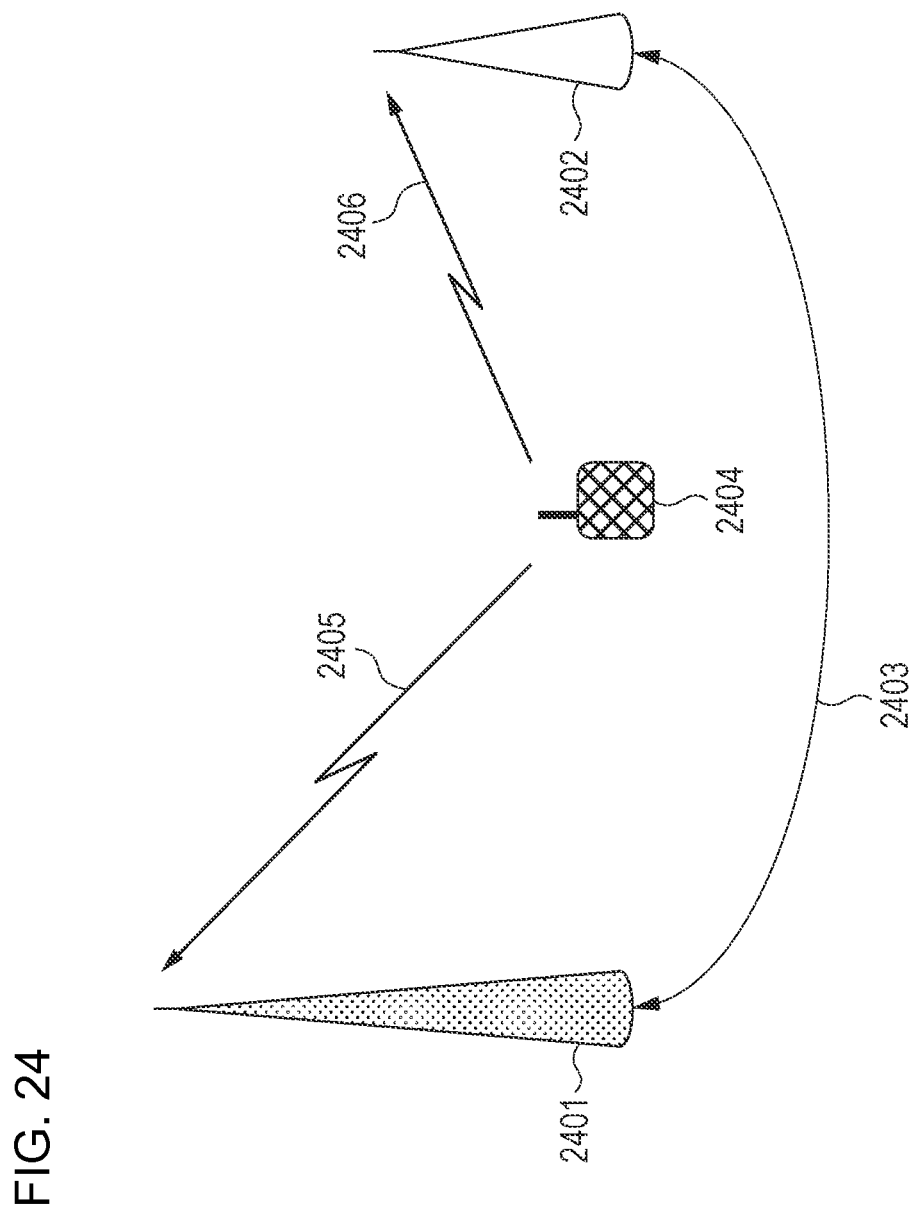
FIG. 24 is a diagram illustrating an example in which an uplink CoMP method is performed.

FIG. 21 is a flowchart illustrating a method of controlling transmission of an SRS according to the fourteenth embodiment of the present invention. The terminal 102 determines the type of DCI format including an SRS request transmitted in a PDCCH or an E-PDCCH (step S2101). In a case where the type of DCI format is uplink grant (for example, the DCI format 0 or the DCI format 4), a base sequence of the SRS is generated by using a first parameter (step S2102). In addition, a resource of the SRS is assigned on the basis of a first set (step S2103). Further, transmit power of the SRS is set on the basis of a first transmission power control (step S2104). Furthermore, a frequency hopping pattern is determined on the basis of a first hopping bandwidth (step S2105). In a case where the type of DCI format is downlink assignment (for example, the DCI format 1A, the DCI format 2B, or the DCI format 2C), a base sequence of the SRS is generated by using a second parameter (step S2106). In addition, a resource of the SRS is assigned on the basis of a second set (step S2107). Further, transmit power of the SRS is set on the basis of a second transmission power control (step S2108). Furthermore, a frequency hopping pattern is determined on the basis of a second hopping bandwidth (step S2109). In this case, the first hopping bandwidth and the second hopping bandwidth may be common. In other words, the first hopping bandwidth and the second hopping bandwidth may be the same value as each other between SRS parameter sets.

Since a reception power control of an uplink signal in the base station 101 or the RRH 103 is appropriately performed, that is, a transmission power control of the terminal 102 is appropriately performed, demodulation and decoding processes can be appropriately performed on the uplink signal by the base station 101 or the RRH 103.

In order to reduce interference between terminals, frequency hopping is applied to the A-SRS, so that a probability that SRS resources between the terminals may conflict with each other, and thus it is possible to improve reception accuracy of the base station 101 and the RRH 103.

In a case where resources of uplink signals transmitted from a terminal A and a terminal B partially or entirely overlap each other, the uplink signals can be demodulated and decoded in a reception point (the base station 101 or the RRH 103) as long as base sequences transmitted from the respective terminals are different from each other. However, if a reception power difference of the uplink signals transmitted from the respective terminals is large to the reception point, the reception point can demodulate and decode only an uplink signal having high reception power even if the uplink signals transmitted from the respective terminals are set in different base sequences. Therefore, by performing the frequency hopping, frequency domains are separated from each other between the terminals even in a case where a transmission power control of the uplink transmission power control of each terminal is not appropriately performed, and thus it is possible to demodulate and decode the uplink signals transmitted from the respective terminals. In addition, in the A-SRS, the resources are separated from each other in a time domain by delaying transmission timings, and thus it is possible to demodulate and decode the uplink signals transmitted from the respective terminals.

In addition, in a case where base sequences of the uplink signals transmitted from the terminal A and the terminal B are the same as each other, and resources thereof overlap each other, the uplink signals transmitted from the terminal A and the terminal B cannot be separated from each other in a reception point, and thus become interference sources to each other.

If an appropriate transmission power control is performed in each terminal, each uplink signal can be detected in the reception point (the base station 101 or the RRH 103) by changing base sequences between the terminals. In other words, it is possible to improve detection accuracy of an uplink signal in a reception point by performing an appropriate transmission power control and an appropriate sequence control.

In addition, in a case where points to which an uplink signal (the PUSCH or the A-SRS) is transmitted are dynamically changed, the terminal 102 performs frequency hopping for changing frequency positions depending on a subframe in which the uplink signal is transmitted, and transmits the uplink signal. Particularly, a different frequency hopping pattern may be configured for the A-SRS according to the type of DCI format in which a positive SRS request is detected.

In addition, in the above-described respective embodiments, in a case where some or all resources of a plurality of SRSs overlap each other in the same symbol, and base sequences or parameters used in the base sequences of the plurality of SRSs are different from each other, the terminal 102 may transmit the plurality of SRSs in the same symbol. Further, in a case where a sum of transmit power of the plurality of SRSs exceeds the maximum transmit power which is set in the terminal 102 when the plurality of SRSs are transmitted in the same symbol, the terminal 102 scales transmit power of each SRS to become equal to or lower than the maximum transmit power, and transmits the SRSs. However, in a case where, in a plurality of component carriers, a transmission timing of the PUSCH, the PUCCH, or the PRACH is the same as transmission timings of the plurality of SRSs, and a sum of transmit power of a plurality of uplink physical channels exceeds the maximum transmit power which is set in the terminal 102, the PUSCH or the PUCCH is transmitted prior to the PRACH. In other words, in this case, control is performed so that the terminal 102 does not transmit the plurality of SRSs.

In addition, in a case where some or all resources of a plurality of SRSs overlap each other in the same symbol (SRS symbol), and base sequences or parameters used in the base sequences of the plurality of SRSs are the same as each other, the terminal 102 preferentially transmits the A-SRS regardless of the base sequences or the parameters used in the base sequences. In other words, in this case, the terminal 102 controls the P-SRS not to be transmitted.

In the above-described respective embodiments, in a case where a plurality of TPC commands for the SRS are detected from a DCI format which is received in the same subframe, the terminal 102 performs a transmission power control of the SRS on the basis of each TPC command. For example, in a case where TPC commands for the SRS are respectively detected from uplink grant and downlink assignment, an accumulated transmission power control corresponding to each TPC command is performed. In other words, in a case where an independent accumulated transmission power control is performed on the SRS, if a TPC command corresponding to each accumulated transmission power control is detected, the terminal 102 reflects a power correction value obtained on the basis of the TPC command, on each transmission power control.

In addition, in the above-described respective embodiments, the base station 101 and/or the RRH 103 transmit(s) an RRC signal including configuration information regarding parameters of the SRS to the terminal 102. Further, the base station 101 and/or the RRH 103 transmit(s) an RRC signal including information regarding a transmission power control of the SRS to the terminal 102. Furthermore, the terminal 102 detects an SRS request from a received DCI format and determines whether or not a request of the SRS transmission is made. In a case where a positive SRS request in which a positive SRS request is detected in which the SRS request indicates the request of the SRS transmission, the terminal 102 transmits the SRS to the base station 101 or the RRH 103.

In addition, in the above-described respective embodiments, a configuration of parameters related to an uplink power control is referred to as a transmit power parameter set, a transmission power control parameter set, or a power control parameter set in some cases.

In the above-described respective embodiments, a cell ID is referred to as a parameter for which notification is sent from a higher layer in some cases. In other words, a first cell ID may be referred to as a first parameter; a second cell ID may be referred to as a second parameter; a third cell ID may be referred to as a third parameter; and an n-th cell ID may be referred to as an n-th parameter. Further, a cell ID is referred to as a physical quantity in some cases. Furthermore, a cell ID is referred to as a base sequence identity or a base sequence index in some cases. Moreover, a cell ID is referred to as a cell identity in some cases. In addition, a cell ID is referred to as a physical layer cell identity (PCI) in some cases. Further, a cell ID is referred to as a terminal-specific cell ID in some cases. Furthermore, a cell ID is referred to as a vertical cell ID (VCI) in some cases. Moreover, a field is referred to as control information, a control information field, information, an information field, a bit field, an information bit, an information bit field, or the like in some cases. In addition, the above-described cell ID may be set in each of the A-SRS and the P-SRS.

Further, in the above-described respective embodiments, the mapping unit of an information data signal, a control information signal, the PDSCH, the PDCCH, and a reference signal has been described by using a resource element or a resource block and the transmission unit in the time direction has been described by using a subframe or a radio frame, but are not limited thereto. Even if domains constituted by any frequency and time, and the time unit are used instead thereof, the same effect can be achieved. Further, in the above-described respective embodiments, a case has been described in which demodulation is performed by using a precoded RS, and a port corresponding to the precoded RS has been described by using a port which is equivalent to a MIMO layer, but the present invention is not limited thereto. Furthermore, the present invention is applied to ports corresponding to different reference signals, and thus the same effect can be achieved. For example, not a precoded RS but an unprecoded (non-precoded) RS may be used, and, as the port, a port which is equivalent to a precoded output end or a port which is equivalent to a physical antenna (a combination of physical antennae) may be used.

In addition, in the above-described respective embodiments, the uplink transmission power control is a transmission power control of each of the uplink physical channels (the PUSCH, the PUCCH, the PRACH, and the SRS), and the transmission power control includes changing or (re) configuration of various parameters used to compute transmit power of the various uplink physical channels.

In addition, in the above-described respective embodiments, although the downlink/uplink coordinated communication constituted by the base station 101, the terminal 102, and the RRH 103 has been described, the present invention is applicable to coordinated communication constituted by the two or more base stations 101 and the terminal 102, coordinated communication constituted by the two or more base stations 101, the terminal 102, and the RRH 103, coordinated communication constituted by the two or more base stations 101 or RRHs 103 and the terminal 102, coordinated communication constituted by the two or more base station 101, the two or more RRHs 103, and the terminal 102, and coordinated communication constituted by two or more transmission points/reception points. Further, the present invention is applicable to coordinated communication constituted by the base stations 101 (a plurality of base stations) having different cell IDs. Furthermore, the present invention is applicable to coordinated communication constituted by the base station 101 and the RRH 103 having different cell IDs. Moreover, the present invention is applicable to coordinated communication constituted by the RRHs 103 (a plurality of RRHs) having different cell IDs. In other words, the above-described coordinated communication is also applicable to a communication system constituted by a plurality of base stations 101, a plurality of terminals 102, and a plurality of RRHs 103. In addition, the above-described coordinated communication is also applicable to a communication system constituted by a plurality of transmission points and a plurality of reception points. Further, such transmission points and reception points may be constituted by a plurality of base stations 101, a plurality of terminals 102, and a plurality of RRHs 103. Furthermore, in the above-described respective embodiments, although a case has been described in which an uplink transmission power control suitable for the terminal 102 (having a small path loss) which is close to the base station 101 or the RRH 103 is performed on the basis of a computation result of a path loss, the same process may also be performed on a case where an uplink transmission power control suitable for the terminal 102 (having a large path loss) which is distant from the base station 101 or the RRH 103 is performed on the basis of a computation result of a path loss.

In addition, in the above-described respective embodiments, the base station 101 and the RRH 103 are transmission points of a downlink, and reception points of an uplink. Further, the terminal 102 is a reception point of a downlink, and a transmission point of an uplink.

In addition, in the above-described respective embodiments, a power correction value based on a TPC command for the SRS may be determined from the same table of a power correction value as in the PUSCH. Further, a power correction value based on a TPC command for the SRS may be determined from the same table of a power correction value as in the PUCCH. Furthermore, a power correction value based on a TPC command for the SRS may be determined from a table of a power correction value different from those of the PUSCH and the PUCCH. In other words, power correction values based on TPC commands for the PUSCH, the PUCCH, and the SRS may be determined from separate tables.

In addition, the communication system in the above-described respective embodiments includes the base station 101, the remote radio head (RRH) 103, and the terminal 102. Here, the base station 101 is referred to as a macro base station, a first base station apparatus, a transmission apparatus, a cell, a transmission point, a transmit antenna group, a transmit antenna port group, a receive antenna port group, a reception point, a first communication apparatus, a component carrier, eNodeB, a point, a transmission and reception point, or a reference point, in some cases. The RRH 103 is referred to as a remote antenna, a distributed antenna, an n-th (where n is an integer) base station, a transmission apparatus, a cell, a transmission point, a transmit antenna group, a transmit antenna port group, a receive antenna port group, a reception point, an n-th communication apparatus, a component carrier, eNodeB, a point, a transmission and reception point, or a reference point, in some cases. The terminal 102 is referred to as a terminal apparatus, a mobile terminal, a mobile station, a reception point, a reception terminal, a reception apparatus, an m-th (where m is an integer) communication apparatus, a transmit antenna port group, a transmission point, a receive antenna group, a receive antenna port group, UE, a point, or a transmission and reception point, in some cases.

A program which runs in the base station 101 and the terminal 102 according to the present invention is a program (which causes a computer to function) which controls a CPU and the like to realize the functions of the embodiments according to the present invention. In addition, the information treated in these apparatuses is temporarily accumulated in a RAM during processing thereof, is then stored in various ROMs or HDDs, and is read by the CPU as necessary so as to be corrected and be written. A recording medium storing the program may be any one of a semiconductor medium (for example, a ROM, or a nonvolatile memory card), an optical medium (for example, a DVD, an MO, an MD, a CD, or a BD), a magnetic recording medium (for example, a magnetic tape, or a flexible disc), and the like. In addition, the functions of the above-described embodiments may not only be realized by executing the loaded program, but the functions of the present invention may also be realized by performing processes in cooperation with an operating system, other application programs, or the like on the basis of an indication from the program.

In addition, in a case where the program is distributed in the market, the program may be stored on a portable recording medium or may be transmitted to a server computer connected via a network such as the Internet. In this case, a storage device of the server computer is also included in the present invention. Further, part or the whole of the base station 101 and the terminal 102 in the above-described embodiments may be typically implemented by an LSI which is an integrated circuit. The respective functional blocks of the base station 101 and the terminal 102 may be separately formed of a chip, and some or all of the blocks may be formed as a chip. Further, a technique for an integrated circuit is not limited to an LSI, and may be realized by a dedicated circuit or a general purpose processor. Furthermore, in a case where a technique for an integrated circuit replacing the LSI appears with the advance of a semiconductor technique, an integrated circuit based on the technique may be used.

As mentioned above, although the embodiments of the present invention have been described in detail with reference to the drawings, a specific configuration is not limited to the embodiments, and design modifications and the like may occur within the scope without departing from the spirit of the invention. In addition, various alterations may occur in the claims of the present invention, and embodiments obtained by appropriately combining technical means which are respectively disclosed in different embodiments are also included in the technical scope of the present invention. Further, configurations in which the elements which are disclosed in the above-described respective embodiments and achieve the same effect are replaced with each other are also included in the technical scope of the present invention.

INDUSTRIAL APPLICABILITY

The present invention is suitable to be used for a radio base station apparatus, a radio terminal apparatus, a radio communication system, and a radio communication method.

DESCRIPTION OF REFERENCE NUMERALS 101, 2001, 2201, 2301, AND 2401 BASE STATION
102, 2002, 2004, 2202, 2203, 2304, AND 2404 TERMINAL
103, 2003, 2302, AND 2402 RRH
104, 2303, AND 2403 LINE
105, 107, 2204, 2205, 2305, AND 2306 DOWNLINK
106, 108, 2005, 2006, 2007, 2008, 2405, AND 2406 UPLINK
301 HIGHER LAYER PROCESSING UNIT
303 CONTROL UNIT
305 RECEPTION UNIT
307 TRANSMISSION UNIT
309 CHANNEL MEASUREMENT UNIT
311 TRANSMISSION AND RECEPTION ANTENNA
3011 RADIO RESOURCE CONTROL PORTION
3013 SRS SETTING PORTION
3015 TRANSMIT POWER SETTING PORTION
3051 DECODING PORTION
3053 DEMODULATION PORTION
3055 DEMULTIPLEXING PORTION
3057 RADIO RECEPTION PORTION
3071 CODING PORTION
3073 MODULATION PORTION
3075 MULTIPLEXING PORTION
3077 RADIO TRANSMISSION PORTION
3079 DOWNLINK REFERENCE SIGNAL GENERATION PORTION
401 HIGHER LAYER PROCESSING UNIT
403 CONTROL UNIT
405 RECEPTION UNIT
407 TRANSMISSION UNIT
409 CHANNEL MEASUREMENT UNIT
411 TRANSMISSION AND RECEPTION ANTENNA
4011 RADIO RESOURCE CONTROL PORTION
4013 SRS CONTROL PORTION
4015 TRANSMISSION POWER CONTROL PORTION
4051 DECODING PORTION
4053 DEMODULATION PORTION
4055 DEMULTIPLEXING PORTION
4057 RADIO RECEPTION PORTION
4071 CODING PORTION
4073 MODULATION PORTION
4075 MULTIPLEXING PORTION
4077 RADIO TRANSMISSION PORTION
4079 UPLINK REFERENCE SIGNAL GENERATION PORTION
2301, 2401 MACRO BASE STATION

The invention claimed is:
1. A terminal communicating with a base station, comprising:
 a receiver configured to:
  receive a higher layer signal including a first parameter and a second parameter for uplink power control, and
  receive a Transmission Power Control (TPC) command through a physical downlink control channel; and
 a transmission power controller configured or programmed to:
  set a first transmission power for a first subframe based on the first parameter, in a case that the second parameter is configured and the first subframe belongs to a first subframe set, and
  set a second transmission power for a second subframe based on the second parameter, in a case that the second parameter is configured and the second subframe belongs to a second subframe set, wherein
 the transmission power controller is configured or programmed to accumulate a first integrated value and a second integrated value, the first integrated value being used to configure the first transmission power and the second integrated value being used to configure the second transmission power, the first integrated value is based on TPC commands received on downlink subframes corresponding to the first subframe set, the second integrated value is based on TPC commands received on downlink subframes corresponding to the second subframe set, the first integrated value is reset, in a case that a value of the first parameter is changed by a higher layer, the second integrated value is reset, in a case that a value of the second parameter is changed by the higher layer, and each of the first subframe set and the second subframe set are instructed to be configured by using a bit map.

2. The terminal according to claim 1, wherein
the first parameter corresponds to the first subframe set, and
the second parameter corresponds to the second subframe set.

3. A base station communicating with a terminal, comprising:
a transmitter configured to transmit a Transmission Power Control (TPC) command using a physical downlink control channel, and a higher layer signal including a first parameter and a second parameter, the first parameter concerning power control for a first uplink transmission power and the second parameter concerning power control for a second uplink transmission power, wherein the first uplink transmission power is given by a first integrated value, the second uplink transmission power is given by a second integrated value, the first integrated value is based on TPC commands transmitted on downlink subframes corresponding to the first subframe set, the second integrated value is based on TPC commands transmitted on downlink subframes corresponding to the second subframe set, the first integrated value is reset, in a case that a value of the first parameter is changed by a higher layer, the second integrated value is reset, in a case that a value of the second parameter is changed by the higher layer, and each of the first subframe set and the second subframe set are instructed to be configured by using a bit map.

4. The base station according to claim 3, wherein
the first parameter corresponds to the first subframe set, and
the second parameter corresponds to the second subframe set.

5. A communication method for a terminal communicating with a base station, comprising:
receiving a higher layer signal including a first parameter and a second parameter for uplink power control;
receiving a Transmission Power Control (TPC) command through a physical downlink control channel;
setting a first transmission power for a first subframe based on the first parameter, in a case that the second parameter is configured and the first subframe belongs to a first subframe set;

setting a second transmission power for a second subframe based on the second parameter, in a case that the second parameter is configured and the second subframe belongs to a second subframe set; and accumulating a first integrated value and a second integrated value, the first integrated value being used to configure the first transmission power and the second integrated value being used to configure the second transmission power, wherein the first integrated value is based on TPC commands received on downlink subframes corresponding to the first subframe set, the second integrated value is based on TPC commands received on downlink subframes corresponding to the second subframe set, the first integrated value is reset, in a case that a value of the first parameter is changed by a higher layer, the second integrated value is reset, in a case that a value of the second parameter is changed by the higher layer, and each of the first subframe set and the second subframe set are instructed to be configured by using a bit map.

6. The communication method according to claim 5, wherein
the first parameter corresponds to the first subframe set, and
the second parameter corresponds to the second subframe set.

7. A communication method of a base station communicating with a terminal, comprising:
transmitting a Transmission Power Control (TPC) command using a physical downlink control channel; and
transmitting a higher layer signal including a first parameter and a second parameter, the first parameter concerning power control for a first uplink transmission power and the second parameter concerning power control for a second uplink transmission power, wherein the first uplink transmission power is given by a first integrated value, the second uplink transmission power is given by a second integrated value, the first integrated value is based on TPC commands transmitted on downlink subframes corresponding to the first subframe set, the second integrated value is based on TPC commands transmitted on downlink subframes corresponding to the second subframe set, the first integrated value is reset, in a case that a value of the first parameter is changed by a higher layer, the second integrated value is reset, in a case that a value of the second parameter is changed by the higher layer, and each of the first subframe set and the second subframe set are instructed to be configured by using a bit map.

8. The communication method according to claim 7, wherein
the first parameter corresponds to the first subframe set, and
the second parameter corresponds to the second subframe set.

* * * * *

UNITED STATES PATENT AND TRADEMARK OFFICE
CERTIFICATE OF CORRECTION

PATENT NO.           : 9,661,589 B2                                    Page 1 of 1
APPLICATION NO.      : 14/397660
DATED                : May 23, 2017
INVENTOR(S)          : Wataru Ouchi et al.

It is certified that error appears in the above-identified patent and that said Letters Patent is hereby corrected as shown below:

Claim 1, Column 79, Lines 14-16, please delete:
"and
each of the first subframe set and the second subframe set are instructed to be configured by using a bit mapsubframes included in the first subframe set are indicated by a bitmap"
And add:
--subframes included in the first subframe set are indicated by a bit map, and subframes included in the second subframe set are indicated by the bitmap--.
Claim 3, Column 79, Lines 46-48, please delete:
"and
each of the first subframe set and the second subframe set are instructed to be configured by using a bit mapsubframes included in the first subframe set are indicated by a bit map"
And add:
--subframes included in the first subframe set are indicated by a bitmap, and subframes included in the second subframe set are indicated by the bitmap--.
Claim 5, Column 80, Lines 21-23, please delete:
"and
each of the first subframe set and the second subframe set are instructed to be configured by using a bit mapsubframes included in the first subframe set are indicated by a bit map"
And add:
--subframes included in the first subframe set are indicated by a bitmap, and subframes included in the second subframe set are indicated by the bitmap--.
Claim 7, Column 80, Lines 54-56, please delete:
"and
each of the first subframe set and the second subframe set are instructed to be configured by using a bit mapsubframes included in the first subframe set are indicated by a bit map"
And add:
--subframes included in the first subframe set are indicated by a bitmap, and subframes included in the second subframe set are indicated by the bitmap--.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*